US007719134B2

(12) United States Patent
Hashimoto et al.

(10) Patent No.: US 7,719,134 B2
(45) Date of Patent: May 18, 2010

(54) IN-VEHICLE MOUNT ELECTRONIC CONTROLLER

(75) Inventors: Koji Hashimoto, Chiyoda-ku (JP); Yuki Iwagami, Chiyoda-ku (JP); Manabu Yamashita, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 12/132,275

(22) Filed: Jun. 3, 2008

(65) Prior Publication Data

US 2008/0309163 A1 Dec. 18, 2008

(30) Foreign Application Priority Data

Jun. 12, 2007 (JP) ............................ 2007-155179
Jan. 21, 2008 (JP) ............................ 2008-010566

(51) Int. Cl.
*H02M 3/156* (2006.01)
*H02M 3/04* (2006.01)

(52) U.S. Cl. ....................................... 307/10.1; 361/86

(58) Field of Classification Search .................. 307/9.1, 307/10.1, 28, 75; 361/86; 701/36
See application file for complete search history.

(56) References Cited

U.S. PATENT DOCUMENTS 4,626,697 A * 12/1986 Nelson ........................ 307/18
6,211,579 B1 * 4/2001 Blair ........................... 307/24
6,249,411 B1 * 6/2001 Hemena et al. ............... 361/86
7,504,743 B2 * 3/2009 Matsumoto et al. ........ 307/10.1
2001/0035685 A1 * 11/2001 Tamai et al. ............... 307/10.1
2003/0030324 A1 * 2/2003 Tamai et al. ................. 307/9.1
2004/0119339 A1 * 6/2004 Sytwu ......................... 307/28
2008/0093924 A1 * 4/2008 Matsumoto et al. ........ 307/10.1

FOREIGN PATENT DOCUMENTS

JP 10-288634 A 10/1998
JP 11-265225 A 9/1999
JP 2001-352675 A 12/2001

* cited by examiner

*Primary Examiner*—Fritz M Fleming
(74) *Attorney, Agent, or Firm*—Sughrue Mion, PLLC

(57) ABSTRACT

In an in-vehicle mount electronic controller, a constant-voltage power supply generates a high-precision small-capacity 5V output voltage Vad, a low-precision large-capacity 5V output voltage Vif and a low-precision large-capacity 3.3V output voltage Vcp, and also generates at least one of a low-precision small-capacity 2.8V output voltage Vup and a high-precision small-capacity 3.3V output voltage Vsb. A judgment signal input circuit logically combines comparison results of divided voltages of the above output voltages Vif, Vcp, Vup and Vsb with a divided voltage of the output voltage Vad as a reference voltage, and inputs relative voltage information ER2, ER3, ER4 and ER5 to a microprocessor. The microprocessor comprehensively judges the output voltages containing the comparison reference voltage, and reports abnormality or saves abnormality occurrence information.

12 Claims, 21 Drawing Sheets

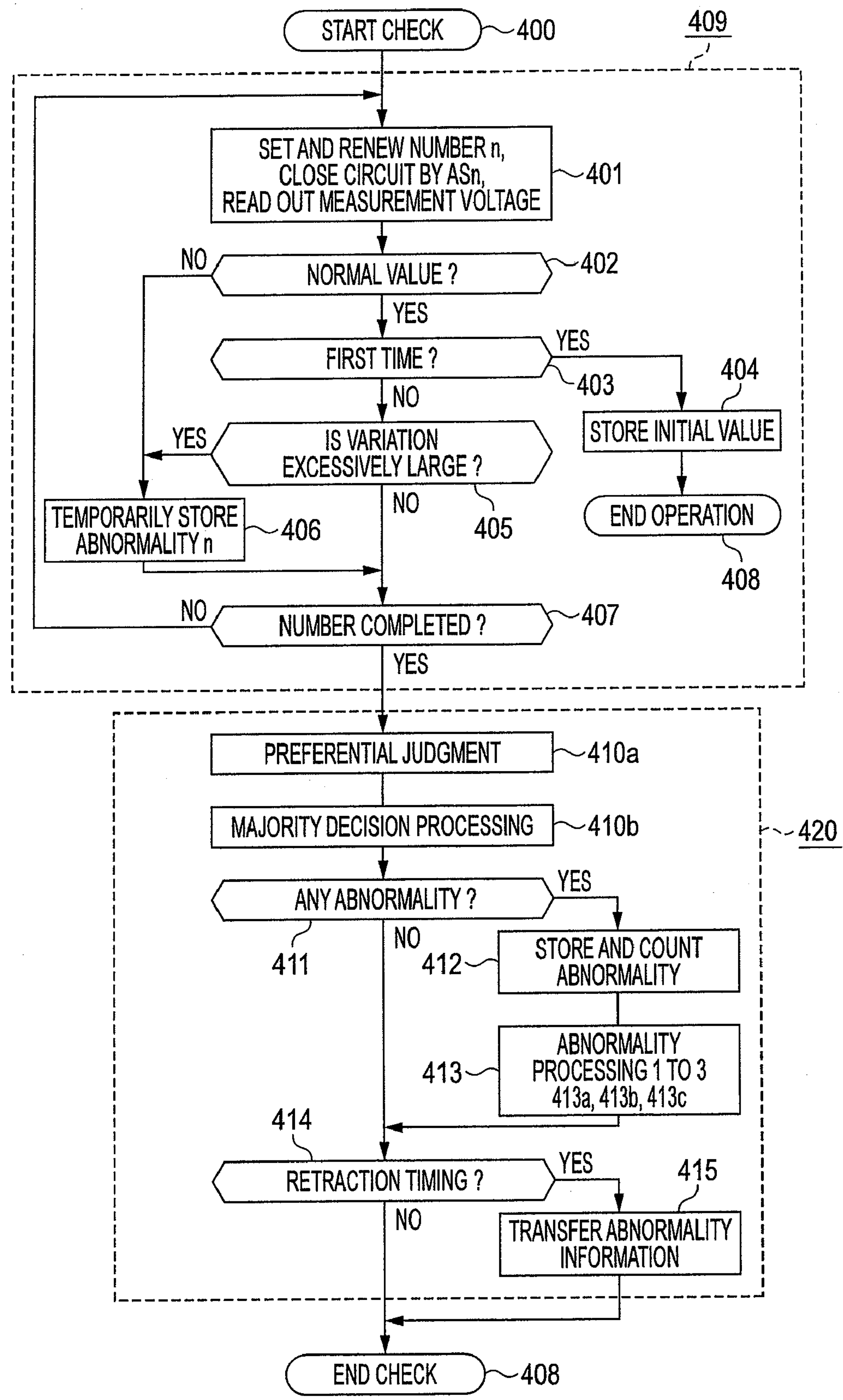

FIG. 4
START CHECK
400
409
SET AND RENEW NUMBER n, CLOSE CIRCUIT BY ASn, READ OUT MEASUREMENT VOLTAGE
401
NORMAL VALUE ?
402
NO
YES
FIRST TIME ?
403
YES
404
STORE INITIAL VALUE
END OPERATION
408
NO
IS VARIATION EXCESSIVELY LARGE ?
405
YES
NO
TEMPORARILY STORE ABNORMALITY n
406
NUMBER COMPLETED ?
407
NO
YES
PREFERENTIAL JUDGMENT
410a
MAJORITY DECISION PROCESSING
410b
420
ANY ABNORMALITY ?
411
YES
NO
STORE AND COUNT ABNORMALITY
412
ABNORMALITY PROCESSING 1 TO 3 413a, 413b, 413c
413
414
RETRACTION TIMING ?
YES
NO
415
TRANSFER ABNORMALITY INFORMATION
END CHECK
408

IN-VEHICLE MOUNT ELECTRONIC CONTROLLER

BACKGROUND OF THE INVENTION

1. Field of the Invention

The present invention relates to an in-vehicle mount electronic controller, and particularly to an in-vehicle mount electronic controller that contains a constant-voltage power supply source for generating plural stabilized output voltages and is improved so as to comprehensively detect the presence or absence of abnormality of each output voltage and a comparison reference voltage.

2. Description of the Related Art

A constant voltage source in an in-vehicle mount electronic controller is required to generate plural stabilized output voltages. For example, a constant-voltage power supply source disclosed in JP11-265225A titled as "POWER SUPPLY DEVICE FOR ENGINE CONTROLLER" generates various output voltages, 7.8V for a converter for flash writing, 5V for a high-precision sensor and a converter for ADC (analog/digital conversion), 3.3V for a converter for CPU, 3.3V for a converter for CPU standby, and 5V for a chopper type 5V converter. The output voltage of 5V for the chopper type 5V converter is generated by ON/OFF control, and the other output voltages are generated by a continuous control dropper. This constant-voltage power supply can be designed to be compact in size and be high in efficiency, and also it can be used as a power supply for an engine controller which is suitably adaptable to requirements of the output voltage, the precision thereof, etc.

JP2001-352675A titled as "POWER SUPPLY FOR IN-VEHICLE MOUNT OPERATING EQUIPMENT" discloses a specific circuit which is supplied with power from an in-vehicle mount battery to generate stabilized output voltages of DC 5V, 3.3V, 2.7V, and it contains the description of a circuit associated with protection of over current of a transistor for controlling a constant voltage. Furthermore, JP10-288634A titled as "POWER SUPPLY VOLTAGE DETECTING CIRCUIT" discloses a power supply voltage detecting circuit including a reference voltage generating section for generating a first reference voltage and a second reference voltage lower than the first reference voltage from a power supply voltage by resistance division, an integrating section that is supplied with a voltage achieved by resistance-dividing the power supply voltage and has an output voltage having an intermediate potential between the first and second reference voltages at a stationary time, a lower limit comparator that is supplied with the first reference voltage at one terminal thereof and the output voltage of the integrating section at the other terminal thereof and detects that the power supply voltage is equal to a lower limit value or less, and an upper limit comparator that is supplied with the second reference voltage at one terminal thereof and the output voltage of the integrating section at the other terminal thereof and detects that the power supply voltage is equal to an upper limit or more. The power supply voltage detecting circuit is not required to remake a reference voltage in accordance with the specification of the power supply voltage, and detects only the rapid variation of the power supply voltage due to noise or the like.

With respect to the constant-voltage power supply source shown in JP11-265225A, there is presented a concept that the same DC 5V output voltage is separated to a small capacity power supply requiring high precision and a large capacity power supply which may be low in precision. Provision of many output voltages induces a problem that complicated processing is needed when some output voltage is abnormal. However, there is not presented a concept associated with the detection of abnormality of each output voltage. Furthermore, the constant-voltage power supply source shown in JP2001-352675A aims to prevent burnout of the constant-voltage controlling transistor due to abnormality of overcurrent, but it does not aim to accurately check the output voltage precision and thus predict occurrence of abnormality. On the other hand, the power supply voltage detecting circuit shown in JP10-288634A detects the upper and lower limit of ripple variation of the output voltage by a pair of comparison circuits, and detect variation abnormality by the logical sum of the upper and lower limits. However, the voltage as a comparison reference is a variation average value of the voltage to be detected, and thus the power supply voltage detecting circuit neither judges whether the average value itself is right nor comprehensively detects occurrence of abnormality of plural output voltages.

SUMMARY OF THE INVENTION

An object of the present invention is to provide an in-vehicle mount electronic controller that can accurately detect the presence or absence of abnormality with respect to plural output voltages of a constant-voltage power supply source, and predict such a risk that the in-vehicle mount electronic controller is impossible to operate.

An in-vehicle mount electronic controller according to the present invention which has a microprocessor for drive-controlling an in-vehicle mount electric load group in accordance with operation states of an in-vehicle mount sensor group and contents of control programs stored in a non-volatile program memory, a combination control circuit unit that is serially connected to the microprocessor to mediate and connect some input/output signals, a constant-voltage power supply source for supplying power to the microprocessor, the combination control circuit unit and input/output interface circuits therefore, and a power supply abnormality detecting circuit for detecting abnormality of the constant-voltage power supply source. In the in-vehicle mount electronic controller, the constant-voltage power supply source contains plural constant-voltage power supply circuits supplied with power from an in-vehicle mount battery, the respective constant-voltage power supply circuits being subjected to negative feedback control so as to be proportional to a reference voltage generated by a reference voltage generating circuit, to thereby generate output voltages having a predetermined permissible variation band width, the power supply abnormality detecting circuit contains a judgment signal input circuit which cooperates with at least one of the microprocessor and the combination control circuit unit to detect individual abnormality for each of plural monitor target output voltages selected from the plural output voltages generated by the constant-voltage power supply source, at least one of the microprocessor and the combination control circuit unit further contains an individual abnormality detecting section and a comprehensive judging processing section, the judgment signal input circuit inputs relative voltage information between each output voltage and the comparison reference voltage with respect to each of the plural monitor target output voltages to at least one of the microprocessor and the combination control circuit unit, at least one of a voltage proportional to the predetermined output voltage having high constant-voltage control precision among the plural output voltages generated by the constant-voltage power supply source and the reference voltage generated by the reference voltage generating circuit is used as the comparison reference voltage, the individual abnormality detecting section individually detects, on the basis of the relative voltage information input from the judgment signal input circuit, the presence or absence of band abnormality as to whether each of the plural monitor target output voltages is a voltage value within each permissible variation band width, and the comprehensive judgment processing section makes a comprehensive judgment containing the presence or absence of abnormality of the comparison reference voltage when it is detected by the individual abnormality detecting section that individual abnormality is detected in at least one of the plural target output voltage, and carries out at least one of abnormality and storing of abnormality occurrence information.

The in-vehicle electronic controller according to the present invention detects the presence or absence of individual abnormality and comprehensively judges individual abnormality individually by making the band comparison as to whether each of the output voltages of the plural constant-voltage power supply circuits is within the permissible variation width, by using the output voltage of the constant-voltage power supply circuit having high output voltage precision among the plural constant-voltage power supply circuits or the output voltage of the reference voltage generating circuit as the comparison reference voltage, thereby executing abnormality processing.

Accordingly, the presence or absence of the band abnormality can be individually accurately detected for the plural constant-voltage power supply circuits by using the high-precision comparison reference voltage, and also precision abnormality of the output voltage is detected as risk prediction information and abnormality is reported or abnormality occurrence record is stored before the microprocessor or the combination control circuit unit falls into an operation stop state. Therefore, there is an effect that maintenance check can be performed before an abnormal-decrease or abnormal-increase accident occurs or risk prediction can be performed by periodic check.

Furthermore, there is also an effect that not only individual abnormality can be detected, but also identification information as to which constant-voltage power supply circuit falls into an individual abnormality state or whether the comparison reference voltage itself is abnormal or not is added to report abnormality or store abnormality record information, thereby facilitating maintenance check.

The foregoing and other object, features, aspects and advantages of the present invention will become more apparent from the following detailed description of the present invention when taken in conjunction with the accompanying drawings.

BRIEF DESCRIPTION OF THE DRAWINGS

FIG. 4 is a flowchart showing an abnormality detecting operation according to the first embodiment;

DETAILED DESCRIPTION OF THE PREFERRED EMBODIMENTS

Preferred embodiments according to the present invention will be described hereunder with reference to the accompanying drawings.

First Embodiment

(1) Detailed Description of Construction

Figure 1:
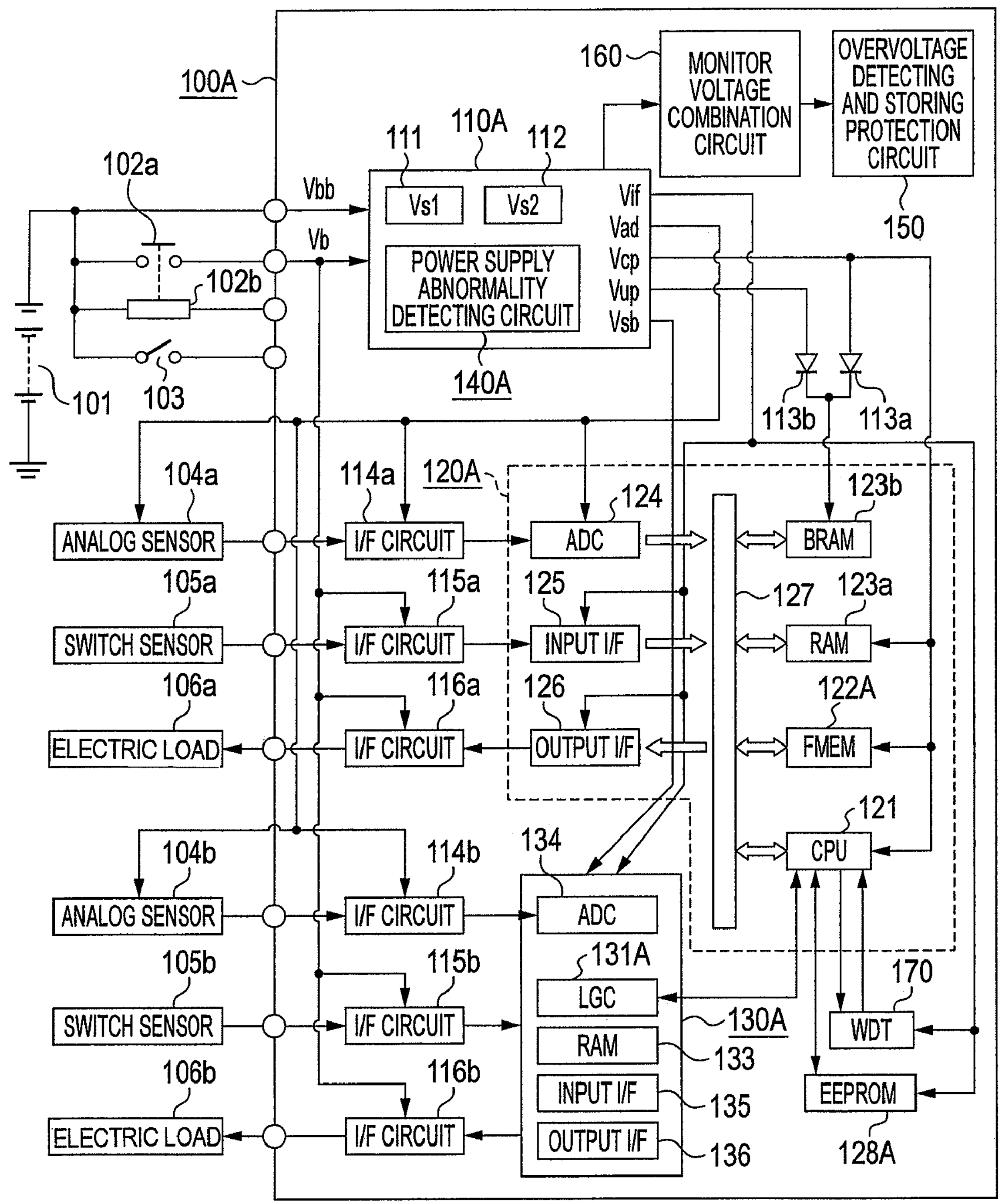
FIG. 1 is an overall circuit diagram showing a first embodiment of an in-vehicle mount electronic device according to the present invention.

FIG. 1 is an overall circuit diagram showing a first embodiment of an in-vehicle mount electronic controller according to the present invention. First, the construction of an in-vehicle mount electronic controller 100A according to a first embodiment will be described in detail with reference to FIG. 1. In FIG. 1, a main power supply voltage Vb is supplied from an in-vehicle mount battery 101 through an output contact point 102*a* of a power supply relay to the in-vehicle mount electronic controller 100A, and an auxiliary power supply voltage Vbb is directly supplied from the in-vehicle battery 101 to the in-vehicle mount electronic controller 100A even when the output contact point 102*a* opens the circuit. An exciting coil 102*b* of the power supply relay is energized when a power supply switch 103 closes the circuit, whereby the output contact point 102*a* closes the circuit. When the power supply switch 103 is controlled to open the circuit, the exciting coil 102*b* is deenergized after a predetermined time elapses and thus the output contact point 102*a* opens the circuit under the control of the in-vehicle mount electronic controller 100A.

First and second analog sensors 104*a* and 104*b* are connected to the in-vehicle mount electronic controller 100A. These first and second analog sensors 104*a* and 104*b* are in-vehicle analog sensor groups respectively, and they supply outputs of various kinds of analog sensors to the in-vehicle mount electronic controller 100A. The first analog sensor 104*a* contains an air-intake amount sensor of an intake pipe, an exhaust gas sensor, an air-intake valve opening-degree sensor and a step-on amount sensor of an acceleration pedal. The second analog sensor 104*b* contains a cooling water temperature sensor, an air pressure sensor, etc. Each of the first and second analog sensors 104*a* and 104*b* generates an operation instruction to the engine for a vehicle and a monitor signal of the driving state of the engine.

First and second switch sensors 105*a* and 105*b* are connected to the in-vehicle mount electronic controller 100A. Each of the first and second switch sensors 105*a* and 105*b* is an in-vehicle switch sensor group, and it supplies outputs of various kinds of switch sensors to the in-vehicle mount electronic controller 100A. The first switch sensor 105*a* contains a crank angle sensor of the engine and a vehicle speed sensor, for example. The second switch sensor 105*b* contains a selected position sensor of a shift lever of a transmission, etc., for example. Each of the first and second switch sensors 105*a* and 105*b* generates an operation instruction to the engine of the vehicle and a monitor signal of the driving state of the engine.

First and second in-vehicle mount electronic loads 106*a* and 106*b* are connected to the in-vehicle mount electronic controller 100A. Each of the first and second in-vehicle mount electronic loads 106*a* and 106*b* is an in-vehicle mount electronic load group, and power supply to each in-vehicle mount electronic load is drive-controlled by the in-vehicle mount electronic controller 100A. The first in-vehicle mount electronic load 106*a* contains an electromagnetic valve for fuel injection, an ignition coil (in the case of gasoline engine) and a motor for controlling the opening degree of the air-intake valve. The second in-vehicle mount electronic load 106*b* contains an electromagnetic valve for selecting a gear (speeds), an electric heater for the exhaust gas sensor, an alarm display device, etc. Each of the first and second in-vehicle mount electronic loads 106*a* and 106*b* carries out the driving control of the vehicle engine and the state report.

A constant-voltage power supply source 110A is contained in the in-vehicle mount electronic controller 100A. The constant-voltage power supply source 110A contains first and second reference voltage generating circuits 111 and 112 each of which uses a band gap cell, for example. It generates first, second, third and fifth output voltages Vad, Vif, Vcp, Vsb which are dropped from the voltage Vb of the main power supply and stabilized, and also generates a fourth output voltage Vup which is dropped from the auxiliary power supply voltage Vbb and stabilized. Diodes 113*a* and 113*b* are connected to a circuit for supplying power from the third and fourth output voltages Vcp and Vup to a backup memory 123*b*.

First and second analog interface circuits 114*a*,114*b* are noise filter circuits. The first analog interface circuit 114*a* is connected between the first analog sensor 104*a* and a first multi-channel AD converter 124 described later, and the second analog interface circuit 114*b* is connected between the first analog sensor 104*a* and a second multi-channel AD converter 134 described later.

A first input interface circuit 115*a* is connected between the first switch sensor 105*a* and an input interface circuit 125 described later and a second input interface circuit 115*b* is connected between the second switch sensor 105*b* and an input interface circuit 135 of a combination control circuit unit 130A. Each of the first and second input interface circuits 115*a*,115*b* is constructed by a conversion circuit of a signal voltage level and a noise filter circuit.

A first output interface circuit 116*a* is connected between the first in-vehicle electric load 106*a* and an output interface circuit 126 described later. A second output interface circuit 116*b* is connected between the second in-vehicle electric load 106*b* and an output interface circuit 136 of the combination control circuit unit 130A. Each of the first and second output interface circuits 116*a*,116*b* is constructed by a power transistor circuit for converting the signal voltage level.

A first integrated circuit element 120A is constructed by a microprocessor 121, a non-volatile program memory 122A, an arithmetic processing RAM memory 123*a*, a backup memory 123*b* corresponding to a partial area of the RAM memory 123*a*, the multi-channel AD converter 124, an input interface circuit 125 and an output interface circuit 126. The respective constituent elements of the first integrated circuit element 120A are connected to one another through a data bus 127. A non-volatile data memory 128A is an EEPROM memory which is serially connected to the microprocessor 121. When a partial area in the non-volatile program memory 122A is used as the non-volatile data memory 128A, the non-volatile data memory 128A is not required.

The combination control circuit unit 130A contains a monitor control circuit unit 131A constructed by a hard logic, an auxiliary RAM memory 133, the second multi-channel AD converter 134, an input interface circuit 135 and an output interface circuit 136. The combination control circuit unit 130A is serially connected to the microprocessor 121 through a serial/parallel converter (not shown). It transmits a digital conversion value of an analog signal achieved from the second analog sensor 104*b* and an ON/OFF signal achieved from the second switch sensor 105*b* to the microprocessor 121, and also drives the second in-vehicle mount electronic load 106*b* on the basis of a control signal generated by the microprocessor 121.

Figure 2:
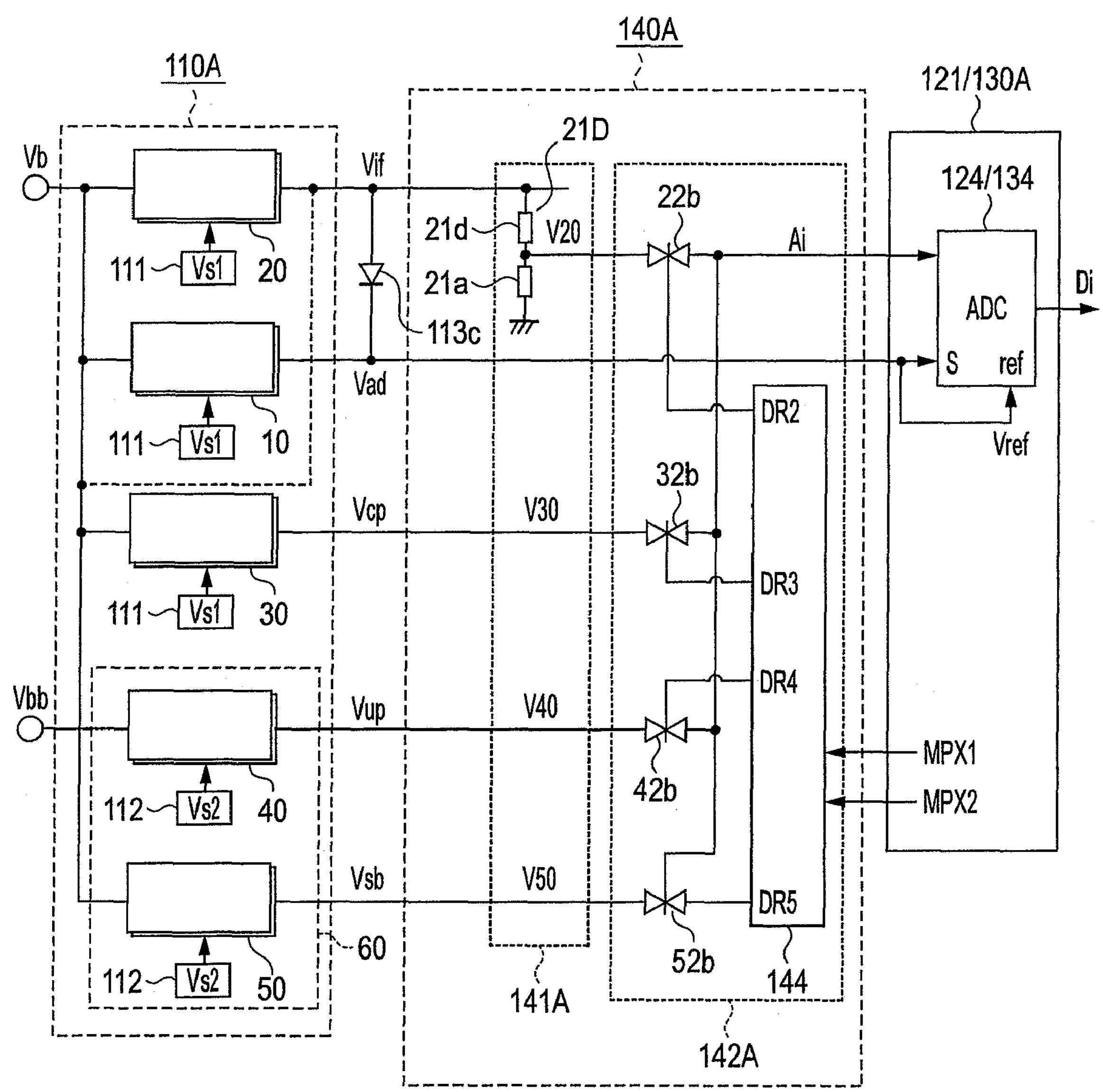
FIG. 2 is a detailed diagram showing a power supply abnormality detecting circuit according to the first embodiment.

The first output voltage Vad of the constant-voltage power supply source 110A constitutes a high-precision and small-capacity power supply of DC 5V±20 mV/20 mA, for example. The first output voltage Vad has smaller load current as compared with the second and third output voltages Vif and Vcp, however, has higher precision than the second and third output voltages Vif and Vcp. The first output voltage Vad is supplied to the first and second multi-channel AD converters 124 and 134, the first and second analog interface circuits 114*a* and 114*b* and parts of the first and second analog sensors 104*a* and 104*b*. The first output voltage Vad is supplied to the power supply terminals S and reference voltage terminals ref of the first and second multi-channel AD converters 124 and 134. The construction that the first output voltage Vad is supplied to the power supply terminals S and the reference voltage terminals ref of the first and second multi-channel AD converters 124 and 134 is shown in FIG. 2. When the analog input signal voltage of the first, second multi-channel AD converter 124,134 is represented by Ai and the digital conversion output is represented by Di, the relationship of the following equation (1) is satisfied.

$$Di=K\times(Ai/Vad), K=2^m-1 \quad (1)$$

Here, m represents the resolution of the multi-channel AD converter, and for m=10, the full scale digital value K=1023 when Ai=Vad.

Furthermore, the suffix i represents an input number selected by the multiplexer 144, and the digital conversion output Di corresponds to relative voltage information.

The second output voltage Vif constitutes a low-precision and large-capacity power supply of DC 5V+0.2V/200 mA, for example. The second output voltage Vif is the same output voltage as the first output voltage Vad, however, it has lower constant-voltage precision than the first output voltage Vad. The second output voltage Vif is supplied to the input/output interface circuits 125 and 135, the output interface circuits 126, 136, the combination control circuit unit 130A, the non-volatile data memory 128A and a watchdog timer circuit 170. However, the non-volatile data memory 128A may be supplied with the first output voltage Vad.

The third output voltage Vcp constitutes a low-precision and large-capacity power supply of DC 3.3V±0.3V/500 mA, for example. The third output voltage Vcp is different in voltage value from the first output voltage Vad. For example, it has a lower voltage than the first output voltage Vad, and lower constant-voltage precision than the first output voltage Vad. The third output voltage Vcp is supplied to the microprocessor 121, the non-volatile program memory 122A, the RAM memory 123*a* and the backup memory 123*b*.

The fourth output voltage Vup constitutes a low-precision and small-capacity power supply of DC 3.3V 0.3V/20 mA, for example. The fourth output voltage Vup is different in voltage value from the first output voltage Vad, and for example, it is lower than the first output voltage Vad and lower constant-voltage precision than the first output voltage Vad. The fourth output voltage Vup is supplied to the backup memory 123*b* when the output contact point 102*a* of the power supply relay opens the circuit.

A fifth output voltage Vsb is a small-capacity power supply of DC 2.5V±0.3V/50 mA, for example. However, it is actually designed as a high-precision control power supply of DC 2.5V±10 mV, and by comparing it with the first output voltage Vad, it can be judged whether they are mutually normal or not. The fifth output voltage Vsb is supplied to the monitor control circuit unit 131A in the combination control circuit unit 130A. When the vehicle is based on the DC 12V system, the output voltage of the in-vehicle mount battery 101 varies from 8 to 16V. The first and second input interface circuits 115*a* and 115*b* primarily transforms the input voltage from the main power supply voltage Vb of DC 12V system to DC 5V system, and the input interface circuit 125 and 135 further secondarily transforms DC 5V system to DC 3.3V system or 2.5V system. The output interface circuit 126 and 136 primarily transform the output voltage of DC 3.3V system or 2.5V system to DC 5V system, and the first and second output interface circuits 116*a* and 116*b* secondarily transforms DC 5V system to DC 12V. The microprocessor 121 and the various kinds of memories are operated by the third output voltage Vcp=DC 3.3V system, whereby the high density mounting and high-speed processing of the first integrated circuit element 120A can be performed.

Likewise, the monitor control circuit unit 131A is operated by the fifth output voltage Vsb=DC 2.5V, whereby the high density mounting and high-speed processing of the combination control circuit unit 130A can be performed. However, when the third output voltage Vcp and the fifth output voltage Vsb are the same voltage and designed with the same precision, it is unnecessary to separate the third out voltage Vcp and the fifth output voltage Vsb from each other.

The constant-voltage power supply source 110A contains a power supply abnormality detecting circuit 140A, and a monitor voltage combination circuit 160 and an over voltage detecting and storing protection circuit 150 are connected to the constant-voltage power supply source 110A. The power supply abnormality detecting circuit 140A will be described later with reference to FIG. 2. The over voltage detecting and storing protection circuit 150 and the monitor voltage combination circuit 160 will be described later with reference to FIG. 3. The watchdog timer circuit 170 monitors the pulse width of a watchdog signal WD as a pulse sequence signal for monitoring runaway occurring in the microprocessor 121. When the pulse width is equal to a predetermined value or more, the watchdog timer circuit 170 generates a reset signal to initialize and restart the microprocessor 121 and the combination control circuit unit 130A. If the power supply voltage to the watchdog timer circuit 170 decreases abnormally, the watchdog timer circuit 170 continually generates the reset signal, and stops occurrence of all the outputs of the microprocessor 121 and the combination control circuit unit 130A.

Furthermore, when the watchdog timer circuit 170 operates normally, a normal operation signal Ena described later is generated to enable occurrence of the outputs of the first and second output interface circuits 116*a* and 116*b*. When the third output voltage Vcp is normally lowered, the microprocessor 121 stops occurrence of all the outputs, and the output logic is unstable. However, the output terminal of the microprocessor 121 is biased by a pull-up resistor or pull-down resistor connected thereto at the outside so that the output terminal concerned is an output at the safety side.

Likewise, when the fifth output voltage Vsb decreases abnormally, the monitor control circuit unit 131A stops all the output thereof, and the output logic is unstable. However, the output terminal of the monitor control circuit unit 131A is biased by a pull-up resistor or pull-down resistor connected at the outside so that it is an output at the safety side.

Weak electric circuit portions of the combination control circuit unit 130A, the first and second analog interface circuits 114*a*, 114*b*, the first and second input interface circuits 115*a*, 115*b*, and the first and second output interface circuits 116*a*, 116*b* from which heating parts are excluded, a constant-voltage control circuit portion of the constant-voltage power supply source 110A from which a power transistor and heating parts are excluded, the power supply abnormality detecting circuit 140A, the over voltage detecting and storing protection circuit 150, the monitor voltage combination circuit 160 and the watchdog timer circuit 170 constitute a second integrated circuit element (not shown). The combination control circuit unit 130A serves as a core of the second integrated circuit element. However, the constant-voltage control circuit unit of the constant-voltage power supply source 110A may be constructed as a power module which is integrated with a power transistor constituting the constant-voltage power supply source 110A.

Next, the power supply abnormality detecting circuit 140A of FIG. 1 will be described in detail with reference to FIG. 2. In FIG. 2, the constant-voltage power supply source 110A contains the first, second, third, fourth and fifth constant-voltage power supply circuits 10, 20, 30, 40, 50. The first constant-voltage power supply circuit 10 drops the main power supply voltage Vb to generate the first output voltage Vad. The second constant-voltage power supply circuit 20 drops the main power supply voltage Vb to generate the second output voltage Vif. The third constant-voltage power supply circuit 30 drops the main power supply voltage Vb to generate the third output voltage Vcp. The fourth constant-voltage power supply circuit 40 drops the auxiliary power supply voltage Vbb to generate the fourth output voltage Vup. The fifth constant-voltage power supply circuit 50 drops the auxiliary power supply voltage Vb to generate the fifth output voltage Vsb.

As indicated by a dashed line in FIG. 2, the third and fifth constant-voltage power supply circuits 30, 50 may be designed so as to drop the second output voltage Vif from the second constant-voltage power supply circuit 20 to generate the third and fifth output voltages Vcp, Vsb. The fifth constant-voltage power supply circuit 50 may be designed so as to drop the auxiliary power supply voltage Vbb and generate the fifth output voltage Vsb as in the case of the fourth constant-voltage power supply circuit 40.

A saving diode 113*c* is connected between the respective output portions of the first and second constant-voltage power supply circuits 10 and 20. The saving diode 113*c* alternatively supplies power to the analog system on the basis of the second output voltage Vif when the first output voltage Vad decreases abnormally. When the first and second output voltages Vad and Vif are normal, the first output voltage Vad is set to a voltage higher than the voltage achieved by subtracting the voltage drop of the saving diode 113*c* from the second output voltage Vif, so that the saving diode 113*c* is set to OFF state, and no power supply is carried out from the second output voltage Vif to the analog system circuit.

Each of the first, second, third, fourth and fifth constant-voltage power supply circuits 10, 20, 30, 40, 50 is constructed by a power transistor which is subjected to negative feedback continuous control so that a voltage proportional to the output voltage of each constant-voltage power supply circuit is equal to the first or second reference voltage Vs1, Vs2 generated by the first or second reference voltage generating circuit 111, 112, and it is generally a regulator called as a dropper type. In the constant-voltage power supply source 110A of the first embodiment shown in FIG. 2, a first reference voltage Vs1 is used for the first, second and third constant-voltage power supply circuits 10, 20, 30, and a second reference voltage Vs2 is used for the fourth and fifth constant-voltage power supply circuits 40 and 50. However, a simple and low-precision third reference voltage Vs3 which has low power consumption may be used for the fourth constant-voltage power supply circuit 40. The fourth and fifth constant-voltage power supply circuits 40 and 50 constitute an additional constant-voltage power supply circuit 60.

As shown in FIG. 2, the power supply abnormality detecting circuit 140A has a voltage dividing circuit 141A and a judgment signal input circuit 142A. The judgment signal input circuit 142A contains a multiplexer 144 and analog switches 22*b*, 32*b*, 42*b*, 52*b*. The voltage dividing circuit 141A contains voltage dividing resistors 21*d* and 21*a* constituting a second voltage diving circuit 21D. The second voltage dividing circuit 21D divides the second output voltage Vif by voltage dividing resistors 21*d* and 22*a*, and outputs a measurement voltage V20.

Since the third, fourth and fifth output voltages Vcp, Vup and Vsb are surely lower voltages than the first output voltage Vad, a voltage dividing circuit for dividing the third, fourth and fifth output voltages Vcp, Vup and Vsb is not used, and the third, fourth and fifth output voltages Vcp, Vup and Vsb are directly used as third, fourth and fifth measurement voltages V30, V40 and V50. The analog switches 22*b*, 32*b*, 42*b*, 52*b* select any one of the measurement voltages V20, V30, V40 and V50, and selectively connects the selected measurement voltage to one input terminal of the first multi-channel AD converter 124 (or the second multi-channel AD converter 134).

The multiplexer 144 receives selection instructions MPX1, MPX2 from the microprocessor 121 or the combination control circuit unit 130A, and sets the logical level of any one of the selection instruction signals DR2, DR3, DR4, DR5 to "H", thereby making any one of the analog switches 22*b*, 32*b*, 42*b*, 52*b* to close the circuit.

A reference voltage Vref for AD conversion is supplied to multi-channel AD converters 124 and 134 in the microprocessor 121 and the combination control circuit unit 130A.

One of the multi-channel AD converters 124 and 134 constitutes a part of the judgment signal input circuit 142A in the power supply abnormality detecting circuit 140A, and the first output voltage Vad is supplied to the reference voltage terminals ref of the first and second multi-channel AD converters 124 and 134.

Furthermore, the second, third, fourth and fifth output voltages Vif, Vcp, Vup, Vsb constitute monitor target output voltages, and the measurement voltages V20, V30, V40, V50 proportional to these output voltages are supplied to the first and second multi-channel AD converters 124 and 134 when the analog switches 22*b*, 32*b*, 42*b*, 52*b* are closed. The reference voltage Vref and the measurement voltages V20, V30, V40, V50 are supplied from the judgment signal input circuit 142A to the first and second multi-channel AD converters 124 and 134. The first and second multi-channel AD converters 124 and 134 convert the values of the respective measurement voltages V20, V30, V40 and V50 with respect to the comparison reference voltage to digital values, and input the digital values as relative voltage information to the microprocessor 121 or the combination control circuit unit 130A.

In the foregoing description, the fourth constant-voltage power supply circuit 40 has been described as the constant-voltage power supply circuit to which power is directly supplied from the in-vehicle mount battery 101. However, in an application under which the backup memory 123*b* is not required, the fourth constant-voltage power supply circuit 40 is not required.

In the foregoing description, the output voltages Vup of the fourth constant-voltage power supply circuit 40 is set to have lower constant-voltage precision. However, if the fourth constant-voltage power supply circuit 40 as a small-capacity power supplier is set to have the same level constant-voltage precision as the first constant-voltage power supply circuit 10, after the abnormality judgment in the high-precision power supply group is preferentially carried out by the majority logic of the abnormality judgment result of the first, fourth and fifth constant-voltage power supply circuits 10, 40 and 50, the abnormality judgment of the second and third constant-voltage power supply circuits 20 and 30 can be surely performed.

Furthermore, in the foregoing description, the respective measurement voltages V20, V30, V40, v50 are directly input to the microprocessor 121 through the first multi-channel AD converter 124. However, when the combination control circuit unit 130A is used, the measurement voltages can be serially transmitted to the microprocessor 121 through the second multi-channel AD converter 134 and the combination control circuit unit 130A.

After a comprehensive judgment of comprehensively judging many judgment signals and specifying an abnormality-occurring output voltage by the majority decision is carried out in the combination control circuit unit 130A, the conclusion may be serially transmitted to the microprocessor 121.

Figure 5:
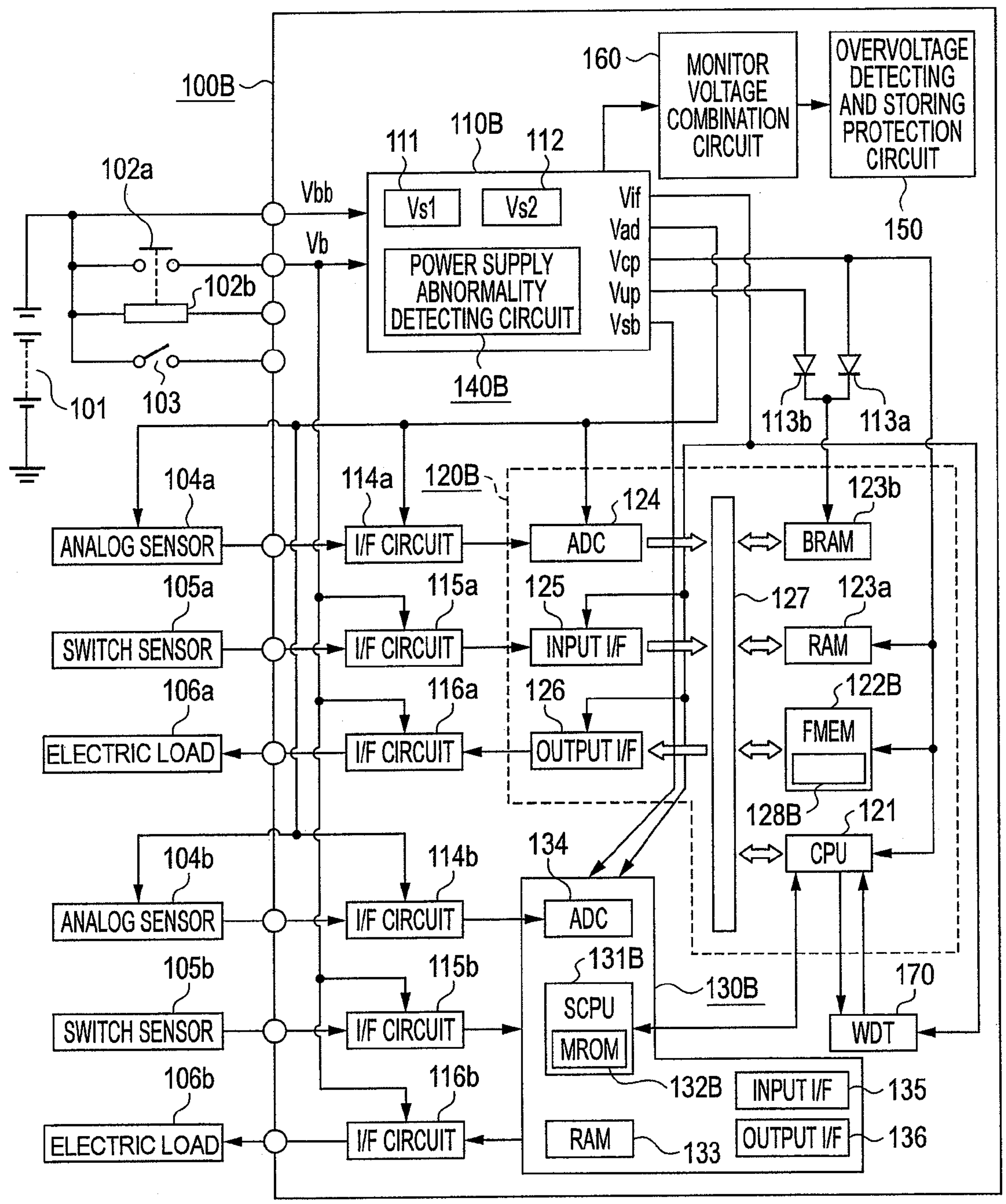
FIG. 5 is an overall circuit diagram showing a second embodiment of an in-vehicle mount electronic controller according to the present invention.
Figure 9:
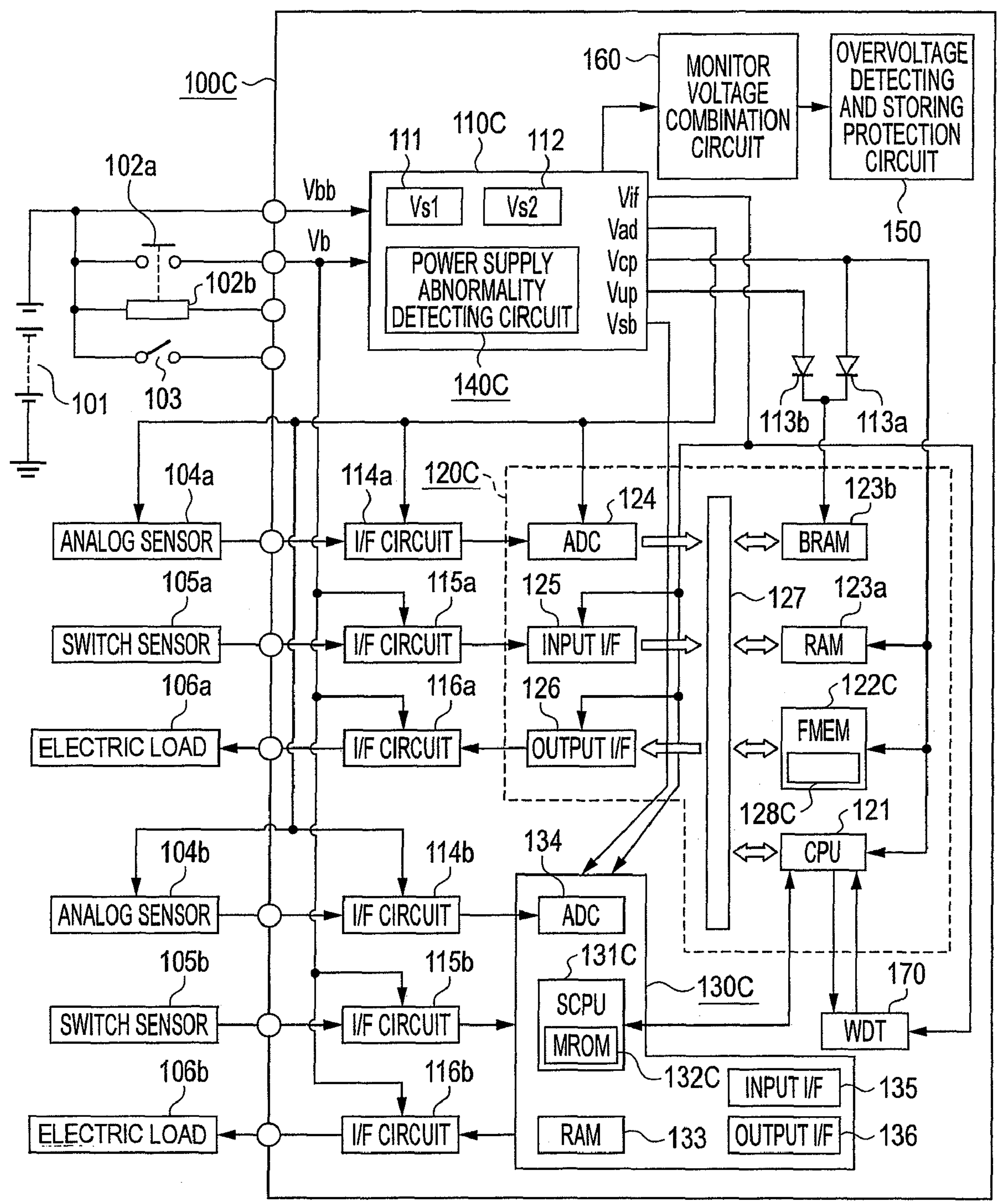
FIG. 9 is an overall circuit diagram showing a third embodiment of the in-vehicle mount electronic controller according to the present invention.

Furthermore, in the foregoing description, the monitor control circuit unit 131A is a logic circuit constructed by hardware. In place of this construction, sub CPUs 131B and 131C serving as soak timer circuits as second microprocessors, and auxiliary program memories 132B and 132C may be used as shown in FIGS. 5 and 9. When the combination control circuit unit 130A is required to be controlled in various styles of high degree of freedom, it is advantageous to use the microprocessor. However, when the control content is settled, the microprocessor is not necessarily required for any control, and the integrated circuit element may be easily implemented by a dedicated logic circuit.

Next, the over voltage detecting and storing protection circuit 150 will be described in detail with reference to FIG. 3.

Figure 3:
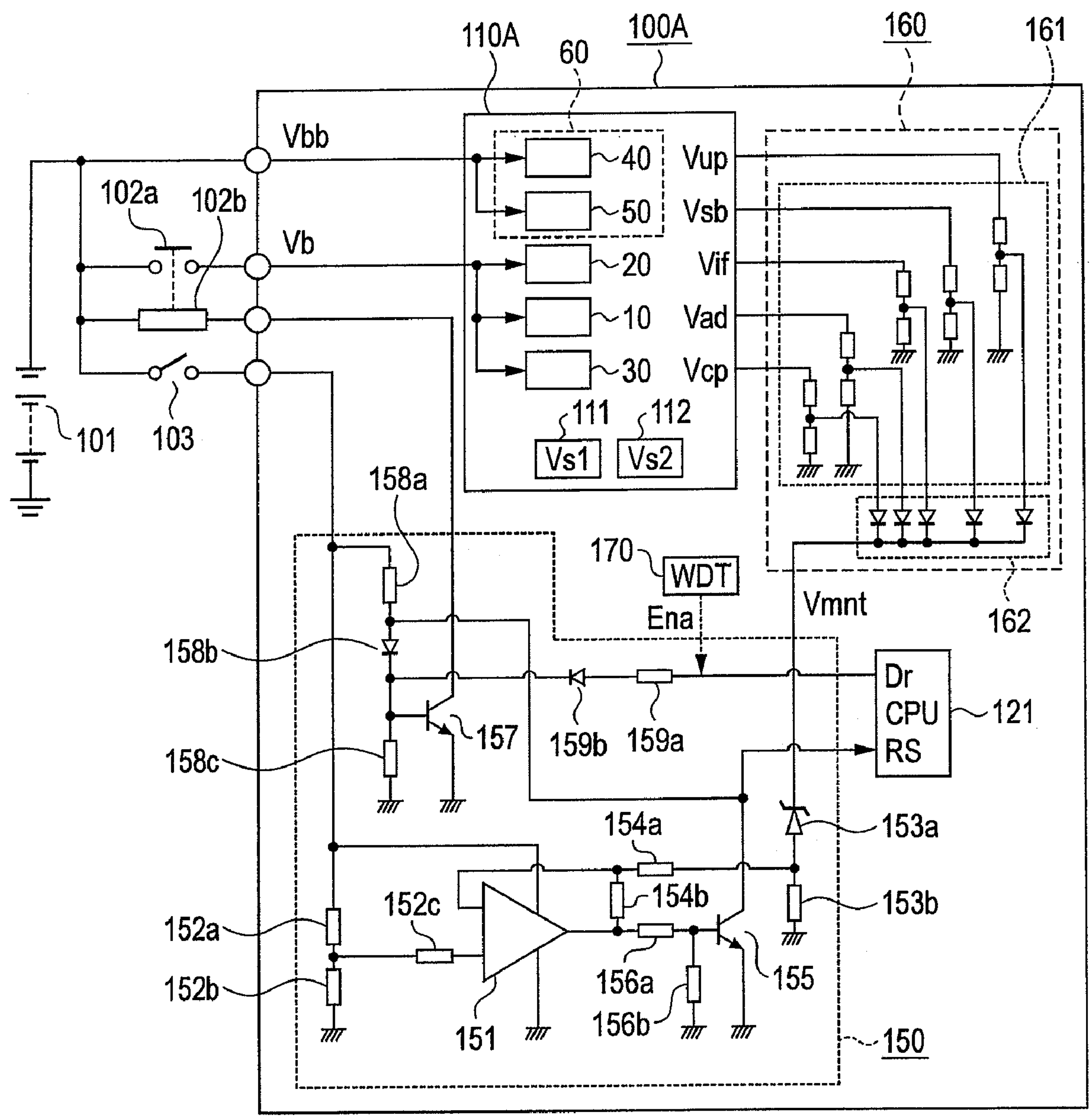
FIG. 3 is a detailed diagram showing an over voltage detecting and storing protection circuit and a monitor voltage combining circuit according to the first embodiment.

In FIG. 3, the over voltage detecting and storing protection circuit 150 is mainly constructed by a judgment storing circuit 151, a driving stop transistor 155 and a driving transistor 157 of the power supply relay. The judgment storing circuit 151 is constructed by a comparison circuit. The voltage dividing resistors 152*a* and 152*b* are connected to each other in series, and supplied with power from the power supply switch 103. The voltage achieved at the voltage dividing point of these voltage dividing resistors 152*a* and 152*b* is supplied to the negative side input terminal of the judgment storing circuit 151 through the negative side input resistor 152*c*. A constant-voltage diode 153*a* and a detecting resistor 153*b* are connected to each other in series, and supplied with a composite monitor voltage Vmnt from the monitor voltage combination circuit 160. The voltage across both the ends of the detecting resistor 153*b* is supplied to the positive side input terminal of the judgment storing circuit 151 through a positive side input resistor 154*a*. The output terminal of the judgment storing circuit 151 is connected to the positive input terminal thereof through a positive feedback resistor 154*b*, and also conductively drives a driving stop transistor 155 through a base resistor 156*a*. An open-circuit stabilizing resistor 156*b* is connected between the base and emitter terminals of the driving stop transistor 155 formed of an NPN type transistor.

The judgment comparing circuit 151 is directly supplied with power from the power supply switch 103, and when the power supply switch 103 opens the circuit, the abnormality storing state is reset and the driving stop transistor 155 keeps the non-conduction state.

One end of the exciting coil 102*b* of the power supply relay is connected to the in-vehicle mount battery 101, and the other end thereof is controlled to be opened/closed by a driving transistor 157 of the power supply relay. A driving resistor 158*a* and a diode 158*b* are connected to each other in series, and connected between the power supply switch 103 and the base terminal of the driving transistor 157. An open-circuit stabilizing resistor 158*c* is connected between the base and emitter terminals of the driving transistor 157 formed of an NPN type transistor. A driving resistor 159*a* and a diode 159*b* are connected to each other in series, and connected between the output terminal of the self-holding driving instruction Dr of the microprocessor 121 and the base terminal of the driving transistor 157. A normal driving signal Ena generated by the watchdog timer circuit 170 may be used in place of the self-holding driving instruction Dr of the microprocessor 121. The collector terminal of the driving stop transistor 155 is connected to the reset input terminal of the microprocessor 121, and connected to the connection point between the driving resistor 158*a* and the diode 158*b* arranged in the base circuit of the driving transistor 157.

The monitor voltage combination circuit 160 contains a voltage dividing circuit 161 and a diode circuit 162. The voltage dividing circuit 161 contains five voltage dividing resistors corresponding to the first to fifth output voltages Vad, Vif, Vcp, Vup and Vsb of the constant-voltage power supply source 110A, respectively. The diode circuit 162 contains five diodes connected to the respective voltage dividing points of the voltage dividing circuit 161. The monitor voltage combination circuit 160 divides each of the first to fifth output voltages Vad, Vif, Vcp, Vup and Vsb by the respective voltage dividing resistors of the voltage dividing circuit 161, combines the divided voltages achieved at the voltage dividing points of the respective voltage dividing resistors by the respective diodes of the diode circuit 162, and outputs the composite monitor voltage Vmnt. When each of the first to fifth output voltages Vad, Vif, Vcp, Vup and Vsb is coincident with the corresponding target output voltage, the voltage dividing ratio of the respective voltage dividing resistors of the voltage dividing circuit 161 is set so that the divided voltages achieved at the voltage dividing points of the respective voltage dividing resistors of the voltage dividing circuit 161 are coincident with one another.

(2) Detailed Description of Action and Operation

Next, the action and operation of the in-vehicle mount electronic controller 100A constructed as shown in FIG. 1 will be described in detail.

First, in FIG. 1, when the power source switch 103 closes the circuit, the exciting coil 102*b* of the power supply relay is energized, and the output contact point 102*a* closes the circuit. By the circuit-closing of the output contact point 102*a*, the main power supply voltage Vb from the in-vehicle mount battery 101 is supplied to the in-vehicle mount electronic controller 100A, the constant-voltage power supply source 110A generates the first, second, third and fifth output voltages Vad, Vif, Vcp, Vsb in addition to the fourth output voltage Vup, and the microprocessor 121 starts the operation. The microprocessor 121 generates a control output signal in accordance with the operation states of the first and second analog sensors 104*a* and 104*b* and the first and second switch sensors 105*a* and 105*b* and the control program stored in the non-volatile program memory 122A, and drive-controls the first and second in-vehicle mount electronic loads 106*a* and 106*b*.

Various kinds of abnormality occurrence information and learning storage information occurring during the operation of the microprocessor 121 are stored in the backup memory 123*b*, and a part of these information is stored and saved in the non-volatile data memory 128A. Even when the output contact point 102*a* of the power supply relay opens the circuit, the backup memory 123*b* holds the storage content by the fourth output voltage Vup achieved by dropping the auxiliary power supply voltage Vbb.

However, when the in-vehicle battery 101 suffers abnormal voltage drop or when the input terminal of the auxiliary power supply voltage Vbb is opened because of exchange of the in-vehicle mount battery 101, the storage information of the backup memory 123*b* is vanished, and thus some important data are stored and saved in the non-volatile data memory 128A.

Next, in FIG. 3, the exciting coil 102*b* of the power supply relay is energized through the driving transistor 157 because the power supply switch 103 closes the circuit, and the energization state of the exciting coil 102*b* is self-held by a self-holding driving instruction Dr of the microprocessor 121 or a normal driving signal Ena generated by the watchdog timer circuit 170. Accordingly, when the microprocessor 121 temporarily starts the operation, the electrical conduction of the driving transistor 157 is kept even when the power supply switch 103 opens the circuit. When the microprocessor 121 completes initialization, retraction processing, etc. and stops the operation by itself, the driving transistor 157 is interrupted, and the exciting coil 102*b* of the power supply relay is deenergized, so that the output contact point 102*a* opens the circuit.

However, even under the state that the power supply switch 103 closes the circuit, when the driving stop transistor 155 is conducted, the base current of the driving transistor 157 supplied from the driving resistor 158*a* is bypassed by the driving stop transistor 155 and cut off, and the reset signal RST of the microprocessor 121 is set to the logic level "L", so that the microprocessor 121 stops the operation. As a result, the driving transistor 157 is set to the non-conduction state, and the exciting coil 102*b* of the power supply relay is deenergized.

The divided voltage of the voltage dividing resistor 152*b* is applied to the negative side input terminal of the judgment storing circuit 151. However, the voltage across both the ends of the detecting resistor 153*b* which is applied to the positive side input terminal of the judgment storing circuit 151 is normally equal to zero. Therefore, the output of the judgment storing circuit 151 is normally set to logical level "L", and the driving stop transistor 155 is set to the non-conduction state. However, when the composite monitoring voltage Vmnt is excessively large and exceeds a threshold voltage of the constant-voltage diode 153*a*, the voltage across both the ends of the detecting resistor 153*b* increases and finally the judgment storing circuit 151 operates inversely. Accordingly, when the output of the judgment storing circuit 151 is set to logical level "H", this state is kept by the positive feedback resistor 154*b*, and the operation of the microprocessor 121 is stopped, and the exciting coil 102*b* of the power supply relay is deenergized.

Next, the abnormality detecting operation in the power supply abnormality detecting circuit 140A shown in FIG. 2 will be described with reference to the flowchart of FIG. 4. In FIG. 4, a step 400 is a start step of an abnormality check operation of the microprocessor 121 for the constant-voltage power supply circuits 10, 20, 30, 40, 50. A subsequent step 401 is a step of successively setting and renewing the judgment number n to 2, 3, 4 and 5 and successively making the analog switches 22*b*, 32*b*, 42*b*, 52*b* close the circuit to successively read out the measurement voltages V20, V30, V40 and V50. In this step 401, n is equal to 2 in the first operation, and the analog switch 22*b* is controlled to close the circuit, thereby reading out the measurement voltage V20.

In subsequent step 402, it is judged whether the digital conversion value of the measurement voltage V20 read out in step 401 is a normal value within a permissible zone data range which is stored in the non-volatile program memory 122A in advance. If the digital conversion value of the measurement voltage V20 is a normal value, the judgment result of the step 402 is YES, and thus the processing shifts to step 403. If the digital conversion value of the measurement voltage V20 is not a normal value, the judgment result of the step 402 is NO, and thus the processing shifts to step 406.

In step 403, the content of the initial value storage address of the non-volatile program memory 122A or the non-volatile data memory 128A is checked to confirm whether the initial value of the measurement voltage V20 at the shipping inspection time has been already stored. If the initial value of the measurement voltage V20 has been already stored, the judgment result of the step 403 is NO, and thus the processing shifts to the step 405. If the initial value of the measurement voltage V20 is not stored, the judgment result of the step 403 is YES, and thus the processing shifts to step 404. In step 404, the present value of the measurement voltage V20 read out in step 401 is set as initial value data and written into an initial value storage address of the non-volatile program memory 122A or the non-volatile data memory 128A, and subsequently the processing shifts to an operation end step 408. In the operation end step 408, another control program is executed, and the processing returns to the step 400 again within a predetermined time to repetitively execute the following flow.

In step 405, there is calculated the deviation between the present value of the measurement voltage V20 read out in step 401 and the initial value data which has been already written and saved is calculated, and it is judged whether the deviation concerned is a normal value within a permissible variation data range which is stored in the non-volatile program memory 122A in advance. If the deviation between the present value of the measurement voltage V20 and the initial value data is excessively larger than the normal value, the judgment result of the step 405 is YES, and the processing shifts to step 406. If the deviation between the present value of the measurement voltage V20 and the initial value data is a normal value, the judgment result of the step 405 is NO, and the processing shifts to step 407. In step 406, the fact that the measurement voltage V20 as the present judgment target is abnormal is temporarily stored and then the processing shifts to step 407. The step 407 is a step of judging whether the individual abnormality judgment has been completed, and if the judgment number n is equal to 4 or less, the judgment result of the step 407 is NO, and the processing returns to the step 401.

When the processing returns to the step 401, in step 401, the judgment number n is renewed to n=3, and the steps 401 to 407 are repeated to make the individual abnormality judgment for the measurement voltage V30. When the individual abnormality judgment of the measurement voltage V30 is finished and the processing returns to the step 401 again, in step 401, the judgment number n is renewed to n=4, and the steps 401 to 407 are repeated to make the individual abnormality judgment for the measurement voltage V40. When the individual abnormality judgment of the measurement voltage V40 is finished and the processing returns to step 401 again, in step 401, the judgment number n is renewed to n=5, and the steps 401 to 407 are repeated to make the individual abnormality judgment of the measurement voltage V50. The judgment of the individual abnormality for these measurement voltages V30, V40, V50 is carried out in the same manner as the individual abnormality judgment for the measurement voltage V20. In the individual abnormality judgment of the measurement voltages V30, V40, V50, if abnormality is detected, the fact that the abnormality exists is temporarily stored in step 406.

If the judgment number n is equal to 5, the judgment result of the step 407 is YES, and the processing shifts to step 410*a*. A step block 409 constructed by the steps 401 to 408 constitutes an individual abnormality detecting section, the step 402 constitutes a zone abnormality detecting section and the step 405 constitutes a variation abnormality detecting section.

A step 410*a* executed after the judgment result of the step 407 is YES and the individual judgment is completed constitutes a preferential judgment section. This step 410*a* is executed when the fourth and fifth constant-voltage power supply circuits 40 and 50 have the same level constant-voltage precision as the first constant-voltage power supply circuit 10. When the abnormality of the measurement voltages V40, V50 corresponding to the fourth and fifth output voltages Vup, Vsb is temporarily stored in step 406, it is judged in step 410*a* that the first constant-voltage power supply circuit 10 is suspicious. The sub sequent step 410*b* is a step constituting a comprehensive abnormality judging section. The subsequent step 410*b* is a system for extracting abnormality of a specific constant-voltage power supply circuit estimated on the basis of the individual judgment results of the four measurement voltages V20, V30, V40, V50 corresponding to the judgment number n=2, 3, 4 and 5. For example, if only the measurement voltage V20 corresponding to the judgment number n=2 is abnormal, it is judged that the second constant-voltage power supply circuit 20 is abnormal. If only the measurement voltage V30 corresponding to the judgment number n=3 is abnormal, it is judged that the third constant-voltage power supply circuit 30 is abnormal. Likewise, if only the measurement voltage V40 corresponding to the judgment number n=4 is abnormal, it is judged that the fourth constant-voltage power supply circuit 40 is abnormal. If only the measurement voltage V50 corresponding to the judgment number n=5 is abnormal, it is judged that the fifth constant-voltage power supply circuit 50 is abnormal. If plural measurement voltages corresponding to plural judgment numbers n are abnormal, the abnormality of the first constant-voltage power supply circuit 10 or the abnormality of AD conversion of the multi-channel AD converters 124, 134 is suspicious.

The subsequent step 411 is a step of judging the presence or absence of abnormality by judging whether abnormality exists in the judgment of the step 402, 405. If no abnormality is confirmed in the judgment of the steps 402, 405, the judgment result of the step 411 is NO, and the processing shifts to step 414. If abnormality exists in any one of the judgments of the steps 402 and 405, the judgment result of the step 411 is YES, and the processing shifts to step 412. The step 412 is a step of constituting a part of an abnormality occurrence record storing section. In step 412, every abnormality mode which is temporarily stored in step 406, in other words, the abnormality detection frequency corresponding to the step 402 and the step 405 is accumulatively added and an abnormality state is settled on the basis of the abnormality detection of a predetermined frequency to prevent misjudgment. The subsequent step 413 is a step constituting an abnormality processing section, and executes abnormality report or fail safe processing in connection with occurrence of abnormality. Subsequently to the step 413, the processing shifts to step 414. In the step 413 constituting the abnormality processing section, first to third abnormality processing sections 413*a*, 413*b*, 413*c* described later are executed. As a general theory, the opening degree of the throttle valve is reduced so as to suppress the rotational speed of the engine, and the operation of the convenient function associated with safety is stopped.

The step 414 is a step of judging whether it is a transfer retraction timing of the abnormality occurrence record information. During a time period when the output contact point 102*a* of the power supply relay tentatively closes the circuit after the power supply switch 103 opens the circuit, the judgment result of the step 414 is YES, and the processing shifts to step 415. When the power supply switch 103 closes the circuit, the judgment result of the step 414 is NO, and the processing shifts to the operation end step 408.

The step 415 is a step of transmitting abnormality information, and stores the presence or absence of settlement abnormality of each abnormality mode stored in the backup RAM memory 123*b* in step 412 into a memory of an address based on each abnormality mode of the non-volatile data memory 128A.

When the power supply switch 103 opens the circuit, the other various kinds of initialization processing are executed and then the microprocessor 121 stops the operation. In connection with this stop of the microprocessor 121, the exciting coil 102*b* of the power supply relay is deenergized, and the output contact point 102*a* opens the circuit. Furthermore, when the power supply switch 103 closes the circuit, the other control program is executed in the operation end step 408, and the operation start step 400 is activated again within a predetermined time to execute the subsequent flow.

The step block 420 constructed by the steps 410*a* to 415 constitutes a comprehensive judgment processing section. It makes majority decision on the basis of the individual abnormality detection result of the individual abnormality detecting section 409 by the comprehensive abnormality judging section 410*b*, and saves abnormality occurrence record in the steps 412, 415. In addition, the first to third abnormality processing sections 413*a*, 413*b*, 413*c* are executed in the step 413.

Summing up the above control flow, with respect to the step block 409 constituting the individual abnormality detecting section, in the step 402 constituting the zone abnormality detecting section and the step 405 constituting the variation abnormality detecting section, the permissible zone data for detecting zone detection, and initial value data and permissible variation data for detecting variation abnormality are stored in the non-volatile program memory 122A, and actually measured data of respective output voltages Vad, Vif, Vcp, Vup, Vsb which are measured at the outside by a high-precision voltmeter as test equipment at the shipping inspection stage are actively used for the permissible zone data, the initial value data and the permissible variation data stored in the non-volatile program memory 122A. Each of the output voltages Vad, Vif, Vcp, Vup and Vsb is not equal to the output voltage based on a design theory value due to solid variation of parts constituting each of the constant-voltage power supply circuits 10, 20, 30, 40, 50, and thus each output voltage contains an error component. If such an error component is actually measured in advance and it is stored as a correcting constant in the non-volatile program memory 122A or the non-volatile data memory 128A, the abnormality judgment can be performed while error correction is carried out at the driving stage.

In this case, the microprocessor 121 can know an accurate output voltage which is subjected to error correction at the driving stage. However, when the purpose is to merely make only the abnormality judgment, the correcting constant is not required. In this case, for example, the digital conversion value of a real measurement voltage V30 (see FIG. 2) corresponding to the constant-voltage precision DC 3.3V±0.3V in the third output voltage Vcp is measured, and this permissible zone digital value is stored as a permissible zone digital value in the non-volatile program memory 122A or the non-volatile data memory 128A. The same is applied to the initial value data and the permissible variation data, and there are a method of making the abnormality judgment by using stored correcting data and a method of storing initial digital value and permissible variation digital value containing correcting information as initial value data and permissible variation data in advance and eliminating the correcting processing at the abnormality judging stage may be used. The subject matter of the present invention of this application can be achieved according to each of both the methods.

Furthermore, when the correcting processing of all products at the shipping inspection stage is required to be avoided, the permissible zone digital values, the initial digital values and the permissible variation digital values of many product samples may be measured and statically calculated to achieve the respective average data thereof, and the statically calculated average data may be stored in the non-volatile program memory 122A or the non-volatile data memory 128A.

In the step block 420 constituting the comprehensive judgment processing section, when any one of the fourth and fifth constant-voltage power supply circuits 40 and 50 has high-precision output voltage Vup, Vsb and also the individual abnormality judgment result of the measurement voltage V40 corresponding to the fourth output voltage Vup or the individual abnormality judgment result of the measurement voltage V50 corresponding to the fifth output voltage Vsb is abnormal, the preferential judgment section 410*a* judges that the first constant-voltage power supply circuit 10 and the fourth or fifth constant-voltage power supply circuit 40 or 50 may have abnormality. Furthermore, when both the fourth and fifth constant-voltage power supply circuits 40 and 50 have high-precision output voltages Vup and Vsb and also both the individual abnormality judgment result of the measurement voltage V40 corresponding to the fourth output voltage Vup and the individual abnormality judgment result of the measurement voltage V50 corresponding to the fifth output voltage Vsb are abnormal, it is judged that the first constant-voltage power supply circuit 10 may have abnormality. When the individual abnormality judgment result of the measurement voltage V40 corresponding to the fourth output voltage Vup is normal, but the individual abnormality judgment result of the measurement voltage V50 corresponding to the fifth output voltage Vsb is abnormal, it is judged that the fifth constant-voltage power supply circuit 50 is abnormal. If the individual abnormality judgment result of the measurement voltage V50 corresponding to the fifth output voltage Vsb is normal, but the individual abnormality judgment result of the measurement voltage V40 corresponding to the fourth output voltage Vup is abnormal, it is judged that the fourth constant-voltage power supply circuit 40 is abnormal. In accordance with the abnormality detection result of the individual abnormality detecting section 409, the comprehensive abnormality judging section 410*b* comprehensively analyzes and estimates which output voltage of the first to third output voltages Vad, Vif, Vcp and the fourth and fifth output voltages Vup and Vsb has abnormality, and when plural output voltages using the same comparison reference voltage are judged to be abnormal, the comprehensive abnormality judging section 410*b* serves as a majority decision judgment section for judging that the comparison reference voltage is abnormal.

When the precision of the second and third output voltages Vif, Vcp or the fifth output voltage Vsb is judged to be abnormal on the basis of the estimation result of the comprehensive abnormality judging section 410*b*, the first abnormality processing section 413*a* reports abnormality or stores at least an abnormality occurrence record.

When the precision of the first output voltage Vad is suspected to be abnormal on the basis of the estimation result of the comprehensive abnormality judging section 410*b*, the second abnormality processing section 413*b* reports abnormality or stores at least an abnormality occurrence record, and replaces the input signal achieved from the analog sensors 104*a*, 104*b* by a predetermined control constant at the safety side or the correction replacement data as a correcting signal. With respect to the correcting signal applied in the second abnormality processing section 413*b*, for analog sensors whose detection outputs are varied in accordance with variation of the power supply voltage, a correcting coefficient corresponding to each analog sensor is multiplied or a correcting bias is arithmetically added, and the correcting coefficient or the correcting bias is stored as correction replacement data in the non-volatile program memory 122A in advance.

When the precision of the fourth output voltage Vup is suspected to be abnormal on the basis of the estimation result of the comprehensive abnormality judging section 410*b*, the third abnormality processing section 413*c* reports abnormality or stores at least an abnormality occurrence record. In addition, a variable control constant which learns and memorizes in the backup memory 123*b* during driving is replaced by the control constant which is transferred and stored in the non-volatile data memory 128A or the reference control constant stored in the non-volatile program memory 122A.

In the foregoing description, no description is made to selective use of the reference voltage generating circuits 111 and 112. However, for example, by setting the first to third constant-voltage power supply circuits 10, 20, 30 as a first group using a first reference voltage generating circuit 111 and setting the fourth and fifth constant-voltage power supply circuits 40 and 50 as a second group using a second reference voltage generating circuit 112, even when the output voltage of the reference voltage generating circuit has abnormality, it can be detected by the individual abnormality detecting section 409 and the comprehensive abnormality judging section 410*b*. If the first to third constant-voltage power supply circuits 10, 20, 30 are subjected to negative feedback control by the output voltage of the same reference voltage generating circuit and the output voltage of this reference voltage generating circuit is abnormally varied, it may be impossible to detect abnormality for some digital conversion values of the measurement voltages V20, V30 corresponding to the second and third output voltages Vif, Vcp. In this case, the reference voltage generating circuits are set up as a double system, and the fourth and fifth output voltages Vup and Vsb are monitored, whereby the abnormality between the reference voltage generating circuits of the double system can be detected.

(3) Summary and Effect of First Embodiment

The in-vehicle mount electronic controller 100A having the microprocessor 121 for drive-controlling the in-vehicle mount electronic load groups 106*a*,106*b* in accordance with the operation states of the in-vehicle mount sensor groups 104*a*, 104*b*, 105*a*, 105*b* and the contents of the control programs stored in the non-volatile program memory 122A, the combination control circuit unit 130A that is serially connected to the microprocessor 121 to mediate and connect some input/output signals, the constant-voltage power supply source 110A for supplying power to the microprocessor 121, the combination control circuit unit 130A and the input/output interface circuits therefore, and the power supply abnormality detecting circuit 140A for detecting abnormality of the constant-voltage power supply source 110A.

The in-vehicle mount electronic controller 100A is characterized in that, the constant-voltage power supply 110A contains the plural constant-voltage power supply circuits 10, 20, 30, 60 supplied with power form the in-vehicle mount battery 101, the respective constant-voltage power supply circuits 10,20,30,60 being subjected to negative feedback control so as to be proportional to the reference voltages Vs1, Vs2 generated by the reference voltage generating circuits 111, 112 to thereby generate the output voltages Vad, Vif, Vcp, Vup, Vsb having the predetermined permissible variable band width, the power supply abnormality detecting circuit 140A contains the judgment signal input circuit 142A which cooperates with at least one of the microprocessor 121 and the combination control circuit unit 130A to detect individual abnormality for each of plural monitor target output voltages selected from plural output voltages generated by the constant-voltage power supply source 110A, at least one of the microprocessor 121 and the combination control circuit unit 130A further contains the individual abnormality detecting section 409 and the comprehensive judging processing section 420, the judgment signal input circuit 142A inputs the relative voltage information between each output voltage and the comparison reference voltage with respect to each of the plural monitor target output voltages to at least one of the microprocessor 121 and the combination control circuit unit 130A, at least one of a voltage proportional to the predetermined output voltage having high constant-voltage control precision (specifically, the first output voltage Vad) among the plural output voltages generated by the constant-voltage power supply source 110A and the reference voltage generated by the reference voltage generating circuit is used as the comparison reference voltage, the individual abnormality detecting section 409 individually detects, on the basis of the relative voltage information input from the judgment signal input circuit 142A, the presence or absence of band abnormality as to whether each of the plural monitor target output voltages is a voltage value within each permissible variation band, and the comprehensive judging processing section 420 makes a comprehensive judgment containing the presence or absence of abnormality of the comparison reference voltage when it is detected by the individual abnormality detecting section 409 that individual abnormality is detected in at least one of the plural target output voltages, and carries out at least one of reporting of abnormality and storing of abnormality occurrence information.

As described above, the in-vehicle mount electronic controller 100A according to the first embodiment detects the presence or absence of individual abnormality and comprehensively judges individual abnormality individually by making the band comparison as to whether each of the output voltages of the plural constant-voltage power supply circuits is within the permissible variation width, by using the output voltage of the constant-voltage power supply circuit having high output voltage precision in the plural constant-voltage power supply circuits as the comparison reference voltage, thereby executing abnormality processing.

Accordingly, the presence or absence of the band abnormality can be individually accurately detected for the plural constant-voltage power supply circuits by using the high-precision comparison reference voltage, and also precision abnormality of the output voltage is detected as risk prediction information and abnormality is reported or abnormality occurrence record is stored before the microprocessor or the combination control circuit unit falls into an operation stop state. Therefore, there is an effect that maintenance check can be performed before an abnormal-decrease or abnormal-increase accident occurs or risk prediction can be performed by periodic check.

Furthermore, there is also an effect that not only individual abnormality can be detected, but also identification information as to which constant-voltage power supply circuit falls into an individual abnormality state or whether the comparison reference voltage itself is abnormal or not is added to report abnormality or store abnormality record information, thereby facilitating maintenance check.

Furthermore, in the in-vehicle mount electronic controller 100A according to the first embodiment, the constant-voltage power supply source 110A contains first, second and third constant-voltage power supply circuits 10, 20, 30 and the additional constant-voltage power supply circuit 60, the first constant-voltage power supply circuit 10 is a power supply circuit for generating the first output voltage Vad which is smaller in load current, but higher in precision as compared with the second and third constant-voltage power supply circuits 20, 30, the first constant-voltage power supply circuit 10 is used as a power supply for the first multi-channel AD converter 124 which directly inputs to the microprocessor, the first analog interface circuit 114*a* and at least a part of the first analog sensor 104*a*, the first constant-voltage power supply circuit 10 is also used as a power supply for the second multi-channel AD converter 134, the second analog interface circuit 114*b* and at least a part of the second analog sensor 104*b* when the combination control circuit unit 130A is connected to the second analog sensor 104*b* through the second multi-channel AD converter 134 and the second analog interface circuit 114*b*, the second constant-voltage power supply circuit 20 is a power supply circuit which has larger load current than the first constant-voltage power supply circuit 10 and generates the second output voltage Vif which has the same level as the first output voltage Vad, but is lower in constant-voltage control precision, the second constant-voltage power supply circuit 20 is used as a power supply for input/output interface circuits 125, 126 in the microprocessor 121 and input/output interface circuits 135, 136 in the combination control circuit unit 130A, the third constant-voltage power supply circuit 30 is a power supply circuit for generating the third output voltage Vcp which is a voltage different from the first output voltage Vad, the third constant-voltage power supply circuit 30 is used as a power supply for the calculating section of the microprocessor 121, the non-volatile program memory 122A and RAM memory 123*a* for calculation processing, and the additional constant-voltage power supply circuit 60 contains a power supply circuit for generating the additional output voltage having the same level constant-voltage control precision as the first output voltage Vad.

According to this construction, a load-based selective use style in which a low-precision large-capacity power supply having the same level voltage as a high-precision small-capacity power supply and a different-voltage large-capacity power supply are properly selectively used is adopted. Accordingly, by limiting the application of the high-precision power supply, a power supply which is inexpensive as a whole can be constructed.

Furthermore, when plural high-precision constant voltage outputs are required as the comparison reference voltage, the constant-voltage precision of the additional constant-voltage power supply circuit is the same level as the first output voltage. Accordingly, in order to judge whether the first output voltage is normal or not, another high-precision output voltage can be used as the comparison reference voltage.

Still furthermore, the in-vehicle mount electronic controller 100A according to the first embodiment is characterized in that the first, second and third constant-voltage power supply circuits 10, 20, 30 are supplied with power from the in-vehicle mount battery 101 to generate the first, second and third output voltages Vad, Vif, Vcp by closing the power supply switch 103, the additional constant-voltage power supply circuit 60 contains at least one of the fourth constant-voltage power supply circuit 40 and the fifth constant-voltage power supply circuit 50, the fourth constant-voltage power supply circuit 40 is a power supply circuit of low power consumption which is supplied with power from the in-vehicle mount battery 101 to generate the fourth output voltage Vup even under the state that the power supply switch 103 is opened, the fourth constant-voltage power supply circuit 40 is a power supply circuit used as a power supply for at least one of the backup memory 123*b* of the microprocessor 121 and the auxiliary RAM memory 133 of the combination control circuit unit 130A, the fifth constant-voltage power supply circuit 50 is a power supply which is supplied with power from the in-vehicle mount battery 101 to generate the fifth output voltage Vsb different from the first output voltage vad under only the state that the power supply switch 103 is closed, and is lower in power consumption than the second and third constant-voltage power supply circuits 20, 30, the fifth constant-voltage power supply circuit 50 is used as a power supply for the monitor control circuit 131A in the combination control circuit unit 130A, the monitor control circuit 131A is a circuit for inputting the monitor input signal from the in-vehicle mount sensor groups 104*b*, 105*b* to the microprocessor 121, and drive-controlling the in-vehicle mount load group 106*b* on the basis of the control output signal from the microprocessor 121, and at least one of the fourth and fifth output voltages Vup and Vsb has the same level constant-voltage control precision as the first output voltage Vad and is output as the additional output voltage.

According to this construction, the additional constant-voltage power supply circuit contains at least one of the fourth constant-voltage power supply circuit and the fifth constant-voltage power supply circuit which have the same level output voltage as the first output voltage. The fourth constant-voltage power supply circuit is directly supplied with power from the in-vehicle mount battery, and thus it can hold the storage state of some RAM memory even under the state that the power supply switch is interrupted and thus the power supply to the first to third constant-voltage power supply circuits is interrupted.

Furthermore, the output voltages of the fourth and fifth constant-voltage power supply circuits do not originally require high constant-voltage precision. However, it has small load current, and also little variation of the load current because it does not supply power to elements other than a first integrated circuit element mainly comprising the microprocessor or a second integrated circuit element constituting the combination control circuit unit, so that the constant-voltage precision can be relatively easily enhanced.

Still furthermore, the in-vehicle mount electronic controller 100A according to the first embodiment is characterized in that at least one of the first and second multi-channel AD converters 124,134 constitutes a part of the judgment signal input circuit 142A, directly receives the voltage V20 proportional to the monitor target output voltage Vif or the monitor target output voltages Vcp, Vup, Vsb, converts plural monitor voltages to digital values with the first output voltage Vad set as a reference voltage Vref for AD conversion, and sets the digital values proportional to the rate of the monitor target output voltages and the reference voltage as the relative voltage information.

According to this construction, the first or second multi-channel AD converter constitutes a part of the judgment signal input circuit, obtains the digital conversion value proportional to the rate of the monitor target output voltage and the reference voltage by setting the first output voltage Vad as the reference voltage and sets the obtained digital conversion value as relative voltage information. Accordingly, permissible band data for detecting individual abnormality are extracted on the basis of experiment data based on many samples, and the extracted data are stored in a non-volatile program memory, whereby the abnormality detection can be performed without requiring any hardware circuit for abnormality judgment.

Furthermore, when all the measurement voltages are not normal, the first output voltage is suspected, and it is also assumed that the multi-channel AD converter is abnormal, so that occurrence of abnormality of the multi-channel AD converter can be detected.

Still furthermore, the in-vehicle mount electronic controller 100A according to the first embodiment is characterized in that the comprehensive judging processing section 420 contains the comprehensive abnormality judging section 410*b*, and also contains at least one of first, second and third abnormality processing sections 413*a*, 414*b*, 413*c*, the comprehensive abnormality judging section 410*b* monitors the relative voltage information to analyze and estimate as a whole which output voltage of the plural monitor target output voltages is abnormal, and makes a majority decision judgment that the comparison reference voltage is judged to be abnormal when plural monitor target output voltages compared with the comparison reference voltage are abnormal, when the abnormality of the second, third and fifth output voltages Vif, Vcp, Vsb is detected on the basis of the judgment result of the comprehensive abnormality judging section 410*b* under the state that the additional constant-voltage power supply circuit 60 contains the fifth constant-voltage power supply circuit 50, the first abnormality processing section 413*a* carries out at least reporting of the abnormality concerned and storing of abnormality occurrence information of the abnormality concerned, when abnormality of the first output voltage Vad is detected on the basis of the judgment result of the comprehensive abnormality judging section 410*b*, the second abnormality processing section 413*b* carries out at least one of reporting of abnormality and storing of abnormality occurrence information of the abnormality concerned, and it substitutes correction replacement data at the safety side for the input signal obtained from the first analog sensor 104*a* and the input signal obtained form the second analog sensor 104*b* if the combination control circuit unit 130A is connected to the second analog sensor 104*b* through the second multi-channel AD converter 134 and the second analog interface circuit 114*b*, and when the fourth output voltage Vup is detected to be abnormal on the basis of the judgment result of the comprehensive abnormal judgment section 410*b* in the case where the additional constant-voltage power supply circuit 60 contains the fourth constant-voltage power supply circuit 40, the third abnormality processing section 413*c* carries out at least one of reporting of the abnormality and storing of abnormality occurrence information of the abnormality concerned, and replaces a variable control constant varying in the backup memory 123*b* because of learning and storage during driving by at least one of a control constant transferred to and stored in the non-volatile data memory 128A and a predetermined reference control constant pre-stored in the non-volatile program memory 122A.

According to this construction, the abnormality reporting or the storing of the abnormality record information is carried out in accordance with the occurrence of abnormality of each output voltage estimated on the basis of the comprehensive abnormality judging section, and also the correction processing of the analog signal is executed if the first output voltage is abnormal while the learning control constant is returned to the transfer saving information or the reference control constant if the fourth output voltage is abnormal. Accordingly, the precision abnormality of the output voltage which does not yet stop the operation of a watchdog timer circuit or the microprocessor is detected, and the abnormality is reported or the abnormality occurrence history is stored, whereby the abnormal decrease or abnormality increase trouble of the output voltage is expected, so that check maintenance is carried out before a critical trouble occurs or a risk can be predicted by periodic check.

Furthermore, the correction replacement data applied when the first output voltage is abnormal is based on the multiplication of a correction coefficient at the safety side and the present analog signal of each analog sensor or algebra addition of correction bias. Accordingly, the safety of control can be maintained by setting the proper correction coefficient and the correction bias every analog sensor.

Still furthermore, the in-vehicle mount electronic controller 100A according to the first embodiment is characterized in that the monitor control circuit unit 131A of the combination control circuit unit 130A is constructed by a hard logic circuit, and the monitor control circuit unit 131A executes a part of the processing of the comprehensive judging processing section 420.

According to this construction, the combination control circuit unit for serially communicating input/output signals with the microprocessor is provided, and the monitor control circuit unit provided to the combination control circuit unit takes partial charge of a part of the processing of the comprehensive judging processing section, so that it is unnecessary to directly input each measurement signal to the microprocessor, the number of input/output points of the expensive microprocessor executing at high speed can be saved and the control load imposed on the microprocessor can be reduced.

Still furthermore, the in-vehicle mount electronic controller 100A according to the first embodiment is characterized in that initial value data and permissible variation data at the shipping time concerning the plural monitor target output voltages are stored in any one of the non-volatile data memory 128A and the non-volatile program memory 122A in the in-vehicle mount electronic controller 100A, the individual abnormality detecting section 409 contains the variation abnormality detecting section 405, and the variation abnormality detecting section 405 judges whether a deviation voltage of each of the plural monitor target output voltages from the initial value data thereof is within the permissible variation data, thereby judging individual abnormality.

Accordingly to this construction, the initial value data and the permissible variation data to detect variation abnormality are extracted on the basis of experiment data achieved from actual measurement data based on actual articles and many samples, and the extracted data concerned are stored in a non-volatile program memory or a non-volatile data memory. Accordingly, the detection error based on solid variation of applied component constants is corrected, and abnormality can be accurately detected.

In a case where a variation of each output voltage from the initial value thereof is excessively large, it is added to the individual abnormality because occurrence of abnormality is predicted even when band abnormality is not detected, whereby safety can be enhanced.

Second Embodiment

(1) Detailed Description of Construction

FIG. 5 is an overall circuit diagram showing a second embodiment of the in-vehicle mount electronic controller according to the present invention. The construction of the second embodiment will be described in detail by concentrating on the difference from the first embodiment of FIG. 1 with reference to FIG. 5. In FIG. 5, the same reference numerals as FIG. 1 represent the same or corresponding parts.

In FIG. 5, a constant-voltage power supply source 110B in the in-vehicle mount electronic controller 100B of the second embodiment is characterized in that the output voltage Vif of the second constant-voltage power supply circuit 20 is used as an input voltage to the third constant-voltage power supply circuit 30 in place of the main power supply voltage Vb as described later with reference to FIG. 6, and thus the power consumption of the third constant-voltage power supply circuit 30 can be greatly suppressed. However, the power consumption cannot be suppressed as a whole, and thus a switching regulator is used as the second constant-voltage power supply circuit 20 to suppress the power consumption.

A flash memory is used as a non-volatile program memory 122B contained in a first integrated circuit element 120B, and a partial area thereof is used as a non-volatile data memory 128B. A combination control circuit unit 130B has a sub CPU 131B as a monitor control circuit unit 131B which additionally serves as a soak timer circuit. The sub CPU 131B is designed to cooperate with an auxiliary program memory 132B such as a mask ROM memory or the like and the auxiliary RAM memory 133.

A soak timer circuit which is supplied with power from the fifth output voltage Vsb at all times is constructed by the sub CPU 131B of low power consumption and small capacity. During the period when the power supply switch 103 is opened and the engine is stopped, the soak timer circuit based on the sub CPU 131B temporarily urges the exciting coil 102*b* of the power supply relay to re-start the microprocessor 121, monitors the operation states of some sensors of the first and second analog sensors 104*a*, 104*b* and the first and second switch sensors 105*a*, 105*b*, and detects and stores the presence or absence of abnormality.

The power supply abnormality detecting circuit 140B will be described later with reference to FIG. 6. An over voltage detecting and storing protection circuit 150 and a monitor voltage combination circuit 160 have the same construction as shown in FIG. 3.

Next, the power supply abnormality detecting circuit 140B according to the second embodiment will be described by concentrating on the different point from the power supply abnormality detecting circuit 140A of FIG. 2 with reference to FIG. 6. In FIG. 6, the same reference numerals as shown in FIG. 2 represent the same or corresponding parts.

Figure 6:
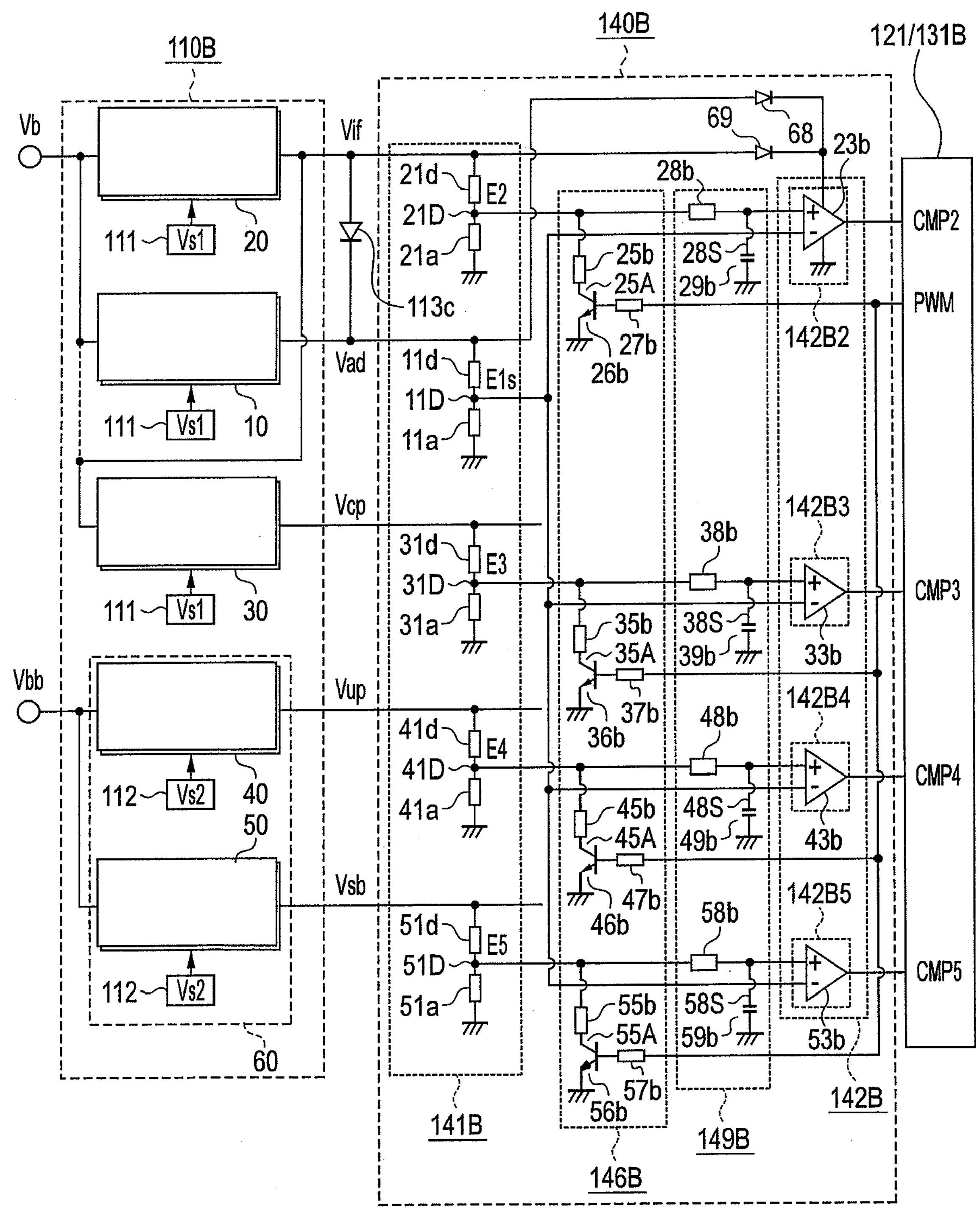
FIG. 6 is a detailed diagram showing a power supply abnormality detecting circuit according to the second embodiment.

In FIG. 6, the constant-voltage power supply source 110B contains the first to fifth constant-voltage power supply circuits 10, 20, 30, 40, 50. The first constant-voltage power supply circuit 10 drops the main power supply voltage Vb to generate the first output voltage Vad. The second constant-voltage power supply circuit 20 drops the main power supply voltage Vb to generate the second output voltage Vif. The third constant-voltage power supply circuit 30 drops the second output voltage Vif to generate the third output voltage Vcp. The third constant-voltage power supply circuit 30 may be supplied with the main power supply voltage Vb as indicated by a dashed line in FIG. 6 and drops the main power supply voltage Vb to generate the third output voltage Vcp. The fourth and fifth constant-voltage power supply circuits 40 and 50 drop the auxiliary power supply voltage Vbb to generate fourth and fifth output voltages Vup and Vsb. The fourth and fifth constant-voltage power supply circuits 40 and 50 constitute the additional constant-voltage power supply circuit 60.

The constant voltage values, constant-voltage precision and load current of the respective output voltages Vad, Vif, Vcp, Vup, Vsb of the first to fifth constant-voltage power supply circuits 10, 20, 30, 40, 50 of the constant voltage power supply source 110B are the same as the respective output voltages Vad, Vif, Vcp, Vup, Vsb of the first embodiment.

In the second embodiment, as in the case of the first embodiment, the first output voltage Vad is supplied to the first and the second multi-channel AD converters 124, 134, the first and second analog interface circuits 114*a*, 114*b* and parts of the first and second analog sensors 104*a*, 104*b*. The second output voltage Vif is supplied to the input/output interface circuits 125, 126, the combination control circuit unit 130B and the watchdog timer circuit 170. The third output voltage Vcp is supplied to the microprocessor 121, the non-volatile program memory 122B, the RAM memory 123*a* and the backup memory 123*b*. The fourth output voltage Vup is supplied to the backup memory 123*b* when the output contact point 102*a* of the power supply relay opens the circuit. The fifth output voltage Vsb is supplied to the monitor control circuit unit 132B in the combination control circuit unit 130B even when the output contact point 102*a* of the power supply relay is opened.

Each of the constant-voltage power supply circuits 10, 20, 30, 40 and 50 is constructed by a power transistor which is subjected to negative feedback continuous control so that the voltage proportional to each output voltage thereof is equal to a reference voltage Vs1 or Vs2 generated by the first or second reference voltage generating circuit 111, 112. Particularly, each of the first, third, fourth and fifth constant-voltage power supply circuits 10, 30, 40, 50 is constructed by a regulator which is generally called as a dropper type, however, the second constant-voltage power supply circuit 20 is constructed by a switching regulator based on ON/OFF duty control of the power transistor. In the switching regulator, the power consumption of the control transistor is small, and heating can be suppressed. However, no high-precision constant voltage is achieved. The third constant-voltage power supply circuit 30 is a dropper type regulator, however, the input voltage thereof is the stabilized second output voltage Vif, so that the power consumption can be suppressed. The saving diode 113*c* supplies power from the second constant-voltage power supply circuit 20 to the load circuit of the first constant-voltage power supply circuit 10 when the first output voltage Vad decreases abnormally or when the second output voltage Vif increases abnormally. When the first and second output voltages Vad and Vif are normal, the first output voltage Vad is set to a voltage higher than the voltage achieved by subtracting the voltage drop of the saving diode 113*c* from the second output voltage Vif, so that the saving diode 113*c* is set to OFF state, and no power supply from the second output voltage Vif to the analog system circuit is carried out.

As shown in FIG. 6, the power supply abnormality detecting circuit 140B contains a voltage dividing circuit 141B, a comparison signal input circuit 142B, a voltage dividing ratio correcting circuit 146B and a smoothing circuit 149B. The voltage dividing circuit 141B contains voltage dividing resistors 11*d* and 11*a* constituting a first voltage dividing circuit 11D, voltage dividing resistors 21*d* and 21*a* constituting the second voltage dividing circuit 21D, voltage dividing resistors 31*d* and 31*a* constituting a third voltage dividing circuit 31D, voltage dividing resistors 41*d* and 41*a* constituting a fourth voltage dividing circuit 41D, and voltage dividing resistors 51*d* and 51*a* constituting a fifth voltage dividing circuit 51D.

The voltage dividing resistors 11*d* and 11*a* of the first voltage dividing circuit 11D are constructed by a series circuit of high-precision resistors, which receives the first output voltage Vad and outputs a first divided voltage E1*s*. The voltage dividing resistors 21*d* and 21*a* of the second voltage dividing circuit 21D are constructed by a series circuit of high-precision resistors, which receives the second output voltage Vif and outputs a second divided voltage E2. The voltage dividing resistors 31*d* and 31*a* of the third voltage dividing circuit 31D are constructed by a series circuit of high-precision resistors, which receives the third output voltage Vcp and outputs a third divided voltage E3. The voltage dividing resistors 41*d* and 41*a* of the fourth voltage dividing circuit 41D are constructed by a series circuit of high-precision resistors, which receive the fourth output voltage Vup and outputs a fourth divided voltage E4. The voltage dividing resistors 51*d* and 51*a* of the fifth voltage dividing circuit 51D are constructed by a series circuit of high-precision resistors, which receives the fifth output voltage Vsb and outputs a fifth divided voltage E5.

The judgment signal input circuit 142B has second, third, fourth and fifth judgment signal input circuits 142B2, 142B3, 142B4, 142B5, and these second, third, fourth and fifth judgment signal input circuits 142B2, 142B3, 142B4, 142B5 respective contain the second, third, fourth and fifth comparison circuits 23*b*, 33*b*, 43*b* and 53*b*. In the second comparison circuit 23*b*, the first divided voltage E1*s* is input as a comparison reference voltage to the negative input terminal, and the second divided voltage E2 is input as a comparison target voltage to the positive input terminal. The second comparison circuit 23*b* generates a second comparison output CMP2 whose logic level is set to "H" when the value of the second divided voltage E2 exceeds the value of the first divided voltage E1*s*, and inputs the second comparison output CMP2 as the relative voltage information to the microprocessor 121.

Likewise, in the third comparison circuit 33*b*, the first divided voltage E1*s* is supplied as a comparison reference voltage to the negative input terminal, and the third divided voltage E3 is input as a comparison target voltage to the positive input terminal. The third comparison circuit 33*b* generates a third comparison output CMP3 whose logic level is set to "H" when the value of the third divided voltage E3 exceeds the value of the first divided voltage E1*s*, and inputs the third comparison output CMP3 as the relative voltage information to the microprocessor 121.

Likewise, in the fourth comparison circuit 43*b*, the first divided voltage E1*s* is input as a comparison reference voltage to the negative input terminal, and the fourth divided voltage E4 is input as a comparison target voltage to the positive input terminal. The fourth comparison circuit 43*b* generates a fourth comparison output CMP4 whose logic level is set to "H" when the value of the fourth divided voltage E4 exceeds the value of the first divided voltage E1*s*, and inputs the fourth comparison output CMP4 as the relative voltage information to the microprocessor 121.

Likewise, in the fifth comparison circuit 53*b*, the first divided voltage E1*s* is supplied as a comparison reference voltage to the negative input terminal, and the fifth divided voltage E5 is supplied as a comparison target voltage to the positive input terminal. The fifth comparison circuit 53*b* generates a fifth comparison output CMP5 whose logic level is set to H' when the value of the fifth divided voltage E5 exceeds the value of the first divided voltage E1*s*, and inputs the fifth comparison output CMP5 as the relative voltage information to the microprocessor 121.

The second comparison circuit 23*b* is supplied with power from the first and second output voltages Vad, Vif through diodes 68, 69. The power supply circuits to the third, fourth and fifth comparison circuits 33*b*, 43*b*, 53*b* are omitted from the illustration to simplify the figures, however, they are supplied with power from the first and second output voltages Vad, Vif through the diodes 68, 69 as in the case of the second comparison circuit 23*b*.

The voltage dividing ratio correcting circuit 146B contains the second, third, fourth and fifth correcting circuits 25A, 35A, 45A, 55A. The second correcting circuit 25A contains a voltage dividing resistor 25*b* and an opening/closing element 26*b*, and the voltage dividing resistor 25*b* and the opening/closing element 26*b* are connected to each other in series. This series circuit is connected to the voltage dividing resistor 21*a* in parallel when the opening/closing element 26*b* closes the circuit, and reduces the voltage dividing ratio of the second divided voltage E2. Likewise, the third correcting circuit 35A contains the voltage dividing resistor 35*b* and the opening/closing element 36*b*, and the voltage dividing resistor 35*b* and the opening/closing element 36*b* are connected to each other in series. This series circuit is connected to the voltage dividing resistor 31*a* when the opening/closing element 36*b* closes the circuit, and reduces the voltage dividing ratio of the third divided voltage E3. Likewise, the fourth correcting circuit 45A contains a voltage dividing resistor 45*b* and an opening/closing element 46*b*, and the voltage dividing resistor 45*b* and the opening/closing element 46*b* are connected to each other in series. This series circuit is connected to the voltage dividing resistor 41*a* in parallel when the opening/closing element 46*b* closes the circuit, and reduces the voltage dividing ratio of the fourth divided voltage E4. Likewise, the fifth correcting circuit 55A contains a voltage dividing resistor 55*b* and an opening/closing element 56*b*, and the voltage dividing resistor 55*b* and the opening/closing element 56*b* are connected to each other in series. This series circuit is connected to the voltage dividing resistor 51*a* in parallel when the opening/closing element 56*b* closes the circuit, and reduces the voltage dividing ratio of the fifth divided voltage E5.

Each of the opening/closing elements 26*b*, 36*b*, 46*b*, 56*b* is constructed by an NPN transistor. Each of the opening/closing elements 26*b*, 36*b*, 46*b*, 56*b* is opened/closed through each of driving resistors 27*b*, 37*b*, 47*b*, 57*b* on the basis of the correction instructing signal PWM of the microprocessor 121. When the correction instructing signal PWM is set to logic level "H", the opening/closing elements 26*b*, 36*b*, 46*b*, 56*b* are conducted, and the voltage dividing ratio of each of the second, third, fourth and fifth voltage dividing circuits 21D, 31D, 41D, 51D is reduced.

The smoothing circuit 149B contains a second smoothing circuit 28S comprising a series resistor 28*b* and a capacitor 29*b*, a third smoothing circuit 38S comprising a series resistor 38*b* and a capacitor 39*b*, a fourth smoothing circuit 48S comprising a series resistor 48*b* and a capacitor 49*b*, and a fifth smoothing circuit 58S comprising a series resistor 58*b* and a capacitor 59*b*. The second, third, fourth and fifth smoothing circuits 28S, 38S, 48S, 58S are connected to the positive input terminals of the corresponding comparison circuits 23*b*, 33*b*, 43*b*, 53*b*. The second, third, fourth and fifth divided voltages E2, E3, E4, E5 repeats increase or decrease in response to the ON/OFF operation of the correction instructing signal PWM. However, each of the output voltages of the respective smoothing circuits 28S, 38S, 48S, 58S is smoothed to the average voltage corresponding to the duty ratio of ON/OFF of the correction instructing signal PWM, and the smoothed voltage and the first divided voltage E1*s* are compared with each other in each of the comparison circuits 23*b*, 33*b*, 43*b*, 53*b*.

The voltage dividing ratio based on the voltage dividing resistors 21*d* and 21*a* and the voltage dividing resistor 25*b* is set so as to satisfy the following condition. That is, in the case where the voltage dividing circuit 21D has a small voltage dividing ratio as a result of the parallel connection between the voltage dividing resistor 25*b* and the voltage dividing resistor 21*a*, if the output voltage Vif of the constant-voltage power supply circuit 20 is not more than a risk upper limit voltage which is further larger than a permissible upper limit voltage, the divided voltage E2 is smaller than the first divided voltage E1*s* as a reference, and thus the logic level of the comparison output CMP2 is set to "L". The voltage dividing ratio based on the voltage dividing resistors 31*d*, 31*a* and the voltage dividing resistor 35*b*, the voltage dividing ratio based on the voltage dividing resistors 41*d* and 41*a* and the voltage dividing resistor 45*b* and the voltage dividing ratio based on the voltage dividing resistors 51*d* and 51*a* and the voltage resistor 55*b* are likewise set. Specifically, in the case where the each of the voltage dividing circuits 31D, 41D, 51D has a small voltage dividing ratio as a result of the parallel connection of each of the voltage dividing resistors 35*b*, 45*b*, 55*b* to each of the voltage dividing resistors 31*a*, 41*a*, 51*a*, if each of the output voltages Vcp, Vup, Vsb of the constant-voltage power supply circuits 30, 40, 50 is not more than a risk upper limit voltage which is further larger than a permissible upper limit voltage, each of the divided voltages E3, E4, E5 is smaller than the first divided voltage E1*s* as a reference, and thus the logic level of each of the comparison outputs CMP3, CMP4, CMP5 is set to "L".

Furthermore, the relationship between the voltage dividing ratio and the variation range which is slightly broader than the permissible variation range of each of the output voltages Vif, Vcp, Vup, Vsb is set so as to satisfy the following condition. That is, in the case where the opening/closing elements 26*b*, 36*b*, 46*b*, 56*b* are interrupted and thus each of the voltage dividing circuits 21D, 31D, 41D, 51D has a large voltage dividing ratio, if each of the output voltages Vif, Vcp, Vup, Vsb of the constant-voltage power supply circuits 20, 30, 40, 50 is not less than a termination lower limit voltage which is further smaller than the permissible lower limit voltage, each of the divided voltages E2, E3, E4, E5 is larger than the first divided voltage E1*s* as a reference.

In the foregoing description, the voltage dividing resistors 25*b*, 35*b*, 45*b*, 55*b* are connected to the resistors 21*a*, 31*a*, 41*a*, 51*a* at the downstream side of the voltage dividing circuits 21D, 31D, 41D, 51D in parallel on the basis of the correction instructing signal PWM. The voltage dividing resistors 25*b*, 35*b*, 45*b*, 55*b* may be connected to the voltage dividing resistors 21*d*, 31*d*, 41*d*, 51*d* at the upstream side in parallel, so that the voltage dividing ratio is increased when the logic level of the correction instructing signal PWM is set to "H". Furthermore, with respect to the fourth and fifth constant-voltage power supply circuits 40, 50 having a small current capacity which cannot achieve a high-precision voltage, if the constant-voltage precision thereof is set to the same level as the first constant-voltage power supply circuit 10, it would be convenient to judge the presence or absence of the abnormality of the whole power supply circuit more surely. Particularly, if the first constant-voltage power supply circuit 10 is designed to generate the first output voltage Vad by using the first reference voltage generating circuit 111 and the fifth constant-voltage power supply circuit 50 is designed to generate the fifth output voltage Vsb by using the second reference voltage generating circuit 112, if any one of the first and second reference voltage generating circuits 111 and 112 and the first and fifth constant-voltage power supply circuits 10 and 50 is abnormal, the fifth comparison output CMP5 generates an abnormal logic output, and thus the abnormality of the first and second reference voltage generating circuits 111, 112 can be also detected.

In the foregoing description, the second, third, fourth and fifth comparison outputs CMP2, CMP3, CMP4, CMP5 are input to the microprocessor 121, and the microprocessor 121 generates the correction instructing signal PWM. However, the foregoing construction may be modified so that the second, third, fourth and fifth comparison outputs CMP2, CMP3, CMP4, CMP5 are input to the monitor control circuit unit 131B of the combination control circuit unit 130B, the monitor control circuit unit 131B generates the correction instructing signal PWM and the abnormality judgment result are transmitted to the microprocessor 121.

(2) Detailed Description of Action and Operation

Next, the action and operation of the in-vehicle mount electronic controller 100B constructed as shown in FIG. 5 will be described in detail.

First, in FIG. 5, when the power supply switch 103 closes the circuit, the exciting coil 102*b* of the power supply relay is energized, and the output contact point 102*a* closes the circuit. When the output contact point 102*a* closes the circuit, the main power supply voltage Vb is supplied from the in-vehicle mount battery 101 to the in-vehicle electronic controller 100B. In addition to the fourth and fifth output voltages Vup and Vsb, the constant-voltage power supply source 110B generates the first, second and third output voltages Vad, Vif, Vcp, and the microprocessor 121 stars the operation. The microprocessor 121 generates a control output signal to drive-control the first and second in-vehicle mount electrical loads 106*a*, 106*b* in accordance with the operation states of the first and second analog sensors 104*a* and 104*b* and the first and second switch sensors 105*a* and 105*b* as the in-vehicle sensor groups, and the control program stored in the non-volatile program memory 122B.

Various kinds of abnormality occurrence information and learning storage information occurring during the operation of the microprocessor 121 are stored in the backup memory 123*b*, and then collectively stored and saved in the non-volatile data memory 128B as a specific address area in the non-volatile program memory 122B. The action and operation when the output voltage of the constant-voltage power supply circuit 110B is excessively large during the operation of the microprocessor 121 are the same as shown in FIG. 3.

Figure 7:
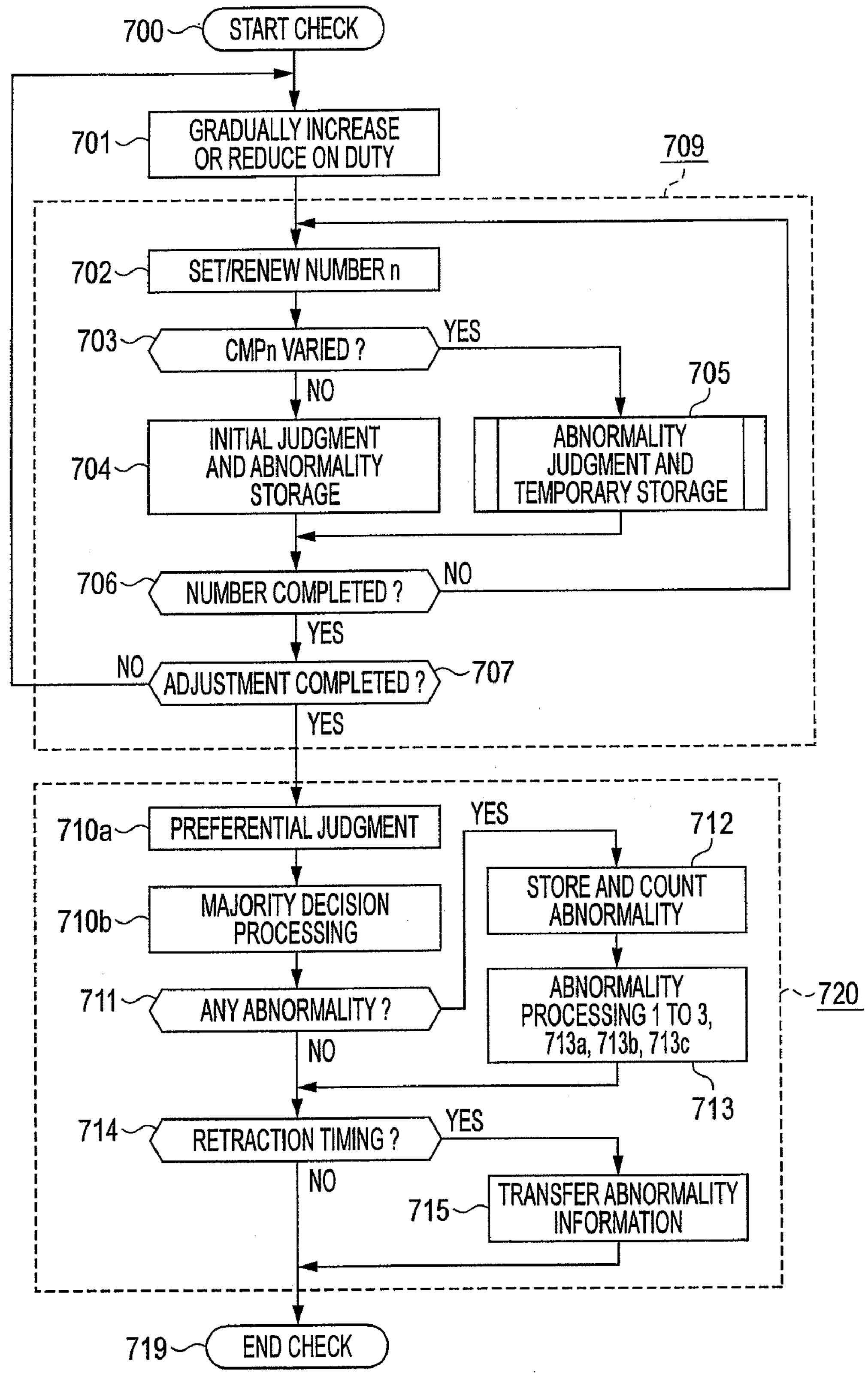
FIG. 7 is an overall flowchart showing the abnormality detecting operation according to the second embodiment.
Figure 8:
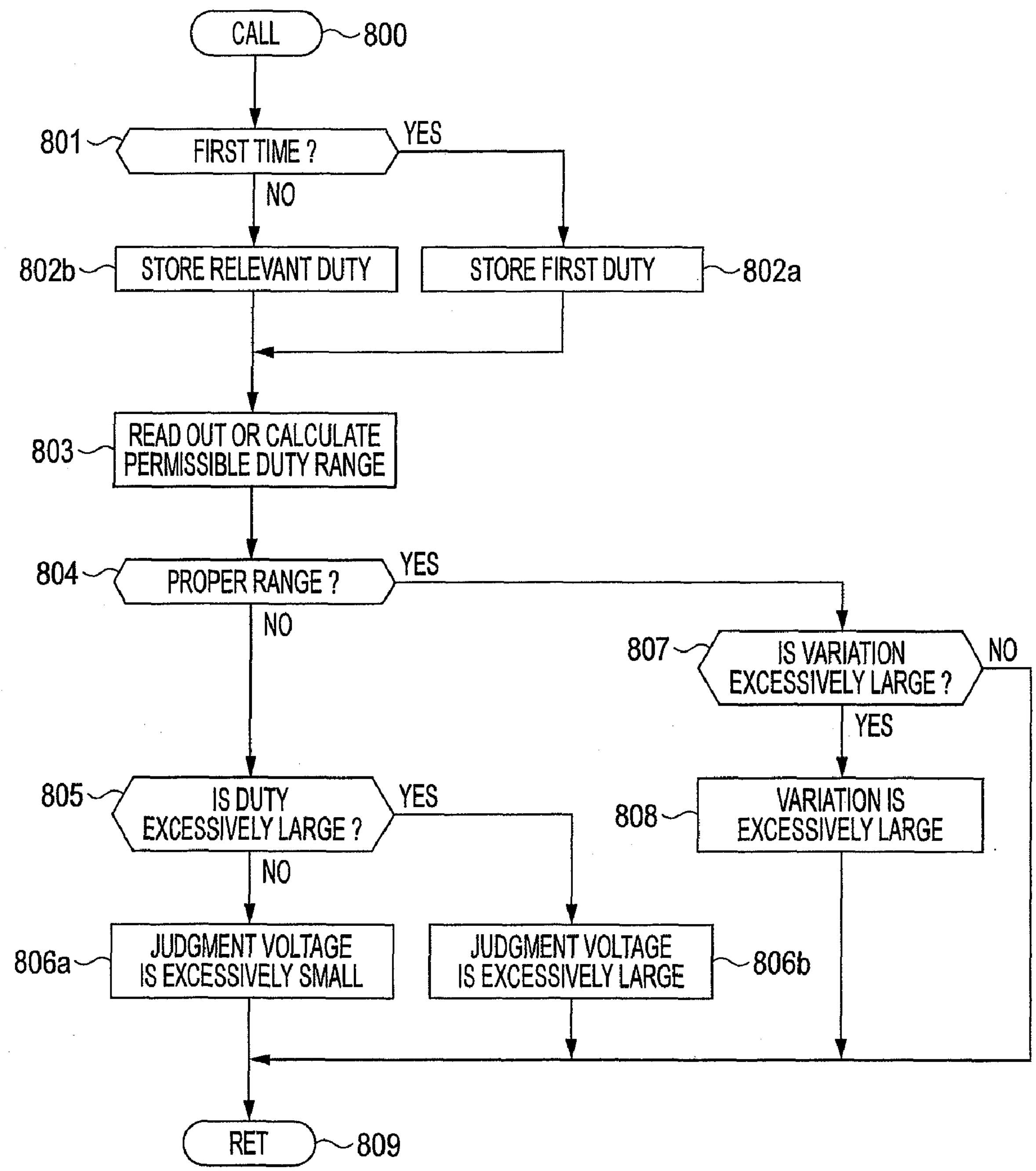
FIG. 8 is a flowchart of a part of the abnormality detecting operation of the second embodiment.

Next, the abnormality detecting operation in the in-vehicle mount electronic controller 100B constructed as shown in FIG. 5 will be described with reference to the flowcharts of FIGS. 7 and 8. FIG. 7 shows an overall flowchart. In FIG. 7, a step 700 is a step of starting an abnormality check operation of the constant-voltage power supply circuits 10, 20, 30, 40, 50 by the microprocessor 121. A subsequent step 701 is a step constituting a duty adjusting section, and for example it gradually increases or reduces the ON duty little by little so that the ON duty is successively increased from 0 to 100% or reduced from 100% to 0 as the correction instructing signal PWM. This step 701 gradually increases or reduces the ON duty while the cyclic operation is executed between the step 701 and the subsequent step 707. In the following description, it is assumed that the ON duty is gradually increased to gradually reduce the voltage dividing ratio of each of the voltage dividing circuits 21D, 31D, 41D, 51D. The same is applicable to a case where the ON duty is gradually reduced to gradually increase the voltage dividing ratio of each of the voltage dividing circuits 21D, 31D, 41D, 51D. The step 702 subsequent to the step 701 is a step of successively renewing and setting the judgment number n to 2, 3, 4, 5 in this order. In the first cyclic operation, n=2, and it is renewed to n=3, n=4, n=5 every time the step 706 described above is executed and then the step 702 is executed again. In subsequent step 703, it is judged whether the logic level of the second, third, fourth, fifth comparison output CMPn (n=2 to 5) varies. If the logic level of the comparison output CMPn does not vary, the judgment result of the step 703 is NO, and the processing shifts to step 704. If the logic level of the comparison output CMPn varies, the judgment result of the step 703 is YES, and the processing shifts to the step block 705. Under the initial state, the voltage dividing ratio of each of the voltage dividing circuits 21D, 31D, 41D, 51D is equal to a sufficiently large value. Therefore, it is a normal operation that the logic level of the n-th comparison output CMPn is set to "H" and by gradually reducing the voltage dividing ratio, the logic level of the n-th comparison output CMPn finally varies to "L".

In step 704, when the logic level of the n-th comparison output CMPn is not "H" in the first operation, an n-th abnormal state is temporarily stored as the excessive smallness of the n-th output voltage or the excessive largeness of the first output voltage Vad. In the step block 705, a subroutine program for abnormality judgment shown in FIG. 8 is executed. In FIG. 8, a step 800 is a step of starting the operation of the subroutine program. In subsequent step 801, the content of an initial value storage address of the non-volatile program memory 122B or the non-volatile data memory 128B is checked, and it is checked whether the value of the initial duty corresponding to the initial value data is stored at the shipping inspection time. If the initial duty is stored, the judgment result of step 801 is NO, and the processing shifts to step 802*b*. If the initial duty is not stored, the judgment of step 801 is YES, and the processing shifts to step 802*a*. In step 802*a*, the present duty set in step 701 is written as the initial duty into the initial value storage address of the non-volatile program memory 122B or the non-volatile data memory 128B, and then the processing shifts to step 803. In step 802*b*, the present duty set in step 701 is temporarily stored as a relevant duty in the RAM memory 123*a*, and then the processing shifts to step 803. In the steps 802*a* and 802*b*, the duty of the correction instructing signal PWM at the time point when the logic level of the n-th comparison output CMPn varies in step 703 is stored. The step 802*a* constitutes an initial duty storage section, and the step 802*b* constitutes a relevant duty storage section. A subsequent step 803 is a step constituting a judgment data converting section described later. In subsequent step 804, it is judged whether the relevant duty temporarily-stored in step 802*b* is within a permissible zone duty corresponding to permissible zone data calculated (or read out) in step 803. If the relevant duty temporarily-stored in step 802*b* is not in a proper range within the permissible zone duty, the judgment result of step 804 is NO, and the processing shifts to step 805. If the relevant duty temporarily-stored in step 802*b* is in the proper range within the permissible zone duty, the judgment result of step 804 is YES, and the processing shifts to step 807. In step 805, it is judged whether the duty is excessively large. If the duty is excessively small, the judgment result of the step 805 is NO, and the processing shifts to step 806*a*. If the duty is excessively large, the judgment result of the step 805 is YES, and the processing shifts to step 806*b*.

On the basis of the judgment that the comparison is inverted when the duty is excessively small and the voltage dividing ratio is excessively large, the step 806*a* temporarily stores the n-th abnormal state that the n-th output voltage is excessively small or the first output voltage Vad is excessively large. On the basis of the judgment that the comparison is inverted when the duty is excessively large and the voltage dividing ratio is excessively small, the step 806*b* temporarily stores the n-th abnormal state that the n-th output voltage is excessively large or the first output voltage Vad is excessively small. In step 807, it is judged whether the deviation between the value of the initial duty stored in the non-volatile program memory 122B and the relevant duty temporarily-stored in step 802*b* is within the permissible variation duty corresponding to predetermined permissible variation data. When the deviation concerned is excessively larger than the permissible variation duty, the judgment result of step 807 is YES, and the processing shifts to step 808 to temporarily store an abnormal state that the variation amount from the initial value of the n-th output voltage is large. If the deviation is within the permissible variation duty, the judgment result of step 807 is NO. When the judgment result of the step 807 is NO or when the steps 806*a*, 806*b*, 808 are finished, the processing returns to the step 706 of FIG. 7 through the return step 809.

Returning to FIG. 7, in step 706 executed subsequently to the step 704 or the step block 705, it is judged whether the judgment number n is equal to 5. If the judgment number n is equal to 4 or less, the judgment of the step 706 is NO, and the processing returns to step 702 to increment the judgment number n. If the judgment number n is equal to 5, the judgment result of the step 706 is YES, and thus the processing shifts to step 707.

In step 707, it is judged whether the ON duty increases to the maximum value or not. If it is still necessary to increase the ON duty, the judgment result of the step 707 is NO, and the processing returns to step 701. If the gradual increase of the ON duty is completed and thus the ON duty is equal to the maximum value, the judgment result of the step 707 is YES, and the processing shifts to step 710*a*.

The step block 709 constructed by the steps 702 to 707 constitutes a logic inversion detecting section, and the step block 705 constitutes an individual abnormality detecting section. In the step block 705, the step 802*a* constitutes an initial duty storing section, the step 802*b* constitutes a relevant duty storing section, the step 803 constitutes a judgment data conversion section, the step 804 constitutes a zone abnormality detecting section and the step 807 constitutes a variation abnormality detecting section.

Step 710*a* which is executed after the judgment result of step 707 is YES and the individual abnormality detection is completed is a step constituting a preferential judgment section. This step 710*a* is executed when the fourth and fifth constant-voltage power supply circuits 40, 50 have the same level constant-voltage precision as the first constant-voltage power supply 10, and also it judges that the first constant-voltage power supply circuit 10 is suspicious when the abnormality of the fourth, fifth output voltage Vup, Vsb is stored in steps 704, 806*a*, 806*b*, 808. The subsequent step 710*b* is a step constituting a total abnormality judging section. This step 710*b* is a section for extracting abnormality of a specific constant-voltage power supply circuit which is estimated on the basis of the individual judgment result of the four output voltages Vif, Vcp, Vup, Vsb corresponding to the judgment numbers n=2, 3, 4, 5. For example, if only the output voltage Vif corresponding to the judgment number n=2 is abnormal, it is judged that the second constant-voltage power supply circuit 20 is abnormal. If only the output voltage Vcp corresponding to the judgment number n=3 is abnormal, it is judged that the third constant-voltage power supply circuit 30 is abnormal. The same is applied to the judgment number n=4, 5, however, when abnormality occurs in the output voltages corresponding to plural judgment numbers n, the first constant-voltage power supply circuit 10 is suspected to be abnormal.

The subsequent step 711 is a step of judging the presence or absence of abnormality. When no abnormality is stored in the steps 704, 806*a*, 806*b*, 808, the judgment result of the step 711 is NO, and the processing shifts to step 714. Furthermore, if abnormally is stored in the steps 704, 806*a*, 806*b*, 808, the judgment result of the step 711 is YES, and the processing shifts to step 712. The step 712 is a step constituting a part of an abnormality occurrence record saving section. In this step, the abnormality detection frequency is accumulatively added every abnormal mode temporarily stored in the steps 704, 806*a*, 806*b*, 808, and the abnormal state is settled on the basis of a predetermined frequency of abnormality detection to prevent misjudgment. The subsequent step 713 is a step constituting an abnormality processing section, and executes abnormality report or fail safe processing in connection with occurrence of abnormality. The processing shifts to step 714 subsequently to the step 713.

In the step 713 constituting the abnormality processing section, first to third abnormality processing sections 713*a*, 713*b*, 713*c* described later are executed. As general introduction, the opening degree of the throttle valve is reduced so as to suppress the engine rotational speed, and the operation of the convenience function associated with safety is stopped. The details thereof correspond to the same content as the abnormality processing section 413 in FIG. 4.

The step 714 is a step of judging whether it is a transfer retraction timing of the abnormality occurrence record information. During a time period when the output contact point 102*a* of the power supply relay tentatively closes the circuit after the power supply switch 103 opens the circuit, the judgment result of the step 714 is YES, and the processing shifts to step 715. When the power supply switch 103 closes the circuit, the judgment result of the step 714 is NO, and the processing shifts to the operation end step 719. The step 715 is a step of transferring abnormality information, and stores the presence or absence of settled abnormality of each abnormal mode stored in the backup RAM memory 123*b* in step 712 into a memory of an abnormality-mode-based address of the non-volatile data memory 128B.

When the power supply switch 103 opens the circuit, the operation of the microprocessor 121 is stopped after the other various kinds of retraction processing is executed, and in connection with this operation, the exciting coil 102*b* of the power supply relay is deenergized, and then the output contact point 102*a* opens the circuit. Furthermore, when the power supply switch 103 closes the circuit, the other control program is executed in the operation end step 719, and the operation start step 700 is activated within a predetermined time, and the subsequent flows are executed.

The step block 720 constructed by the steps 710*a* to 715 constitutes a total judgment processing section. In the step block 720, a majority decision judgment is made on the basis of the individual detection result of the individual abnormality detecting section 705 by the total abnormality judging section 710*b*, and the abnormality occurrence record is saved in the steps 712, 715. In addition, the first, second and third abnormality processing sections 713*a*, 713*b* and 713*c* are executed in the step 713.

In the foregoing description, the control program, permissible zone data as judgment reference data, initial value data and permissible variation data are stored in the non-volatile program memory 122B. The control program stored in the non-volatile program memory 122B constitutes the judgment data converting section 803, the duty adjusting section 701 as the correcting instruction section, the logic inverting detection section 709, the relevant duty storing section 802*b*, the initial duty storing section 802*a*, the zone abnormality detecting section 804 and the variation abnormality detecting section 807.

The judgment data converting section 803 contains the actually measured data corresponding to actual goods under the shipping inspection or the average value data of preliminary experiment data using many samples with respect to the corresponding relationship between each of the output voltages Vif, Vcp, Vup, Vsb of the respective constant-voltage power supply circuits 20, 30, 40, 50 and the opening/closing duty of each of the opening/closing elements 26*b*, 36*b*, 46*b*, 56*b* when each of the comparison outputs CMP2, CMP3, CMP4, CMP5 from the respective comparison circuits 23*b*, 33*b*, 43*b*, 53*b* of the judgment signal input circuit 142B is inverted, and converts the duty value stored in the relevant duty storing section 802*b* to the present measured output voltage, whereby the permissible zone data as the permissible upper and lower limit values for the respective output voltages Vif, Vcp, Vup, Vsb, or the initial value data and the permissible variation data are compared.

For example, with respect to the second output voltage Vif, the permissible upper limit voltage as the permissible zone data is represented by V2, the permissible lower limit voltage is represented by V1, the initial value data is represented by V0 and the permissible variation data from the initial value data is represented by V3. Furthermore, the second output voltage Vif is measured by a high-precision voltmeter connected to the external under the shipping inspection for the products, and the measurement voltage at the time point when the logic of the second comparison output CMP2 varies is represented by V0. When the opening/closing duty of the opening/closing element 26*b* at this time is represented by γ0, the following relationship is satisfied. First, the value of the reference voltage E1*s* applied to the negative input terminal of the second comparison circuit 23*b* is represented by the following equation (2).

$$E1s = Vad \times K1,\ K1 = R12/(R11+R12) \quad (2)$$

R11, R12 represent the resistance values of the voltage dividing resistors 11*d* and 11*a*.

Next, the divided voltage E2 applied to the positive input terminal of the second comparison circuit 23*b* is represented by the following equation (3).

$$E2 = Vif \times (\gamma K21 + \phi K22) \quad (3)$$

Minimum voltage dividing ratio; K21=(R22//R25)/(R21+(R22//R25))

Maximum voltage dividing ratio; K22=R22/(R21+R22)

$\phi = 1-\gamma$ $\gamma = 0$ to 1

R21, R22, R25 represent the resistance values of the voltage dividing resistors 21*d*, 21*a*, 25*b*, γ represents the opening/closing duty of the opening/closing element 26*b*, (R22//R25) represents parallel resistance based on the resistors R22 and R25. For the opening/closing duty γ=0, E2=Vif×K22, and for γ=1, E2=Vif×K21.

Here, when K22=K21+ΔK, the following equation (4) is achieved from the equation (3).

$$E2 = Vif \times (K21 + \phi \Delta K) = Vif \times K21(1 + \phi \Delta K/K21) \quad (4)$$

When the second comparison output CMP2 is logically inverted, E1*s*=E2, and when the value at the measurement time point by the high-precision voltmeter is substituted into the equation (4), the following equation (5) is achieved.

$$V0 \times K21(1 + \phi 0 \Delta K/K21) = Vad \times K1 \quad (5)$$

(wherein ϕ0=1-γ0)

On the other hand, at the time point when the second comparison output CMP2 is logically inverted and thus E1*s* is equal to E2 at the actual driving stage, the following equation (6) is satisfied.

$$Vif \times K21(1 + \phi \Delta K/K21) = Vad \times K1 \quad (6)$$

From the equations (5), (6), the following equation (7) is achieved.

$$Vif \times (1 + \phi \Delta K/K21) = V0 \times (1 + \phi 0 \Delta K/K21) \quad (7)$$

Here, when it is assumed that ΔK/K21 is a known fixed numerical value a corresponding to a design theoretical value, the following equation (8) is achieved from the equation (7).

$$Vif = V0 \times (1 + \phi 0 \times \alpha)/(1 + \phi \times \alpha) \quad (8).$$

As a conclusion achieved from the equation (8), two following methods are provided as the abnormality judging method.

First, according of a first method of abnormality judgment, the initial value data V0 measured at the external, the duty γ0 at that time point, the fixed numerical value α, the permissible zone data V1-V2, and the permissible variation data V3 are stored in the non-volatile program memory 122B, and it is judged whether the second output voltage Vif at the present time point calculated from the equation (8) is within the range of the permissible zone data V1-V2 and also it is judged whether the second output voltage Vif concerned is within the range of V0±V3. In this case, the calculation based on the equation (8) is required for the abnormality judgment, however, there is a feature that the corrected accurate output voltage can be known for the microprocessor 121.

According to a second method of abnormality judgment, the opening/closing duties γ1, γ2 or γ3, γ4 when the value of Vif of the equation (8) is set to V1, V2 or V0+V3, V0−V3 are calculated, the opening/closing duty γ0 is set to an initial duty as the initial value data, the opening/closing duties γ1, γ2 are set to the permissible duty range as the permissible zone data, and the opening/closing duties γ3, γ4 are set to the permissible variation duty range as the permissible variation data, and they are stored in the non-volatile program memory 122B. At the abnormality detection time, it is judged whether the opening/closing duty γ at the time point when the comparison output logic is inverted is within the range of γ1-γ2 or γ3γ-γ4. In this case, the calculation based on the equation (8) is not required during operation for the abnormality judgment, and the control load of the microprocessor 121 can be reduced.

Figure 11:
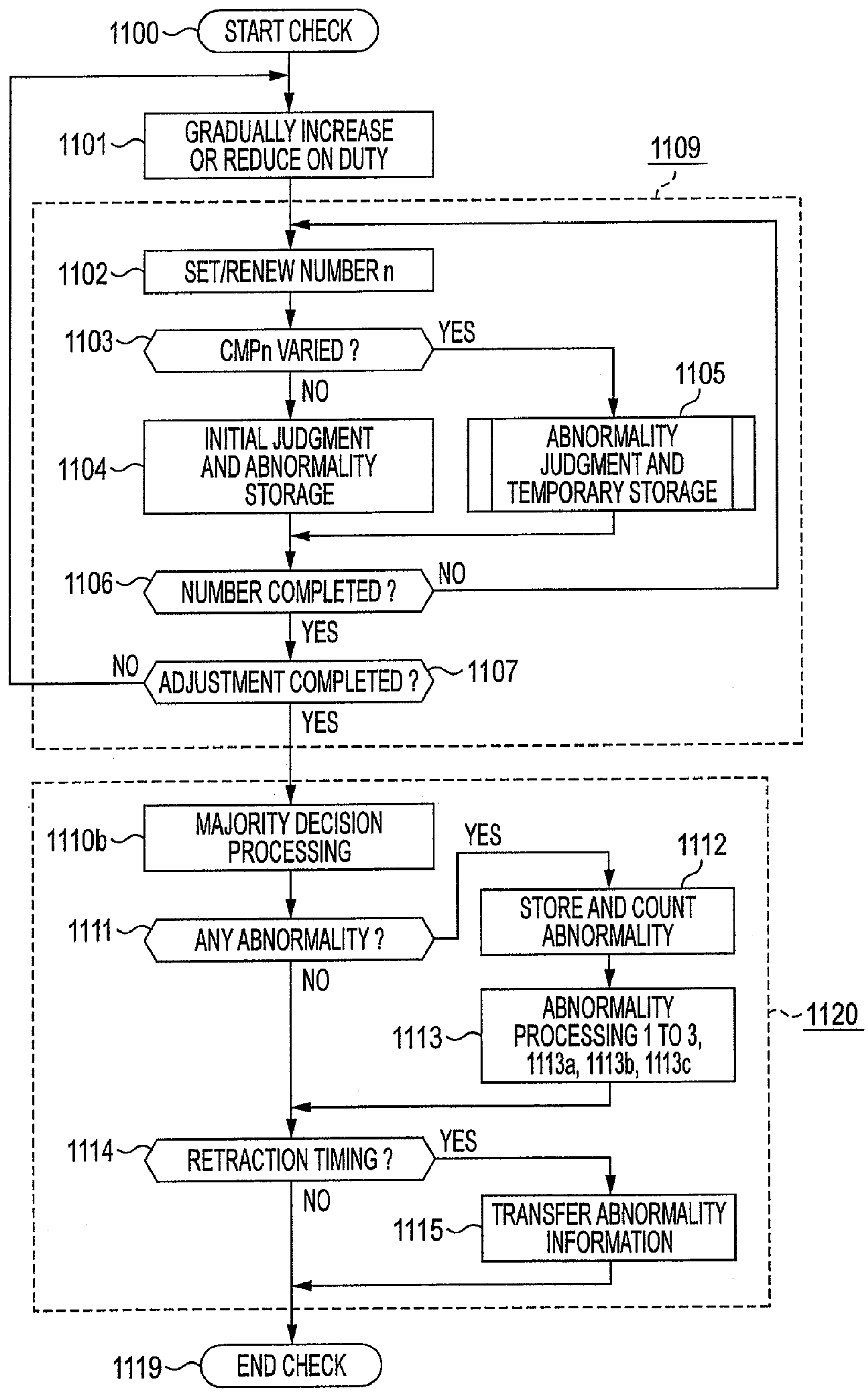
FIG. 11 is an overall flowchart showing the abnormality detecting operation according to the third embodiment.
Figure 12:
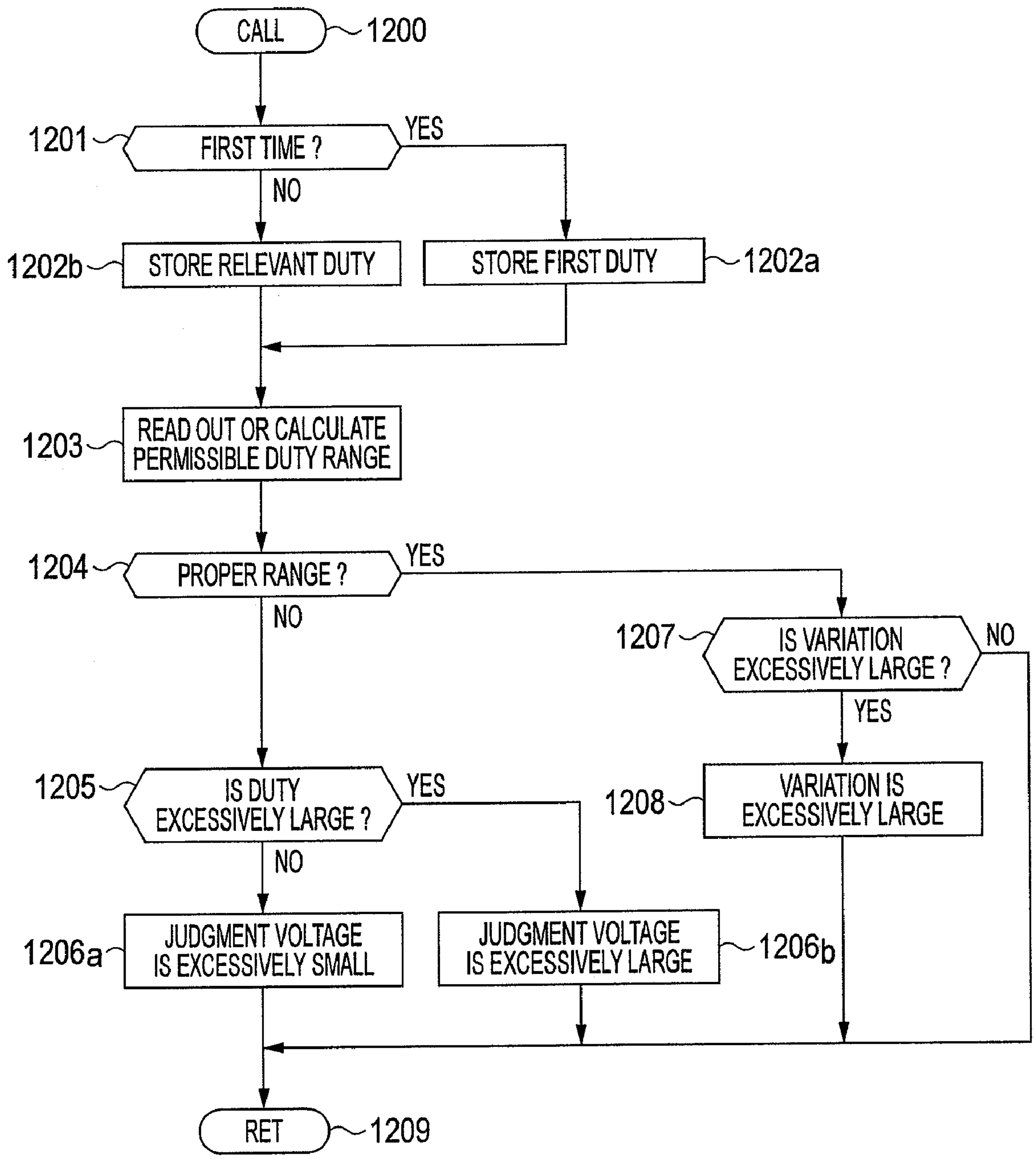
FIG. 12 is a flowchart showing a part of the abnormality detecting operation according to the third embodiment.

The above control flow will be collectively described with reference to FIGS. 11 and 12 showing the same control flow as FIGS. 7 and 8. A step 710*a* constitutes a preferential judgment section. In the case where any one of the fourth and fifth constant-voltage power supply circuits 40 and 50 generates a high-precision output voltage, the preferential judgment section 710*a* judges that the first constant-voltage power supply circuit 10 and the fourth or fifth constant-voltage power supply circuit 40 or 50 may be abnormal if the individual abnormality judgment result of the fourth or fifth output voltage Vup, Vsb is abnormal. In the case where both the fourth and fifth constant-voltage power supply circuits 40 and 50 generate high-precision output voltages, if both the individual abnormality judgment results of the fourth and fifth output voltages Vup and Vsb are abnormal, the preferential judgment section 710*a* judges that the first constant-voltage power supply circuit 10 may be abnormal, and also if the individual abnormality judgment result of the fourth output voltage Vup is normal and the individual abnormality judgment result of the fifth output voltage Vsb is abnormal, it judges that the fifth constant-voltage power supply circuit 50 is abnormal. Furthermore, if the individual abnormality judgment result of the fifth output voltage Vsb is normal and the individual abnormality judgment result of the fourth output voltage Vup is abnormal, it judges that the fourth constant-voltage power supply circuit 40 is abnormal.

In the foregoing description, when the shipping inspection of products is carried out, the characteristic of each product is actually measured and the correcting constant is achieved or judgment reference data based on the correction result is generated. When it is desired that these correcting processing is not executed, an average characteristic may be calculated from the experiment data of many sample products, and the correcting constant and the judgment reference data may be created on the basis of this average characteristic. Furthermore, if the high-precision constant-voltage precision is not required and also the constant-voltage precision of each of the fourth and fifth constant-voltage power supply circuits 40 and 50 which are small-capacity power supplies are set to the same level as the first constant-voltage power supply circuit 10, after the abnormality judgment in the high-precision power supply group is preferentially performed, the abnormality judgment for the second and third constant-voltage power supply circuits 20 and 30 can be surely performed. Furthermore, for example, the first, second and fourth constant-voltage power supply circuits 10, 20, 40 are grouped as a first group using the first reference voltage generating circuit 111, and the third and fifth constant-voltage power supply circuits 30 and 50 are grouped as a second group using the second reference voltage generating circuit 112, and then the output voltage is compared between the different groups. Accordingly, even when the output voltage of the reference voltage generating circuit 111, 112 is abnormal, the abnormality can be detected by the power supply abnormality detecting circuit 140B. If the first, second and third constant-voltage power supply circuits 10, 20, 30 are subjected to negative feedback control by the output voltage of the same reference voltage generating circuit and the output voltage of the reference voltage generating circuit concerned is abnormally varied, it is impossible to detect the abnormality by comparing the first and second constant-voltage power supply circuits 10 and 20 or comparing the first and third constant-voltage power supply circuits 10 and 30. Accordingly, the reference voltage generating circuits are set up as a double system and compared with each other, whereby the abnormality between the reference voltage generating circuits of the double system can be detected.

(3) Summary and Effect of Second Embodiment

The in-vehicle mount electronic controller 100B according to the second embodiment of the present invention which has the microprocessor 121 for drive-controlling the in-vehicle mount electric load groups 106*a*, 106*b* in accordance with operation states of the in-vehicle mount sensor groups 104*a*, 104*b*, 105*a*, 105*b* and contents of the control programs stored in then on-volatile program memory 122B, the combination control circuit unit 130B that is serially connected to the microprocessor 121 to mediate and connect some input/output signals, the constant-voltage power supply source 110B for supplying power to the microprocessor 121, the combination control circuit unit 130B and the input/output interface circuits therefore, and the power supply abnormality detecting circuit 140B for detecting abnormality of the constant-voltage power supply source 110B.

The in-vehicle mount electronic controller 100B is characterized in that the constant-voltage power supply source 110B contains the plural constant-voltage power supply circuits 10, 20, 30, 60 supplied with power form the in-vehicle mount battery 101, the respective constant-voltage power supply circuits 10,20,30,60 being subjected to negative feedback control so as to be proportional to the reference voltages Vs1, Vs2 generated by the reference voltage generating circuits 111, 112 to thereby generate the output voltages Vad, Vif, Vcp, Vup, Vsb having the predetermined permissible variable band width, the power supply abnormality detecting circuit 140B contains the judgment signal input circuit 142B which cooperates with at least one of the microprocessor 121 and the combination control circuit unit 130B to detect individual abnormality for each of plural monitor target output voltages selected from plural output voltages generated by the constant-voltage power supply source 110B, at least one of the microprocessor 121 and the combination control circuit unit 130B further contains the individual abnormality detecting section 705 and the comprehensive judging processing section 720, the judgment signal input circuit 142B inputs relative voltage information between each output voltage and the comparison reference voltage with respect to each of the plural monitor target output voltages to at least one of the microprocessor 121 and the combination control circuit unit 130B, the voltage proportional to the predetermined output voltage having high constant-voltage control precision (specifically, the first output voltage Vad) among the plural output voltages generated by the constant-voltage power supply source 110B is used as the comparison reference voltage, the individual abnormality detecting section 705 individually detects, on the basis of the relative voltage information input from the judgment signal input circuit 142B, the presence or absence of band abnormality as to whether each of the plural monitor target output voltages is a voltage value within each permissible variation band, and the comprehensive judging processing section 720 makes a comprehensive judgment containing the presence or absence of abnormality of the comparison reference voltage when it is detected by the individual abnormality detecting section 705 that individual abnormality is detected in at least one of the plural target output voltages, and carries out at least one of reporting of abnormality and storing of abnormality occurrence information.

As described above, the in-vehicle mount electronic controller 100B according to the second embodiment detects the presence or absence of individual abnormality and comprehensively judges individual abnormality individually by making the band comparison as to whether each of the output voltages of the plural constant-voltage power supply circuits is within the permissible variation width, by using the output voltage of the constant-voltage power supply circuit having high output voltage precision in the plural constant-voltage power supply circuits or the output voltage of the reference voltage generating circuit as the comparison reference voltage, thereby executing abnormality processing.

Accordingly, the presence or absence of the band abnormality can be individually accurately detected for the plural constant-voltage power supply circuits by using the high-precision comparison reference voltage, and also precision abnormality of the output voltage is detected as risk prediction information and abnormality is reported or abnormality occurrence record is stored before the microprocessor or the combination control circuit unit falls into an operation stop state. Therefore, there is an effect that maintenance check can be performed before an abnormal-decrease or abnormal-increase accident occurs or risk prediction can be performed by periodic check.

Furthermore, there is also an effect that not only individual abnormality can be detected, but also identification information as to which constant-voltage power supply circuit falls into an individual abnormality state or whether the comparison reference voltage itself is abnormal or not is added to report abnormality or store abnormality record information, thereby facilitating maintenance check.

Furthermore, in the in-vehicle mount electronic controller 100B according to the second embodiment, the constant-voltage power supply source 110B contains first, second and third constant-voltage power supply circuits 10, 20, 30 and the additional constant-voltage power supply circuit 60, the first constant-voltage power supply circuit 10 is a power supply circuit for generating a first output voltage Vad which is smaller in load current, but higher in precision as compared with the second and third constant-voltage power supply circuits 20, 30, the first constant-voltage power supply circuit 10 is used as a power supply for the first multi-channel AD converter 124 which directly inputs to the microprocessor 121, the first analog interface circuit 114*a* and at least a part of the first analog sensor 104*a*, the first constant-voltage power supply circuit 10 is also used as a power supply for the second multi-channel AD converter 134, the second analog interface circuit 114*b* and at least a part of the second analog sensor 104*b* when the combination control circuit unit 130B is connected to the second analog sensor 104*b* through the second multi-channel AD converter 134 and the second analog interface circuit 114*b*, the second constant-voltage power supply circuit 20 is a power supply circuit which has larger load current than the first constant-voltage power supply circuit 10 and generates a second output voltage Vif which has the same level as the first output voltage Vad, but is lower in constant-voltage control precision, the second constant-voltage power supply circuit 20 is used as a power supply for input/output interface circuits 125, 126 in the microprocessor 121 and input/output interface circuits 135, 136 in the combination control circuit unit 130B, the third constant-voltage power supply circuit 30 is a power supply circuit for generating a third output voltage Vcp which is a voltage different from the first output voltage Vad, the third constant-voltage power supply circuit 30 is used as a power supply for the calculation unit of the microprocessor 121, the non-volatile program memory 122B and RAM memory 123*a* for calculation processing, and the additional constant-voltage power supply circuit 60 contains a power supply circuit for generating an additional output voltage having the same level constant-voltage control precision as the first output voltage Vad.

According to this construction, a load-based selective use style in which a low-precision large-capacity power supply having the same level voltage as a high-precision small-capacity power supply and a different-voltage large-capacity power supply are properly selectively used is adopted. Accordingly, by limiting the application of the high-precision power supply, a power supply which is inexpensive as a whole can be constructed.

Furthermore, when plural high-precision constant voltage outputs are required as the comparison reference voltage, the constant-voltage precision of the additional constant-voltage power supply circuit is the same level as the first output voltage. Accordingly, in order to judge whether the first output voltage is normal or not, another high-precision output voltage can be used as the comparison reference voltage.

Still furthermore, the in-vehicle mount electronic controller 100B according to the second embodiment is characterized in that the first, second and third constant-voltage power supply circuits 10, 20, 30 are supplied with power from the in-vehicle mount battery 101 to generate the first, second and third output voltages Vad, Vif, Vcp by closing the power supply switch 103, the additional constant-voltage power supply circuit 60 contains at least one of the fourth constant-voltage power supply circuit 40 and the fifth constant-voltage power supply circuit 50, the fourth constant-voltage power supply circuit 40 is a power supply circuit of low power consumption which is supplied with power from the in-vehicle mount battery 101 to generate the fourth output voltage Vup even under the state that the power supply switch 103 is opened, the fourth constant-voltage power supply circuit 40 is a power supply circuit used as a power supply for at least one of the backup memory 123*b* of the microprocessor 121 and the auxiliary RAM memory 133 of the combination control circuit unit 130B, the fifth constant-voltage power supply circuit 50 is a power supply which is supplied with power from the in-vehicle mount battery 101 to generate the fifth output voltage Vsb different from the first output voltage Vad under either state that the power supply switch 103 is closed or opened, and is lower in power consumption than the second and third constant-voltage power supply circuits 20, 30, the fifth constant-voltage power supply circuit 50 is used as a power supply for the monitor control circuit 131B in the combination control circuit unit 130B, the monitor control circuit 131B is a circuit for inputting the monitor input signal from the in-vehicle mount sensor groups 104*b*, 105*b* to the microprocessor 121, and drive-controlling the in-vehicle mount load group 106*b* on the basis of the control output signal from the microprocessor 121, and at least one of the fourth and fifth output voltages Vup and Vsb has the same level constant-voltage control precision as the first output voltage Vad and is output as the additional output voltage.

According to this construction, the additional constant-voltage power supply circuit contains at least one of the fourth constant-voltage power supply circuit and the fifth constant-voltage power supply circuit which have the same level output voltage as the first output voltage. The fourth constant-voltage power supply circuit is directly supplied with power from the in-vehicle mount battery, so that some storage state of the RAM memory can be held even under the state that the power supply switch is interrupted and thus the power supply to the first to third constant-voltage power supply circuits is interrupted.

Furthermore, the fifth constant-voltage power supply circuit is also directly supplied with power from the in-vehicle mount battery, and thus the combination control circuit unit can be operated under the state that the power supply switch is interrupted.

Furthermore, the output voltages of the fourth and fifth constant-voltage power supply circuits do not originally require high constant-voltage precision. However, it has small load current, and also little variation of the load current because it does not supply power to elements other than a first integrated circuit element mainly comprising the microprocessor or a second integrated circuit element constituting the combination control circuit unit, so that the constant-voltage precision can be relatively easily enhanced.

Furthermore, in the in-vehicle mount electronic controller 100B of the second embodiment, the power supply abnormality detecting circuit 140B has the voltage dividing ratio correcting circuit 146B with the judgment signal input circuit 142B, the judgment signal input circuit 142B has plural voltage dividing circuits 21D,31D,41D,51D for dividing the plural monitor target output voltages respectively and plural comparison circuits 23*b*,33*b*,43*b*,53*b* for comparing the respective voltage-divided voltages from the respective voltage dividing circuits 21D,31D,41D,51D with the comparison reference voltage to generate the relative voltage information CMP2 to CMP5, the voltage dividing ratio correcting circuit 146B contains opening/closing elements 26*b*, 36*b*, 46*b*, 56*b* and the smoothing circuit 149B for variably controlling the voltage dividing ratio of each voltage dividing circuit 21D,31D,41D,51D and corrects the voltage dividing ratio of each voltage dividing circuit 21D,31D,41D,51D on the basis of a correcting instruction signal PWM generated by the correcting instruction section 701 provided to at least one of the microprocessor 121 and the combination control circuit unit 130B, permissible band duties corresponding to the respective permissible variation band widths of the plural monitor target output voltages are stored in the non-volatile program memory 122B, the opening/closing elements 26*b*,36*b*,46*b*, 56*b* carry out the opening/closing operation with a variable duty which varies in accordance with the correcting instruction signal PWM, the smoothing circuit 149B is a low pass filter for smoothing the increase/decrease of each divided voltage based on the opening/closing operation of the opening/closing element 21D,31D,41D,51D and inputting the averaged divided voltage to the comparison circuits 23*b*,33*b*,43*b*,53*b*, the individual abnormality detecting section 705 judges whether the duty corresponding to the variable duty at the time point when each divided voltage is coincident with the comparison reference voltage is within the permissible range corresponding to the permissible band duty, and the individual abnormality detecting section 705 is executed in at least one of the microprocessor 121 and the monitor control circuit unit 131B of the combination control circuit unit 130B, the permissible band duty is transferred to and stored in the auxiliary RAM memory 133 of the combination control circuit unit 130B from the non-volatile program memory 122B when the individual abnormality detecting section 705 is executed in the monitor control circuit unit 131B of the combination control circuit unit 130B.

In this construction, the permissible band duty for detecting band abnormality is extracted on the basis of experiment data based on many samples, the extracted data concerned are stored in the non-volatile program memory, and each output voltage is detected by the duty concerned as the value of the variable duty when it is coincident with the comparison reference voltage. Accordingly, the detection error based on the solid variation of the applied component constant is corrected, and the abnormality can be accurately detected. In addition, no analog input channel is required, and the present value of each output voltage can be measured by using a pulse width modulation signal of one point.

Still furthermore, the in-vehicle mount electronic controller 100B according to the second embodiment is characterized in that the comprehensive judging processing section 720 contains the comprehensive abnormality judging unit 710*b*, and also contains at least one of first, second and third abnormality processing sections 713*a*, 713*b*, 713*c*, the comprehensive abnormality judging unit 710*b* monitors the relative voltage information to analyze and estimate as a whole which output voltage of the plural monitor target output voltages is abnormal, and makes a majority decision judgment that the comparison reference voltage is judged to be abnormal when plural monitor target output voltages compared with the comparison reference voltage are abnormal, when the abnormality of the second, third and fifth output voltages Vif, Vcp, Vsb is detected on the basis of the judgment result of the comprehensive abnormality judging unit 710*b* under the state that the additional constant-voltage power supply circuit 60 contains the fifth constant-voltage power supply circuit 50, the first abnormality processing section 713*a* carries out at least reporting of the abnormality concerned and storing of abnormality occurrence information of the abnormality concerned, when abnormality of the first output voltage Vad is detected on the basis of the judgment result of the comprehensive abnormality judging unit 710*b*, the second abnormality processing section 713*b* carries out at least one of reporting of abnormality and storing of abnormality occurrence information of the abnormality concerned, and it substitutes correction replacement data at the safety side for the input signal obtained from the first analog sensor 104*a* and the input signal obtained form the second analog sensor 104*b* if the combination control circuit unit 130B is connected to the second analog sensor 104*b* through the second multi-channel AD converter 134 and the second analog interface circuit 114*b*, and when the fourth output voltage Vup is detected to be abnormal on the basis of the judgment result of the comprehensive abnormal judgment unit 710*b* in the case where the additional constant-voltage power supply circuit 60 contains the fourth constant-voltage power supply circuit 40, the third abnormality processing section 713*c* carries out at least one of reporting of the abnormality and storing of abnormality occurrence information of the abnormality concerned, and replaces a variable control constant varying in the backup memory 123*b* because of learning and storage during driving by at least one of a control constant transferred to and stored in the non-volatile data memory 128B and a predetermined reference control constant pre-stored in the non-volatile program memory 122B.

According to this construction, the abnormality reporting or the saving of the abnormality record information is carried out in accordance with the occurrence of abnormality of each output voltage estimated on the basis of the comprehensive abnormality judging unit, and also the correction processing of the analog signal is executed if the first output voltage is abnormal while the learning control constant is returned to the transfer saving information or the reference control constant if the fourth output voltage is abnormal. Accordingly, the precision abnormality of the output voltage which does not yet stop the operation of a watchdog timer circuit or the microprocessor is detected, and the abnormality is reported or the abnormality occurrence history is stored, whereby the abnormal decrease or abnormality increase trouble of the output voltage is expected, so that check maintenance is carried out before a critical trouble occurs or a risk can be predicted by periodic check.

Furthermore, the correction replacement data applied when the first output voltage is abnormal is based on the multiplication of a correction coefficient at the safety side and the present analog signal of each analog sensor or algebra addition of correction bias. Accordingly, the safety of control can be maintained by setting the proper correction coefficient and the correction bias every analog sensor.

Still furthermore, the in-vehicle mount electronic controller 100B according to the second embodiment is characterized in that the monitor control circuit unit 131B of the combination control circuit unit 130B is constructed by the microprocessor 131B serving as sub CPU, and the monitor control circuit unit 131B executes a part of the processing of the comprehensive judging processing section 720.

According to this construction, the combination control circuit unit for serially communicating input/output signals with the microprocessor is provided, and the monitor control circuit unit provided to the combination control circuit unit takes partial charge of the comprehensive abnormality judgment. Accordingly, it is unnecessary to directly input each judgment signal and the comparison signal to the microprocessor, the number of input/output points of the expensive microprocessor executing at high speed can be saved and the control load imposed on the microprocessor can be reduced.

Still furthermore, the in-vehicle mount electronic controller 100B according to the second embodiment is characterized in that initial value data and permissible variation data at the shipping time concerning the plural monitor target output voltages are stored in any one of the non-volatile data memory 128B and the non-volatile program memory 122B in the in-vehicle mount electronic controller 100B, the individual abnormality detecting section 705 contains a variation abnormality detecting section 807, and the variation abnormality detecting section 807 judges whether a deviation voltage of each of the plural monitor target output voltages from the initial value data thereof is within the permissible variation data, thereby judging individual abnormality.

Accordingly to this construction, the initial value data and the permissible variation data to detect variation abnormality are extracted on the basis of experiment data achieved from actual measurement data based on actual articles and many samples, and the extracted data concerned are stored in a non-volatile program memory or a non-volatile data memory. Accordingly, the detection error based on solid variation of applied component constants is corrected, and abnormality can be accurately detected.

In a case where a variation of each output voltage from the initial value thereof is excessively large, it is added to the individual abnormality because occurrence of abnormality is predicted even when band abnormality is not detected, whereby safety can be enhanced.

Third Embodiment

(1) Detailed Description of Construction

FIG. 9 is an overall circuit diagram showing a third embodiment of the in-vehicle amount electronic control according to the present invention. Referring to FIG. 9, the construction of the third embodiment will be described in detail by concentrically the difference point from that of FIG. 5. In FIG. 9, the same reference numerals as FIG. 5 represent the same or corresponding parts.

In FIG. 9, an in-vehicle mount electronic controller 100C of the third embodiment contains a constant-voltage power supply source 110C. The constant-voltage power supply source 110C generates fourth and fifth output voltages Vup and Vsb achieved by dropping the auxiliary power supply voltage Vbb as described later with reference to FIG. 10. A flash memory is used as the non-volatile program memory 122C contained in an integrated circuit element 120C, and a partial area thereof is used as the non-volatile data memory area 128C. A combination control circuit unit 130C is equipped with a sub CPU 131C which also serves as a soak timer circuit as a monitor control circuit unit 131C, and the sub CPU 131C cooperates with an auxiliary program memory 132C based on a mask ROM memory or the like and the auxiliary RAM memory 133. The combination control circuit unit 130C is also equipped with the input interface circuit 135 and the output interface circuit 136.

A power supply abnormality detecting circuit 140C will be described later with reference to FIG. 10, and the over voltage detecting and storing protection circuit 150 and the monitor voltage combination circuit 160 are designed in the same construction as shown in FIG. 3.

Next, the power supply abnormality detecting circuit 140C of FIG. 9 will be described in detail with reference to FIG. 10.

Figure 10:
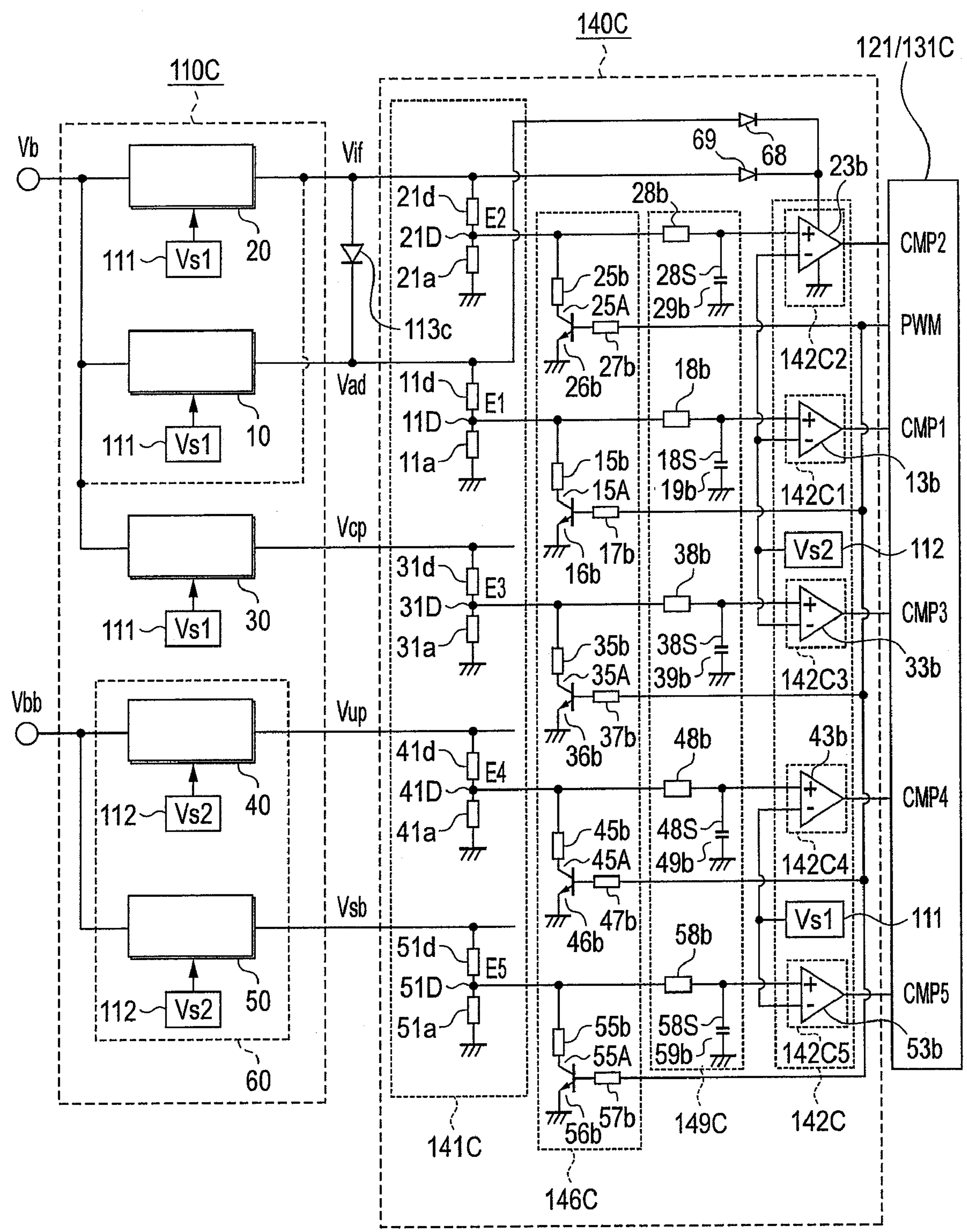
FIG. 10 is a detailed diagram showing a power supply abnormality detecting circuit according to the third embodiment.

The main difference between the power supply abnormality detecting circuit 140C shown in FIG. 10 and the power supply abnormality detecting circuit 140B shown in FIG. 6 resides in that all of the first, second, third, fourth and fifth output voltages Vad, Vif, Vcp, Vup, Vsb are set as monitor target output voltages in the power supply abnormality detecting circuit 140C whereas the second, third, fourth and fifth output voltages Vif, Vcp, Vup, Vsb are set as monitor target output voltages in the power supply abnormality detecting circuit 140B, and the judgment signal input circuit 142C contains first, second, third, fourth and fifth judgment signal input circuits 142C1, 142C2, 142C3, 142C4 and 142C5. In the power supply abnormality detecting circuit 140C, the reference voltages Vs1, Vs2 generated in the reference voltage generating circuits 111, 112 are used as the comparison reference voltage. The first, second, third, fourth and fifth judgment signal input circuits 142C1, 142C2, 142C3, 142C4, 142C5 correspond to the first, second, third, fourth and fifth output voltages Vad, Vif, Vcp, Vup, Vsb, and contain comparison circuits 13*b*, 23*b*, 33*b*, 43*b* and 53*b*, respectively. The comparison reference voltage supplied to the negative-side input terminal of each of the comparison circuits 13*b*, 23*b*, 33*b*, 43*b*, 53*b* is set to the first, second reference voltages Vs1,Vs2 generated in the reference voltage generating circuits 111, 112.

In FIG. 10, the constant-voltage power supply source 110C contains the first to fifth constant-voltage power supply circuits 10, 20, 30, 40, 50. The first constant-voltage power supply circuit 10 generates the first output voltage Vad by dropping the main power supply voltage Vb. The second constant-voltage power supply circuit 20 generates the second output voltage Vif by dropping the main power supply voltage Vb. The third constant-voltage power supply circuit 30 generates the third output voltage Vcp by dropping the main power supply voltage Vb. As indicated by a dashed line in FIG. 10, the third constant-voltage power supply circuit 30 may be supplied with the second output voltage Vif, and drop the second output voltage Vif to generate the third output voltage Vcp. The fourth constant-voltage power supply circuit 40 generates the fourth output voltage Vup by dropping the auxiliary power supply voltage Vbb. The fifth constant-voltage power supply circuit 50 generates the fifth output voltage Vsb by dropping the auxiliary power supply voltage Vbb.

The constant voltage values, constant-voltage control precision and load current values of the respective output voltages Vad, Vif, Vcp, Vup, Vsb of the first to fifth constant-voltage power supply circuits 10, 20, 30, 40, 50 of the constant-voltage power supply 110C are the same as the respective output voltages Vad, Vif, Vcp, Vup, Vsb of the first embodiment.

According to the third embodiment, as in the case of the second embodiment, the first output voltage Vad is supplied to the first and second multi-channel AD converters 124, 134, the first and second analog interface circuits 114*a*, 114*b*, and the parts of the first and second analog sensors 104*a*, 104*b*. The second output voltage Vif is supplied to the input/output interface circuits 125, 126, the combination control circuit unit 130C and the watchdog timer circuit 170. The third output voltage Vcp is supplied to the microprocessor 121, the non-volatile program memory 122C, the RAM memory 123*a* and the backup memory 123*b*. The fourth output voltage Vup is supplied to the backup memory 123*b* even when the output contact point 102*a* of the power supply relay opens the circuit. The fifth output voltage Vsb is supplied to the monitor control circuit unit 132C in the combination control circuit unit 130C even when the output contact point 102*a* of the power supply relay opens the circuit.

Each of the constant-voltage power supply circuits 10, 20, 30, 40, 50 is constructed by a power transistor which is subjected to negative feedback continuous control so that the voltage proportional to the output voltage thereof is equal to the reference voltage Vs1 or Vs2 generated in the first or second reference voltage generating circuit 111, 112. In this third embodiment, the first reference voltage Vs1 of the first reference voltage generating circuit 111 is use for the first, second and third constant-voltage power supply circuits 10, 20, 30, and the second reference voltage Vs2 of the second reference voltage generating circuit 112 is used for the fourth and fifth constant-voltage power supply circuits 40 and 50. A saving diode 113*c* supplies power from the second constant-voltage power supply circuit 20 to the load circuit of the first constant-voltage power supply circuit 10 when the first output voltage Vad decreases abnormally or when the second output voltage Vif increases abnormally. When the first and second output voltages Vad and Vif are normal, the first output voltage Vad is set to a value higher than the voltage achieved by subtracting the voltage drop of the saving diode 113*c* from the second output voltage Vif, so that the saving diode 113*c* is set to OFF state and no power is supplied from the second output voltage Vif to the analog system circuit.

As shown in FIG. 10, the power supply abnormality detecting circuit 140C contains a voltage dividing circuit 141C, the judgment signal input circuit 142C, a voltage dividing ratio correcting circuit 146C, and a smoothing circuit 149C. The voltage dividing circuit 141C contains voltage dividing resistors 11*d* and 11*a* constituting a first voltage dividing circuit 11D, voltage dividing resistors 21*d* and 21*a* constituting a second voltage dividing circuit 21D, voltage dividing resistors 31*d* and 31*a* constituting a third voltage dividing circuit 31D, voltage dividing resistors 41*d* and 41*a* constituting a fourth voltage dividing circuit 41D and voltage dividing resistors 51*d* and 51*a* constituting a fifth voltage dividing circuit 51D.

The voltage dividing resistors 11*d* and 11*a* of the first voltage dividing circuit 11D is constructed by a high-precision series circuit of the voltage dividing resistors 11*d* and 11*a* for receiving the first output voltage Vad and outputting the first divided voltage E1. The voltage dividing resistors 21*d* and 21*a* of the second voltage dividing circuit 21D is constructed by a high-precision series circuit of the voltage dividing resistors 21*d* and 21*a* for receiving the second output voltage Vif and outputting the second divided voltage E2. The voltage dividing resistors 31*d* and 31*a* of the third voltage dividing circuit 31D are constructed by a high-precision series circuit of the voltage dividing resistors 31*d* and 31*a* for receiving the third output voltage Vcp and outputting the third divided voltage E3. The voltage dividing resistors 41*d* and 41*a* of the fourth voltage dividing circuit 41D is constructed by a high-precision series circuit of the voltage dividing resistors 41*d* and 41*a* for receiving the fourth output voltage Vup and outputting the fourth divided voltage E4. The voltage dividing resistors 51*d* and 51*a* of the fifth voltage dividing circuit 51D are constructed by a high-precision series circuit of the voltage dividing resistors 51*d* and 51*a* for receiving the fifth output voltage Vsb and outputting the fifth divided voltage E5.

The first, second, third, fourth and fifth judgment signal input circuits 142C1, 142C2, 142C3, 142C4 and 142C5 contain first, second, third, fourth and fifth comparison circuits 13*b*, 23*b*, 33*b*, 43*b* and 53*b*.

The first comparison circuit 13*b* is supplied with the second reference voltage Vs2 as a comparison reference voltage at the negative input terminal thereof, and also supplied with the first divided voltage E1 as a comparison target voltage as the positive input terminal thereof. The first comparison circuit 13*b* generates a first comparison output CMP1 whose logic level is set to "H" when the value of the first divided voltage E1 exceeds the value of the second reference voltage Vs2, and inputs the first comparison output CMP1 to the microprocessor 121.

Likewise, the second comparison circuit 23*b* is supplied with the second reference voltage Vs2 as a comparison reference voltage at the negative input terminal, and also supplied with the second divided voltage E2 as a comparison target voltage at the positive input terminal thereof. The second comparison circuit 23*b* generates a second comparison output CMP2 whose logic level is set to "H" when the value of the second divided voltage E2 exceeds the value of the second reference voltage Vs2, and inputs the second comparison output CMP2 to the microprocessor 121.

Likewise, the third comparison circuit 33*b* is supplied with the second reference voltage Vs2 as a comparison reference voltage at the negative input terminal thereof, and supplied with the third divided voltage E3 as a comparison target voltage at the positive input terminal. The third comparison circuit 33*b* generates a third comparison output CMP3 whose logic level is set to "H" when the value of the third divided voltage E3 exceeds the value of the second reference voltage Vs2, and inputs the third comparison output CMP3 to the microprocessor 121.

The fourth comparison circuit 43*b* is supplied with the first reference voltage Vs1 as a comparison reference voltage at the negative input terminal thereof, and also supplied with the fourth divided voltage E4 as a comparison target voltage at the positive input terminal thereof. The fourth comparison circuit 43*b* generates a fourth comparison output CMP4 whose logic level is set to "H" when the value of the fourth divided voltage E4 exceeds the value of the first reference voltage Vs1, and inputs the fourth comparison output CMP4 as relative voltage information to the microprocessor 121.

Likewise, the fifth comparison circuit 53*b* is supplied with the first reference voltage Vs1 as a comparison reference voltage at the negative input terminal, and also supplied with the fifth divided voltage E5 as a comparison target voltage at the positive input terminal thereof. The fifth comparison circuit 53*b* generates a fifth comparison output CMP5 whose logic level is set to "H" when the value of the fifth divided voltage E5 exceeds the value of the first reference voltage Vs1, and inputs the fifth comparison output CMP5 as relative voltage information to the microprocessor 121.

The second comparison circuit 23*b* is supplied with power from the first and second output voltages Vad, Vif through diodes 68, 69. The power supply circuits for the first, third, fourth and fifth comparison circuits 13*b*, 33*b*, 43*b*, 53*b* are eliminated from the illustration to simplify the drawings. However, as in the case of the second comparison circuit 23_b_, they are supplied with power from the first and second output voltages Vad, Vif through the diodes 68 and 69.

The voltage dividing ratio correcting circuit 146C contains the first, second, third, fourth and fifth correcting circuits 15A, 25A, 35A, 45A, 55A. The first correcting circuit 15A contains the voltage dividing resistor 15_b_ and the opening/closing element 16_b_, and the voltage dividing resistor 15_b_ and the opening/closing element 16_b_ are connected to each other in series, and this series circuit is connected to the voltage dividing resistor 11_a_ in parallel when the opening/closing element 16_b_ closes the circuit, and reduces the voltage dividing ratio of the first divided voltage E1.

Likewise, the second correcting circuit 25A contains the voltage dividing resistor 25_b_ and the opening/closing element 26_b_. The voltage dividing resistor 25_b_ and the opening/closing element 26_b_ are connected to each other in series. This series circuit is connected to the voltage dividing resistor 21_a_ when the opening/closing element 26_b_ closes the circuit, and reduces the voltage dividing ratio of the second divided voltage E2.

Likewise, the third correcting circuit 35A contains the voltage dividing resistor 35_b_ and the opening/closing element 36_b_, and the voltage dividing resistor 35_b_ and the opening/closing element 36_b_ are connected to each other in series. This series circuit is connected to the voltage dividing resistor 31_a_ in parallel when the opening/closing element 36_b_ closes the circuit, and reduces the voltage dividing ratio of the third divided voltage E3.

Likewise, the fourth correcting circuit 45A contains the voltage dividing resistor 45_b_ and the opening/closing element 46_b_, and the voltage dividing resistor 45_b_ and the opening/closing element 46_b_ are connected to each other in series. This series circuit is connected to the voltage dividing resistor 41_a_ in parallel when the opening/closing element 46_b_ closes the circuit, and reduces the voltage dividing ratio of the fourth divided voltage E4.

Likewise, the fifth correcting circuit 55A contains the voltage dividing resistor 55_b_ and the opening/closing element 56_b_, and the voltage dividing resistor 55_b_ and the opening/closing element 56_b_ are connected to each other in series. This series circuit is connected to the voltage dividing resistor 51_a_ when the opening/closing element 56_b_ closes the circuit, and reduces the voltage dividing ratio of the fifth divided voltage E5. Each of the opening/closing elements 16_b_, 26_b_, 36_b_, 46_b_, 56_b_ is constructed by an NPN transistor, for example. The opening/closing elements 16_b_, 26_b_, 36_b_, 46_b_, 56_b_ are opened/closed on the basis of the correcting instruction signal PWM of the microprocessor 121 through the driving resistors 17_b_, 27_b_, 37_b_, 47_b_, 57_b_. When the logic level of the correcting instruction signal PWM is set to "H", the opening/closing elements 16_b_, 26_b_, 36_b_, 46_b_, 56_b_ are conducted to reduce the voltage dividing ratio of each of the first to fifth voltage dividing circuits 11D, 21D, 31D, 41D, 51D.

The smoothing circuit 149C contains a first smoothing circuit 18S comprising a series resistor 18_b_ and a capacitor 19_b_, a second smoothing circuit 28S comprising a series resistor 28_b_ and a capacitor 29_b_, a third smoothing circuit 38S comprising a series resistor 38_b_ and a capacitor 39_b_, a fourth smoothing circuit 48S comprising a series resistor 48_b_ and a capacitor 49_b_, and a fifth smoothing circuit 58S comprising a series resistor 58_b_ and a capacitor 59_b_. The first to fifth smoothing circuits 18S, 28S, 38S, 48S, 58S are connected to the positive input terminals of the corresponding comparison circuits 13_b_, 23_b_, 33_b_, 43_b_, 53_b_. In response to ON/OFF operation of the correcting instruction signal PWM, the first to fifth divided voltages E1, E2, E3, E4, E5 repetitively decreases or increases, and the output voltage of each of the smoothing circuits 18S, 28S, 38S, 48S, 58S is smoothed to the average voltage corresponding to the duty of ON/OFF of the correcting instruction signal PWM. The smoothed voltage and the first reference voltage Vs1 or the second reference voltage Vs2 are compared with each other in each of the comparison circuits 13_b_, 23_b_, 33_b_, 43_b_, 53_b_.

With respect to the voltage dividing ratio of the voltage dividing resistors 11_d_ and 11_a_ and the voltage dividing resistor 15_b_, in a case where the voltage dividing resistor 15_b_ is connected to the voltage dividing resistor 11_a_ in parallel and consequently the voltage dividing ratio of the voltage dividing circuit concerned is reduced, if the output voltage Vad of the constant-voltage power supply circuit 10 is not more than a risk upper limit voltage which is further larger than a permissible upper limit voltage, the divided voltage E1 is reduced to a voltage smaller than the second reference voltage Vs2, so that the logic level of the comparison output CMP1 is set to "L".

With respect to the voltage dividing ratio of the voltage dividing resistors 21_d_ and 21_a_ and the voltage dividing resistor 25_b_, in a case where the voltage dividing resistor 25_b_ is connected to the voltage dividing resistor 21_a_ in parallel and consequently the voltage dividing circuit concerned has a small voltage dividing ratio, if the output voltage Vif of the constant-voltage power supply circuit 20 is not more than a risk upper limit voltage which is further larger than a permissible upper voltage, the divided voltage E2 is reduced to a voltage smaller than the second reference voltage Vs2, so that the logic level of the comparison output CMP2 is set to "L".

With respect to the voltage dividing ratio of the voltage dividing resistors 31_d_ and 31_a_ and the voltage dividing resistor 35_b_, in a case where the voltage dividing resistor 35_b_ is connected to the voltage dividing resistor 31_a_ in parallel and consequently the voltage dividing circuit concerned has a small voltage dividing ratio, if the output voltage Vcp of the constant-voltage power supply circuit 30 is not more than a risk upper limit voltage which is further larger than a permissible upper voltage, the divided voltage E3 is reduced to a voltage smaller than the second reference voltage Vs2, so that the logic level of the comparison output CMP3 is set to "L".

With respect to the voltage dividing ratio of the voltage dividing resistors 41_d_ and 41_a_ and the voltage dividing resistor 45_b_, in a case where the voltage dividing resistor 45_b_ is connected to the voltage dividing resistor 41_a_ in parallel and consequently the voltage dividing circuit concerned has a small voltage dividing ratio, if the output voltage Vup of the constant-voltage power supply circuit 40 is not more than a risk upper limit voltage which is further larger than a permissible upper voltage, the divided voltage E4 is reduced to a voltage smaller than the first reference voltage Vs1, so that the logic level of the comparison output CMP4 is set to "L".

With respect to the voltage dividing ratio of the voltage dividing resistors 51_d_ and 51_a_ and the voltage dividing resistor 55_b_, in a case where the voltage dividing resistor 55_b_ is connected to the voltage dividing resistor 51_a_ in parallel and consequently the voltage dividing circuit concerned has a small voltage dividing ratio, if the output voltage Vsb of the constant-voltage power supply circuit 50 is not more than a risk upper limit voltage which is further larger than a permissible upper voltage, the divided voltage E5 is reduced to a voltage smaller than the first reference voltage Vs1, so that the logic level of the comparison output CMP5 is set to "L".

The relationship between the voltage dividing ratio and the variation range having a slightly larger width than the permissible variation range of each output voltage Vad, Vif, Vcp, Vup, Vsb is set so as to satisfy the following condition. That is, in a case where the opening/closing element 16*b*, 26*b*, 36*b*, 46*b*, 56*b* is interrupted and thus the voltage dividing circuit 11D, 21D, 31D, 41D, 51D has a large voltage dividing ratio, if the output voltage Vad, Vif, Vcp, Vup, Vsb of each constant-voltage power supply circuit 10, 20, 30, 40, 50 is not less than a margin lower limit voltage which is further smaller than a permissible lower limit voltage, each divided voltage E1, E2, E3, E4, E5 is larger than the first or second reference voltage Vs1, Vs2 as a reference, and thus the logic level of each comparison output CMP1, CMP2, CMP3, CMP4, CPM5 is set to "H".

In the foregoing description, the voltage dividing resistors 15*b*, 25*b*, 35*b*, 45*b*, 55*b* are connected to the voltage dividing resistors 11*a*, 21*a*, 31*a*, 41*a*, 51*a* at the downstream side of the voltage dividing circuits 11D, 21D, 31D, 41D, 51D on the basis of the correcting instruction signal PWM. However, the voltage dividing resistors 15*b*, 25*b*, 35*b*, 45*b*, 55*b* may be connected to the voltage dividing resistors 11*d*, 21*d*, 31*d*, 41*d*, 51*d* at the upstream side so that the voltage dividing ratio is increased when the logic level of the correcting instruction signal PWM is set to "H".

Furthermore, with respect to the fourth and fifth constant-voltage power supply circuits 40 and 50 each having a small current capacity to which a high precision voltage is not required, if the constant-voltage precision thereof is set to the same level as the first constant-voltage power supply circuit 10, this is convenient to judge the presence or absence of the overall power supply abnormality more surely. Furthermore, in the foregoing description, the first to fifth comparison outputs CMP1 to CMP5 are input to the microprocessor 121, and the microprocessor 121 generates the correcting instruction signal PWM. However, the first to fifth comparison outputs CMP1 to CMP5 may be input to the monitor control circuit unit 131C so that the monitor control circuit unit 131C generate the correcting instruction signal PWM and the abnormality judgment result is transmitted to the microprocessor 121.

(2) Detailed Description of Action and Operation

Next, the action and operation of the in-vehicle mount electronic controller 100C constructed as shown in FIG. 9 will be described in detail.

First, in FIG. 9, when the power supply switch 103 closes the circuit, the exciting coil 102*b* of the power supply relay is energized and the output contact point 102*a* closes the circuit. By the circuit closing of the output contact point 102*a*, the main power supply voltage Vb is supplied from the in-vehicle mount electronic controller 100C, and the constant-voltage power supply 110C generates the first, second and third output voltages Vad, Vif, Vcp in addition to the fourth and fifth output voltages Vup, Vsb to start the operation of the microprocessor 121. The microprocessor 121 generates the control output signal to drive-control the first and second in-vehicle mount electronic loads 106*a* and 106*b* in accordance with the operation states of the first and second analog sensors 104*a*, 104*b* and the first and second switch sensors 105*a* and 105*b* as the in-vehicle sensor group and the control program stored in the non-volatile program memory 122C.

Various kinds of abnormality occurrence information and learning storage information occurring during operation of the microprocessor 121 are stored in the backup memory 123*b*, and then collectively stored in the non-volatile data memory 128C as a specific address area of the non-volatile program memory 122C. The action when the output voltage of the constant-voltage power supply 110C is excessively large during operation is the same as shown in FIG. 3.

Next, the abnormality detecting operation of the in-vehicle electronic controller 100C constructed as shown in FIG. 9 will be described with reference to the flowcharts of FIGS. 11 and 12, and the difference from the flowchart of FIGS. 7 and 8 will be described. In the flowcharts of FIGS. 11 and 12, with respect to the numbers representing the steps, the numbers of 700s and 800s in the flowcharts of FIGS. 7 and 8 are replaced by the numbers of 1100s and 1200s. However, as a unique difference, the step 1110*a* corresponding to the step 710*a* constituting the preferential judgment section of FIG. 7 does not exist in FIG. 11. This is because the divided voltage E1*s* of the first output voltage Vad is used as the comparison reference voltage in the flowchart of FIG. 7, but all the output voltages Vad, Vif, Vcp, Vup, Vsb are compared with the first and second reference voltages Vs1, Vs2 generated in the reference voltage generating circuits 111, 112 in the case of FIG. 11.

The control flow of FIGS. 11 and 12 and FIGS. 7 and 8 will be described. A step 1101 (or step 701) is a step constituting a correcting instruction section. The correcting instruction section constitutes a duty adjusting section for gradually increasing or reducing the opening/closing duty of the opening/closing elements 16*b*, 26*b*, 36*b*, 46*b*, 56*b* (or 26*b*, 36*b*, 46*b*, 56*b*). A step block 1105 (or step block 705) constitutes an individual abnormality detecting section, and the individual abnormality detecting section is constructed by a zone abnormality detecting section represented by step 1204 (or step 804) and a variation abnormality detecting section represented by step 1207 (or step 807). The zone abnormality detecting section 1204 (or 804) judges whether the relevant duty corresponding to the value of the variable duty at the time point when each of the first to fifth comparison circuits 13*b*, 23*b*, 33*b*, 43*b*, 53*b* (or second to fifth comparison circuits 23*b*, 33*b*, 43*b*, 53*b*) generates a comparison coincidence output is within the permissible duty range corresponding to the permissible zone data. The variation abnormality detecting 1207 (or 807) judges whether the deviation value between the initial duty value as the variable duty value corresponding to the initial value data and the value of the relevant duty corresponding to the value of the variable duty at the time point when each of the first to fifth comparison circuits 13*b*, 23*b*, 33*b*, 43*b*, 53*b* (or second to fifth comparison circuits 23*b*, 33*b*, 43*b*, 53*b*) generates a comparison coincidence output is within the permissible variation duty range.

The zone abnormality detecting section 1204 (or 804) or the variation abnormality detecting section 1207 (or 807) is executed by the microprocessor 121 according to the control program stored in the non-volatile program memory 122*c* (or 122B), or executed in the monitor control circuit unit 131C (or 131B) of the combination control circuit unit 130C (or 130B). When it is executed in the monitor control circuit unit 131C (or 131B), the permissible zone data or the initial value data and the permissible variation data are transferred from the non-volatile program memory 122C (or 122B) to the auxiliary RAM memory 133 and stored therein.

A step block 1109 (or step block 709) constitutes a logic inversion detecting section, and the logic inversion detecting section monitors the logic level of the comparison outputs CMP1 to CMP5 (or CMP2 to CMP5) generated by the comparison circuit 142C (or 142B) in the gradual increasing or decreasing process of the opening/closing duty by the duty adjusting section 1101 (or 701), and detects the value of the duty at the time point when the logic level varies. A step 1110*b* (or step 710*b*) constitutes a comprehensive abnormality judging section, and the comprehensive abnormality judging section is a majority decision judging section for analyzing and estimating wholly in accordance with the abnormality detection result of the individual abnormality detecting section 1105 (or 705) which output voltage of the first, second and third output voltages Vad, Vif, Vcp and the fourth or fifth output voltage Vup, Vsb is abnormal, and judging that the comparison reference voltage Vs1, Vs2 is abnormal if plural output voltages using the same comparison reference voltage Vs1, Vs2 are abnormal. A step 1113 (or step 713) constitutes the first, second and third abnormality processing sections 1113*a*, 1113*b*, 1113*c* (or 713*a*, 713*b*, 713*c*), and the details of these first, second and third abnormality processing sections 1113*a*, 1113*b*, 1113*c* (or 713*a*, 713*b*, 713*c*) are the same as the first, second and third abnormality processing sections 413*a*, 413*b*, 413*c* described in the step S413 of FIG. 4, respectively.

The step 1202*a* (or step 802*a*) constitutes an initial duty storing section. The initial duty storing section stores the value of the opening/closing duty at the time point when the logic inversion detecting section 1109 (or 709) detects the logic variation at the shipping inspection time or during initial operation. A step 1202*b* (or step 802*b*) constitutes a relevant duty storing section, and the relevant duty storing section 1202*b* (or 802*b*) stores the value of the opening/closing duty at the time point when the logic inversion detecting section 1109 (or 709) detects the logic variation. A step 1203 (or 803) constitutes a judgment data converting section, and this judgment data converting section contains actually measured data corresponding to actual products at the shipping inspection time or the average value data of preliminary experimental data using many samples for the corresponding relationship between the output voltage of each constant-voltage power supply circuit and the opening/closing duty of the opening/closing element 16*b*, 26*b*, 36*b*, 46*b*, 56*b* (or 26*b*, 36*b*, 46*b*, 56*b*) when the comparison output CMP1 to CMP5 (or CMP2 to CMP5) of the judgment signal input circuit 142C (or 142B) is inverted, converts the duty value stored in the relevant duty storing section 1202*b* (or 802*b*) stored by the relevant duty storing section 1202*b* (or 802*b*) to the present output voltage, and then compares the permissible zone data as the permissible upper and lower values to each output voltage Vad, Vif, Vcp, Vup, Vsb (or Vif, Vcp, Vup, Vsb), or the initial value data and the permissible variation data. The details are the same as described with reference to FIG. 8.

(3) Summary and Effect of Third Embodiment

The in-vehicle mount electronic controller 100C according to the third embodiment of the present invention which has the microprocessor 121 for drive-controlling the in-vehicle mount electronic load groups 106*a* and 106*b* in accordance with operation states of the in-vehicle mount sensor groups 104*a*, 104*b*, 105*a*, 105*b* and contents of the control programs stored in the non-volatile program memory 122C, the combination control circuit unit 130C that is serially connected to the microprocessor 121 to mediate and connect some input/output signals, the constant-voltage power supply source 110C for supplying power to the microprocessor 121, the combination control circuit unit 130C and the input/output interface circuit therefore, and the power supply abnormality detecting circuit 140C for detecting abnormality of the constant-voltage power supply source 110C.

The in-vehicle mount electronic controller 100C is characterized in that the constant-voltage power supply source 110*c* contains the plural constant-voltage power supply circuits 10, 20, 30, 60 supplied with power form the in-vehicle mount battery 101, the respective constant-voltage power supply circuits 10,20,30,60 being subjected to negative feedback control so as to be proportional to the reference voltages Vs1, Vs2 generated by the reference voltage generating circuits 111, 112 to thereby generate the output voltages Vad, Vif, Vcp, Vup, Vsb having the predetermined permissible variable band width, the power supply abnormality detecting circuit 140C contains the judgment signal input circuit 142C which cooperates with at least one of the microprocessor 121 and the combination control circuit unit 130C to detect individual abnormality for each of plural monitor target output voltages selected from plural output voltages generated by the constant-voltage power supply source 110C, at least one of the microprocessor 121 and the combination control circuit unit 130C further contains the individual abnormality detecting section 1105 and the comprehensive judging processing section 1120, the judgment signal input circuit 142C inputs relative voltage information between each output voltage and the comparison reference voltage with respect to each of the plural monitor target output voltages to at least one of the microprocessor 121 and the combination control circuit unit 130C, at least one of the reference voltages Vs1, Vs2 generated by the reference voltage generating circuits 111, 112 is used as the comparison reference voltage, the individual abnormality detecting section 1105 individually detects, on the basis of the relative voltage information input from the judgment signal input circuit 142C, the presence or absence of band abnormality as to whether each of the plural monitor target output voltages is a voltage value within each permissible variation band, and the comprehensive judging processing section 1120 makes a comprehensive judgment containing the presence or absence of abnormality of the comparison reference voltage when it is detected by the individual abnormality detecting section 1105 that individual abnormality is detected in at least one of the plural target output voltages, and carries out at least one of reporting of abnormality and storing of abnormality occurrence information.

As described above, the in-vehicle mount electronic controller 100C according to the third embodiment sets the output voltage of the reference voltage generating circuit as the comparison reference voltage, detects the presence or absence of individual abnormality by making the band comparison as to whether each of the output voltages of the plural constant-voltage power supply circuits is within the permissible variation width, and comprehensively judges individual abnormality individually to thereby execute abnormality processing.

Accordingly, the presence or absence of the band abnormality can be individually accurately detected for the plural constant-voltage power supply circuits by using the high-precision comparison reference voltage, and also precision abnormality of the output voltage is detected as risk prediction information and abnormality is reported or abnormality occurrence record is stored before the microprocessor or the combination control circuit unit falls into an operation stop state. Therefore, there is an effect that maintenance check can be performed before an abnormal-decrease or abnormal-increase accident occurs or risk prediction can be performed by periodic check.

Furthermore, there is also an effect that not only individual abnormality can be detected, but also identification information as to which constant-voltage power supply circuit falls into an individual abnormality state or whether the comparison reference voltage itself is abnormal or not is added to report abnormality or store abnormality record information, thereby facilitating maintenance check.

Furthermore, the in-vehicle mount electronic controller 100C according to the third embodiment is characterized in that the constant-voltage power supply source 110C contains first, second and third constant-voltage power supply circuits 10, 20, 30 and the additional constant-voltage power supply circuit 60, the first constant-voltage power supply circuit 10 is a power supply circuit for generating the first output voltage Vad which is smaller in load current, but higher in precision as compared with the second and third constant-voltage power supply circuits 20, 30, the first constant-voltage power supply circuit 10 is used as a power supply for the first multi-channel AD converter 124 which directly inputs to microprocessor 121, the first analog interface circuit 114*a* and at least a part of the first analog sensor 104*a*, the first constant-voltage power supply circuit 10 is also used as a power supply for the second multi-channel AD converter 134, the second analog interface circuit 114*b* and at least a part of the second analog sensor 104*b* when the combination control circuit unit 130C is connected to the second analog sensor 104*b* through the second multi-channel AD converter 134 and the second analog interface circuit 114*b*, the second constant-voltage power supply circuit 20 is a power supply circuit which has larger load current than the first constant-voltage power supply circuit 10 and generates the second output voltage Vif which has the same level as the first output voltage Vad, but is lower in constant-voltage control precision, the second constant-voltage power supply circuit 20 is used as a power supply for input/output interface circuits 125, 126 in the microprocessor 121 and input/output interface circuits 135, 136 in the combination control circuit unit 130C, the third constant-voltage power supply circuit 30 is a power supply circuit for generating the third output voltage Vcp which is a voltage different from the first output voltage Vad, the third constant-voltage power supply circuit 30 is used as a power supply for the calculation unit of the microprocessor 121, the non-volatile program memory 122C and RAM memory 123*a* for calculation processing, and the additional constant-voltage power supply circuit 60 contains a power supply circuit for generating the additional output voltage having the same level constant-voltage control precision as the first output voltage Vad.

According to this construction, a load-based selective use style in which a low-precision large-capacity power supply having the same level voltage as a high-precision small-capacity power supply and a different-voltage large-capacity power supply are properly selectively used is adopted. Accordingly, by limiting the application of the high-precision power supply, a power supply which is inexpensive as a whole can be constructed.

Still furthermore, the in-vehicle mount electronic controller 100C according to the third embodiment is characterized in that the first, second and third constant-voltage power supply circuits 10, 20, 30 are supplied with power from the in-vehicle mount battery 101 to generate the first, second and third output voltages Vad, Vif, Vcp by closing the power supply switch 103, the additional constant-voltage power supply circuit 60 contains at least one of the fourth constant-voltage power supply circuit 40 and the fifth constant-voltage power supply circuit 50, the fourth constant-voltage power supply circuit 40 is a power supply circuit of low power consumption which is supplied with power from the in-vehicle mount battery 101 to generate the fourth output voltage Vup even under the state that the power supply switch 103 is opened, the fourth constant-voltage power supply circuit 40 is a power supply circuit used as a power supply for at least one of the backup memory 123*b* of the microprocessor 121 and the auxiliary RAM memory 133 of the combination control circuit unit 130C, the fifth constant-voltage power supply circuit 50 is a power supply which is supplied with power from the in-vehicle mount battery 101 to generate the fifth output voltage Vsb different from the first output voltage vad under any state that the power supply switch 103 is closed or opened, and is lower in power consumption than the second and third constant-voltage power supply circuits 20, 30, the fifth constant-voltage power supply circuit 50 is used as a power supply for the monitor control circuit 131C in the combination control circuit unit 130C, the monitor control circuit 131C is a circuit for inputting a monitor input signal from the in-vehicle mount sensor groups 104*b*, 105*b* to the microprocessor 121, and drive-controlling the in-vehicle mount load group 106*b* on the basis of a control output signal from the microprocessor 121, and at least one of the fourth and fifth output voltages Vup and Vsb has the same level constant-voltage control precision as the first output voltage Vad and is output as the additional output voltage.

According to this construction, the additional constant-voltage power supply circuit contains at least one of the fourth constant-voltage power supply circuit and the fifth constant-voltage power supply circuit which have the same level output voltage as the first output voltage. The fourth constant-voltage power supply circuit is directly supplied with power from the in-vehicle mount battery, so that some storage state of the RAM memory can be held even under the state that the power supply switch is interrupted and thus the power supply to the first to third constant-voltage power supply circuits is interrupted.

Furthermore, the fifth constant-voltage power supply circuit is also directly supplied with power from the in-vehicle mount battery, and thus the combination control circuit unit can be operated under the state that the power supply switch is interrupted.

Furthermore, the output voltages of the fourth and fifth constant-voltage power supply circuits do not originally require high constant-voltage precision. However, it has small load current, and also little variation of the load current because it does not supply power to elements other than a first integrated circuit element mainly comprising the microprocessor or a second integrated circuit element constituting the combination control circuit unit, so that the constant-voltage precision can be relatively easily enhanced.

Furthermore, in the in-vehicle mount electronic controller 100C of the third embodiment, the power supply abnormality detecting circuit 140C has the voltage dividing ratio correcting circuit 146C with the judgment signal input circuit 142C, the judgment signal input circuit 142C has plural voltage dividing circuits 11D,21D,31D,41D,51D for dividing the plural monitor target output voltages respectively and plural comparison circuits 13*b*,23*b*,33*b*,43*b*,53*b* for comparing the respective voltage-divided voltages from the respective voltage dividing circuits 11D,21D,31D,41D,51D with the comparison reference voltage to generate the relative voltage information CMP1 to CMP5, the voltage dividing ratio correcting circuit 146C contains opening/closing elements 16*b*, 26*b*, 36*b*, 46*b*, 56*b* and the smoothing circuit 149C for variably controlling the voltage dividing ratio of each voltage dividing circuit 11D,21D,31D, 41D,51D and corrects the voltage dividing ratio of each voltage dividing circuit 11D,21D,31D,41D,51D on the basis of the correcting instruction signal PWM generated by the correcting instruction section 1101 provided to at least one of the microprocessor 121 and the combination control circuit unit 130C, permissible band duties corresponding to the respective permissible variation band widths of the plural monitor target output voltages are stored in the non-volatile program memory 122C, the opening/closing elements 16*b* 26*b*,36*b*,46*b*,56*b* carry out the opening/closing operation with a variable duty which varies in accordance with the correcting instruction signal PWM, the smoothing circuit 149C is a low pass filter for smoothing the increase/decrease of each divided voltage based on the opening/closing operation of the opening/closing element 16*b*,26*b*,36*b*,46*b*,56*b* and inputting the averaged divided voltage to the comparison circuits 13*b*,23*b*,33*b*,43*b*,53*b*, the individual abnormality detecting section 1105 judges whether the duty corresponding to the variable duty at the time point when each divided voltage is coincident with the comparison reference voltage is within the permissible range corresponding to the permissible band duty, and the individual abnormality detecting section 1105 is executed in at least one of the microprocessor 121 and the monitor control circuit unit 131C of the combination control circuit unit 130C, the permissible band duty is transferred to and stored in the auxiliary RAM memory 133 of the combination control circuit unit 130C from the non-volatile program memory 122C when the individual abnormality detecting section 1105 is executed in the monitor control circuit unit 131C of the combination control circuit unit 130C.

In this construction, the permissible band duty for detecting band abnormality is extracted on the basis of experiment data based on many samples, the extracted data concerned are stored in the non-volatile program memory, and each output voltage is detected by the duty concerned as the value of the variable duty when it is coincident with the comparison reference voltage. Accordingly, the detection error based on the solid variation of the applied component constant is corrected, and the abnormality can be accurately detected. In addition, no analog input channel is required, and the present value of each output voltage can be measured by using a pulse width modulation signal of one point.

Furthermore, the in-vehicle mount electronic controller 100C according to the third embodiment is characterized in that the reference voltage generating circuit has first and second reference voltage generating circuits 111,112 for generating at least first and second reference voltages Vs1 and Vs2, the first, second and third output voltages Vad, Vif, Vcp and the additional output voltages Vup, Vsb are classified in accordance with whether any one of the first and second reference voltages Vs1 and Vs2 is used or in accordance with which one of the first and second voltages Vs1 and Vs2 was used when both the reference voltages are used, and the voltage at the comparison reference side to be compared with the first to fifth output voltages in the judgment signal input circuit 142C is based on a group different from the reference voltage generating circuits 111, 112 used in the first to fifth constant-voltage power supply circuits 10, 20, 30, 40, 50 or based on a comparison reference voltage generating circuit different from the reference voltage generating circuits 111, 112 used for comparison reference and the reference voltage generating circuit used in the first to fifth constant-voltage power supply circuits 10, 20, 30, 40, 50.

According to this construction, the constant-voltage power supply circuits are grouped, the reference voltage generating circuit is provided every group, and the reference voltage generating circuit being used is different between the divided voltage to be compared in each judging circuit and the voltage at the comparison reference. Accordingly, even when there is abnormality in the output voltage of the reference voltage generating circuit, the abnormality can be detected by the power supply abnormality detecting circuit. If the first, second and third constant-voltage power supply circuits are respectively subjected to negative feedback control by the first reference voltage obtained by the first reference voltage generating circuit and the output voltage of the first reference voltage generating circuit varies abnormally, it is impossible to detect abnormality by the comparison between the respective output voltages of the first and second constant-voltage power supply circuits, the comparison between the respective output voltages of the first and third constant-voltage power supply circuits or the comparison between each output voltage and the first reference voltage. Accordingly, reference voltage generating circuits are set up in the form of a double system, and they are compared with each other to thereby detect abnormality between them.

Still furthermore, the in-vehicle mount electronic controller 100C according to the third embodiment is characterized in that the comprehensive judging processing section 1120 contains a comprehensive abnormality judging unit 1110*b*, and also contains at least one of first, second and third abnormality processing sections 1113*a*, 1113*b*, 1113*c*, and the comprehensive abnormality judging unit 1110*b* monitors the relative voltage information to analyze and estimate as a whole which output voltage of the plural monitor target output voltages is abnormal, and makes a majority decision judgment that the comparison reference voltage is judged to be abnormal when plural monitor target output voltages compared with the comparison reference voltage are abnormal, when the abnormality of the second, third and fifth output voltages Vif, Vcp, Vsb is detected on the basis of the judgment result of the comprehensive abnormality judging unit 1110*b* under the state that the additional constant-voltage power supply circuit 60 contains the fifth constant-voltage power supply circuit 50, the first abnormality processing section 1113*a* carries out at least reporting of the abnormality concerned and storing of abnormality occurrence information of the abnormality concerned, when abnormality of the first output voltage Vad is detected on the basis of the judgment result of the comprehensive abnormality judging unit 1110*b*, the second abnormality processing section 1113*b* carries out at least one of reporting of abnormality and storing of abnormality occurrence information of the abnormality concerned, and it substitutes correction replacement data at the safety side for the input signal obtained from the first analog sensor 104*a* and the input signal obtained form the second analog sensor 104*b* if the combination control circuit unit 130C is connected to the second analog sensor 104*b* through the second multi-channel AD converter 134 and the second analog interface circuit 114*b*, and when the fourth output voltage Vup is detected to be abnormal on the basis of the judgment result of the comprehensive abnormal judgment unit 1110*b* in the case where the additional constant-voltage power supply circuit 60 contains the fourth constant-voltage power supply circuit 40, the third abnormality processing section 1113*c* carries out at least one of reporting of the abnormality and storing of abnormality occurrence information of the abnormality concerned, and replaces a variable control constant varying in the backup memory 123*b* because of learning and storage during driving by at least one of a control constant transferred to and stored in the non-volatile data memory 128C and a predetermined reference control constant pre-stored in the non-volatile program memory 122C.

According to this construction, the abnormality reporting or the storing of the abnormality record information is carried out in accordance with the occurrence of abnormality of each output voltage estimated on the basis of the comprehensive abnormality judging unit, and also the correction processing of the analog signal is executed if the first output voltage is abnormal while the learning control constant is returned to the transfer saving information or the reference control constant if the fourth output voltage is abnormal. Accordingly, the precision abnormality of the output voltage which does not yet stop the operation of a watchdog timer circuit or the microprocessor is detected, and the abnormality is reported or the abnormality occurrence history is stored, whereby the abnormal decrease or abnormality increase trouble of the output voltage is expected, so that check maintenance is carried out before a critical trouble occurs or a risk can be predicted by periodic check.

Furthermore, the correction replacement data applied when the first output voltage is abnormal is based on the multiplication of a correction coefficient at the safety side and the present analog signal of each analog sensor or algebra addition of correction bias. Accordingly, the safety of control can be maintained by setting the proper correction coefficient and the correction bias every analog sensor.

Still furthermore, the in-vehicle mount electronic controller 100C according to the third embodiment is characterized in that the monitor control circuit unit 131C of the combination control circuit unit 130C is constructed by a microprocessor serving as sub CPU, and the monitor control circuit unit 131C executes a part of the processing of the comprehensive judging processing section 1120.

According to this construction, the combination control circuit unit for serially communicating input/output signals with the microprocessor is provided, and the monitor control circuit unit provided to the combination control circuit unit takes partial charge of the comprehensive abnormality judgment. Accordingly, it is unnecessary to directly input each judgment signal and the comparison signal to the microprocessor, the number of input/output points of the expensive microprocessor executing at high speed can be saved and the control load imposed on the microprocessor can be reduced.

Still furthermore, the in-vehicle mount electronic controller 100C according to the third embodiment is characterized in that initial value data and permissible variation data at the shipping time concerning the plural monitor target output voltages are stored in any one of the non-volatile data memory 128C and the non-volatile program memory 122C in the in-vehicle mount electronic controller 100C, the individual abnormality detecting section 1105 contains the variation abnormality detecting section 1207, and the variation abnormality detecting section 1207 judges whether a deviation voltage of each of the plural monitor target output voltages from the initial value data thereof is within the permissible variation data, thereby judging individual abnormality.

Accordingly to this construction, the initial value data and the permissible variation data to detect variation abnormality are extracted on the basis of experiment data achieved from actual measurement data based on actual articles and many samples, and the extracted data concerned are stored in a non-volatile program memory or a non-volatile data memory. Accordingly, the detection error based on solid variation of applied component constants is corrected, and abnormality can be accurately detected.

In a case where a variation of each output voltage from the initial value thereof is excessively large, it is added to the individual abnormality because occurrence of abnormality is predicted even when band abnormality is not detected, whereby safety can be enhanced.

Fourth Embodiment

(1) Detailed Description of Construction

The construction of the in-vehicle mount electronic controller 100D according to a fourth embodiment of the present invention will be described in detail.

Figure 13:
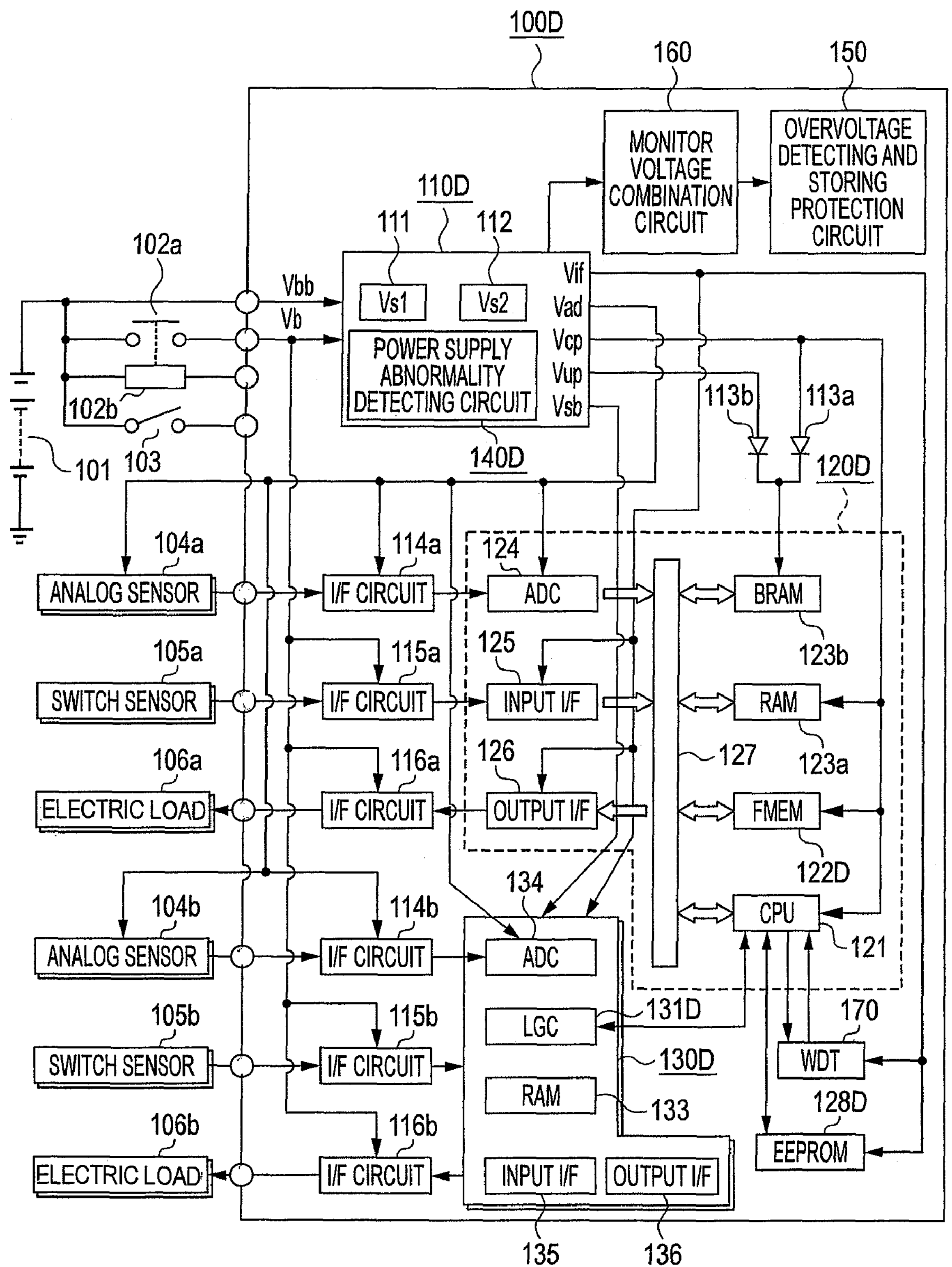
FIG. 13 is an overall circuit diagram showing a fourth embodiment of the in-vehicle mount electronic controller according to the present invention.

FIG. 13 is an overall circuit diagram showing the in-vehicle electronic controller 100D according to the fourth embodiment. The main feature of the in-vehicle mount electronic controller 100D according to the fourth embodiment resides in that the monitor target output voltages are set to the second, third, fourth and fifth output voltages Vif, Vcp, Vup, Vsb in a power supply abnormality detecting circuit 140D of the in-vehicle mount electronic controller 100D according to the fourth embodiment, a relative comparison system using the first output voltage Vad as a comparison reference voltage for judging abnormality of each of the monitor target voltages is adopted, and the judgment of abnormality of the monitor target output voltage is made by the logical judgment based on an individual abnormality detecting section 1309.

In FIG. 13, the main power supply voltage Vb is applied from the in-vehicle mount battery 101 through the output contact point 102*a* of the power supply relay to the in-vehicle mount electronic controller 100D, and the auxiliary power supply voltage Vbb is directly applied from the in-vehicle mount battery 101 even when the output contact point 102*a* is opened. The exciting coil 102*b* of the power supply relay is controlled by the in-vehicle mount electronic controller 100D so as to be energized when the power supply switch 103 is closed, and also de-energized with time delay of a predetermined time when the power switch 103 is opened. First analog sensors 104*a* as an in-vehicle sensor group input to the in-vehicle mount electronic controller 100D are an air-intake amount sensor of an air intake pipe, an exhaust gas sensor, an air intake valve opening degree sensor, and an step-on amount sensor of an acceleration pedal, for example, and second analog sensors 104*b* are a cooling water temperature sensor, a barometer sensor, etc. They generate an operating instruction to the engine for the vehicle and a monitor signal for the driving operation of the engine.

First switch sensors 105*a* contained in the in-vehicle sensor group are a crank angle sensor of the engine, a vehicle speed sensor, etc., and second switch sensors 105*b* are a selected position sensor for the shift lever of a transmission, etc. They generate an operation instruction for the engine of the vehicle, a monitor signal of the driving state of the engine. A first in-vehicle mount electric load group 106*a* which is controlled to be supplied with power from the in-vehicle mount electronic controller 100D contains an electromagnetic valve for fuel injection, an ignition coil (in the case of a gasoline engine), a motor for controlling the opening degree of an air intake valve, and a second in-vehicle mount electronic load 106*b* contains an electromagnetic valve for selecting a shift transmission position, an electrical heater for the exhaust gas sensor, an alarm display device, etc. They control the driving of the engine of the vehicle and report the driving state.

A constant-voltage power supply source 110D contained in the in-vehicle mount electronic controller 100D contains first and second reference voltage generating circuits 111 and 112 using band gap cells, for example, and it generates first, second, third and fifth output voltages Vad, Vif, Vcp, Vsb which are stabilized voltages dropped from the main power supply voltage Vb, and also a fourth output voltage Vup which is a stabilized voltage dropped from the auxiliary power supply voltage Vbb. Diodes 113*a* and 113*b* are connected to a circuit for supplying power to a backup memory 123*b* described later from the third and fourth output voltages Vcp and Vup. First and second analog interface circuits 114*a* and 114*b* constitute a noise filter circuit connected between the first, second analog sensors 104*a*, 104*b* and multi-channel AD converters 124, 134 described later.

A first input interface circuit 115*a* is connected between the first switch sensor 105*a* and an input interface circuit 125 described later. A second input interface circuit 115*b* is connected between the second switch sensor 105*b* and an input interface circuit 135 described later. Each of the first and second input interface circuit 115*a*,115*b* is constructed by a conversion circuit of a signal voltage level and a noise filter circuit. A first output interface circuit 116*a* is connected between the first in-vehicle electronic load 106*a* and an output interface circuit 126 described later. A second output interface circuit 116*b* is connected between the second in-vehicle electronic load 106*b* and an output interface circuit 136 described later. Each of the first and second output interface circuit 116*a*,116*b* is constructed by a power transistor circuit for converting the signal voltage level. The first and second input/output interface circuits 115*a*, 115*b*, 116*a*, 116*b* are supplied with power from the main power supply voltage Vb. A first integrated circuit element 120D is constructed by a microprocessor 121, a non-volatile program memory 122D, an arithmetic processing RAM memory 123*a*, a backup memory 123*b* corresponding to a partial area of the RAM memory, a multi-channel AD converter 124, an input interface circuit 125 and an output interface circuit 126. These constituent elements are connected to one another through a data bus 127. The non-volatile data memory 128F is an EEPROM memory which is serially connected to the microprocessor 121. When a partial area in the non-volatile program memory 122D is used as the non-volatile data memory, this EEPROM memory is not required.

The combination control circuit unit 130D contains a monitor control circuit unit 131D constructed by a hard logic, an auxiliary RAM memory 133, a second multi-channel AD converter 134, an input interface circuit 135 and an output interface 136. The combination control circuit unit 130D is serially connected to the microprocessor 121 through a staticizer (not shown). It transmits a digital conversion value of an analog signal achieved from the second analog sensor 104*b* and an ON/OFF signal achieved from the second switch sensor 105*b* to the microprocessor 121, and also drives the second in-vehicle mount electronic load 106*b* on the basis of a control signal generated by the microprocessor 121. The monitor control circuit unit 131D of the combination control circuit unit 130D may be constructed by a microprocessor serving as sub CPU as in the case of the monitor control circuit units 131B, 131C shown in FIGS. 5 and 9.

The first output voltage Vad serves as a high-precision and small-capacity power supply of DC5V±20 mV/20 mA, for example, and it supplies power to the first and second multi-channel AD converters 124, 134 and the first and second analog interface circuits 114*a*, 114*b* and some of the first and second analog sensors 104*a*, 104*b*. The second output voltage Vif serves as a low-precision and large-capacity power supply of DC5V±0.2V/200 mA, and it supplies power to input interface circuits 125, 135, output interface circuits 126, 136, a non-volatile data memory 128D and a watchdog timer circuit 170. However, the non-volatile data memory 128D may be supplied with power from a first output voltage Vad described later. The third output voltage Vcp serves as a low-precision and large-capacity power supply of DC3.3V±0.3V/500 mA, and it supplies power to the microprocessor 121, a non-volatile program memory 122D, the RAM memory 123*a* and the backup memory 123*b*. The fourth output voltage Vup serves as a low-precision and small-capacity power supply of DC3.3V±0.3V/20 mA and it supplies power to the backup memory 123*b* when the output contact point 102*a* of the power supply relay is opened.

The fifth output voltage Vsb is a small-capacity power supply of DC 2.5V±0.3V/50 mA, for example. However, it is actually designed as a high-precision control power supply of DC 2.5V±10 mV, and by comparing it with the first output voltage Vad, it can be judged whether they are mutually normal or not. In the case of a DC 12V system, the output voltage of the in-vehicle mount battery 101 varies from 8 to 16V. The first and second input interface circuits 115*a* and 115*b* primarily transforms the input voltage from the main power supply voltage Vb of DC 12V system to DC 5V system, and the input interface circuit 125 and 135 further secondarily transforms DC 5V system to DC 3.3V system or 2.5V system. The output interface circuit 126 primarily transform the output voltage of DC 3.3V system to DC 5V system, and the first and second output interface circuits 116*a* and 116*b* secondarily transforms DC 5V system to DC 12V. The microprocessor 121 and the various kinds of memories are operated by the third output voltage Vcp=DC 3.3V system, whereby the high density mounting and high-speed processing of the first integrated circuit element 120D can be performed.

Likewise, the monitor control circuit unit 131D is operated by the output voltage Vsb=DC 2.5V, whereby the high density mounting and high-speed processing of the combination control circuit unit 130D can be performed. However, when the third output voltage Vcp and the fifth output voltage Vsb are the same voltage and designed with the same precision, it is unnecessary to separate the third out voltage Vcp and the fifth output voltage Vsb from each other.

The power supply abnormality detecting circuit 140D will be described later with reference to FIG. 14. Furthermore, the over voltage detecting and storing protection circuit 150 and the monitor voltage combination circuit 160 have the same constructions as the first embodiment. The watch dog timer circuit 170 monitors the pulse width of a watch dog signal WD as a pulse train signal for monitoring runaway occurring in the microprocessor 121, and generates a reset signal when the pulse width is equal to a predetermined value or more, thereby initializing and re-starting the microprocessor 121 and the combination control circuit unit 130D. When the voltage supplied to the watchdog timer circuit 170 abnormally decreases, the watchdog timer circuit 170 continually generates the reset signal to wholly stop occurrence of the outputs of the microprocessor 121 and the combination control circuit unit 130D. Furthermore, when the watchdog timer circuit 170 operates normally, a normal operation signal Ena described later occurs, and it is possible for the first and second output interface circuits 116*a*, 116*b* to generate outputs thereof. When the third output voltage Vcp decreases abnormally, the microprocessor 121 stops occurrence of the overall output thereof, and thus the output logic is unstable. However, it is biased by a pull-up resistor or pull-down resistor externally connected to the output terminal of the microprocessor 121 so as to have an output at the safety side. Likewise, when the fifth output voltage Vsb decreases abnormally, the monitor control circuit unit 131D stops occurrence of the overall output thereof, and thus the output logic is unstable. However, it is biased by a pull-up resistor or pull-down resistor externally connected to the output terminal of the monitor control circuit unit 131D so as to have an output at the safety side.

A light electrical circuit portion containing the first and second analog interface circuits 114*a*, 114*b* and the first and second input interface circuits 115*a*, 115*b* or the first and second output interface circuits 116*a*, 116*b* excluding heating parts with the combination control circuit unit 130D as a core, a constant-voltage control circuit unit excluding a power transistor and heating parts in the constant-voltage power supply source 110D, the power supply abnormality detecting circuit 140D described later and the watchdog timer circuit 170 constitute a second integrated circuit element (not shown). However, the constant-voltage control circuit unit of the constant-voltage power supply source 110D may be constructed as a power module integrated with a power transistor constituting the constant-voltage power supply source 110D.

Next, the power supply abnormality detecting circuit 140D will be described with reference to FIG. 14. In FIG. 14, the first constant-voltage power supply circuit 10 drops a main power supply voltage Vb to generate the first output voltage Vad, the second constant-voltage power supply circuit 20 drops the main power supply voltage Vb to generate the second output voltage Vif, the third constant-voltage power supply circuit 30 drops the main power supply voltage Vb to generate the third output voltage Vcp, the fourth constant-voltage power supply circuit 40 drops the auxiliary power supply voltage Vbb to generate the fourth output voltage Vup, and the fifth constant-voltage power supply circuit 50 drops the main power supply voltage Vb to generate the fifth output voltage Vsb. The fourth and fifth constant-voltage power supply circuits 40, 50 constitute the additional constant-voltage power supply circuit 60.

Each of these constant-voltage power supply circuit is constructed by a power transistor which is subjected to negative feedback continuous control so that a voltage proportional to the output voltage of each of the constant-voltage power supply circuits is equal to the first or second reference voltage Vs1, Vs2 generated by the first or second reference voltage generating circuit 111, 112, and it is a regulator which is popularly called as a dropper type. In the fourth embodiment shown in FIG. 14, the first reference voltage Vs1 is used in the first, second and third constant-voltage power supply circuits 10, 20, 30, and the second reference voltage Vs2 is used in the fourth and fifth constant-voltage power supply circuits 40, 50. However, with respect to the fourth constant-voltage power supply circuit 40, the third reference voltage Vs3 which is low in power consumption, simple and low in precision.

The power supply abnormality detecting circuit 140D has a voltage dividing circuit 141D and a judgment signal input circuit 142D. The voltage dividing circuit 141D contains first, second, third, fourth and fifth voltage dividing circuits 19*a*, 27*a*, 37*a*, 47*a*, 57*a*, and these voltage dividing circuits correspond to the first, second, third, fourth and fifth constant-voltage power supply circuits 10, 20, 30, 40, 50. The first voltage dividing circuit 19*a* generates a comparison reference voltage, and it is constructed by a series circuit of two voltage dividing resistors 11*a*, 11*c* of high precision and supplied with the first output voltage Vad to generate a divided voltage E1*s*. The divided voltage E1*s* is supplied as the comparison reference voltage to the judgment signal input circuit 142D. The second voltage dividing circuit 27*a* is constructed by a series circuit of three voltage dividing resistors 21*a*, 21*b*, 21*c* of high precision, and supplied with the second output voltage Vif to generate a second low-side divided voltage E21 and a second upper-side divided voltage E22.

The third voltage dividing circuit 37*a* is constructed by a series circuit of three voltage dividing resistors 31*a*, 31*b*, 31*c* of high precision, and supplied with the third output voltage Vcp to generate a third low-side divided voltage E31 and a third upper-side divided voltage E32. The fourth voltage dividing circuit 47*a* is constructed by a series circuit of three voltage dividing resistors 41*a*, 41*b* and 41*c* of high precision and supplied with the fourth output voltage Vup to generate a fourth lower-side divided voltage E41 and a fourth upper-side divided voltage E42. The fifth voltage dividing circuit 57*a* is constructed by a series circuit of three voltage dividing resistors 51*a*, 51*b*, 51*c* of high precision, and supplied with the fifth output voltage Vsb to generate a fifth lower-side divided voltage E51 and a fifth upper-side divided voltage E52.

The judgment signal input circuit 142D contains second, third, fourth and fifth judgment signal input circuits 142D2, 142D3, 142D4 and 142D5, and these judgment signal input circuits are constructed by second, third, fourth and fifth judging circuits 28*a*, 38*a*, 48*a*, 58*a*, respectively. The second judging circuit 28*a* is constructed by a comparison first circuit CP1, a comparison second circuit CP2 and a logical coupling section ORL. A comparison reference voltage, that is, the divided voltage E1*s* is input to the positive input terminal of the comparison first circuit CP1 in the second comparison circuit 28*a*, and the second upper-side divided voltage E22 is input to the negative input terminal of the comparison first circuit CP1 as a comparison target voltage. The comparison first circuit CP1 generates a first comparison logical output whose logical level is set to "H" when the value of the second upper-side divided voltage E22 is smaller than the value of the divided voltage E1*s*, and outputs the first comparison logical output to a logical coupling section ORL as a logical addition element.

The comparison reference voltage, that is, the divided voltage E1*s* is input to the negative input terminal of the comparison second circuit CP2 in the second comparison circuit 28*a*, and the second lower-side divided voltage E21 is input to the positive input terminal of the comparison second circuit CP2 as the comparison target voltage. The comparison second circuit CP2 generates a second comparison logical output whose logical level is set to "H" when the value of the second lower-side voltage divided voltage E21 exceeds the value of the divided voltage E1*s*, and outputs the second comparison logical output to a logical coupling section ORL as a logical addition element.

The logical coupling section ORL in the second comparison circuit 28*a* inputs the logical addition output of the first logical output from the comparison first circuit CP1 and the second logical output from the comparison second circuit CP2 to the microprocessor 121 as a second judgment signal ER2. The second judgment signal ER2 is the relative voltage information of the second output voltage Vif with respect to the comparison reference voltage.

A third judging circuit 38*a* is constructed by the comparison first circuit CP1, the comparison second circuit CP2 and the logical coupling section ORL as in the case of the second judging circuit 28*a*, and inputs the logical addition output between the comparison logical output of the comparison reference voltage, that is, the divided voltage E1*s* and the third upper-side divided voltage E32, and the comparison logical output of the divided voltage E1*s* and the third lower-side divided voltage E31 to the microprocessor 121 as a third judgment signal ER3.

As in the case of the second judging circuit 28*a*, a fourth judging circuit 48*a* is also constructed by the comparison first circuit CP1, the comparison second circuit CP2 and the logical coupling section ORL, and it inputs the logical addition output between the comparison logical output of the comparison reference voltage, that is, the divided voltage E1*s* and the fourth upper-side divided voltage E42, and the comparison logical output of the divided voltage E1*s* and the fourth lower-side divided voltage E41 to the microprocessor 121 as a fourth judgment signal ER4.

As not shown, a fifth judging circuit 58*a* is constructed by the comparison first circuit CP1, the comparison second circuit CP2 and the logical coupling section ORL as in the case of the second judging circuit 28*a*, and it inputs the logical addition output between the comparison logical output of the comparison reference voltage, that is, the divided voltage E1*s* and the fifth upper divided voltage E52, and the comparison logical output of the voltage divided voltage E1*s* and the fifth lower-side divided voltage E51 to the microprocessor 121 as a fifth judgment signal ER5.

The third, fourth and fifth judgment signals ER3, ER4 and ER5 are the relative voltage information of the third, fourth and fifth output voltages Vcp, Vup, Vsb with respect to the comparison reference voltage, respectively. The second, third, fourth and fifth judging circuits 28*a*, 38*a*, 48*a*, 58*a* are supplied with power from the first and second output voltages Vad, Vif through the diodes 68 and 69.

The upper-side divided voltage E22 and the lower-side divided voltage E21 of the voltage dividing circuit 27*a* vary in accordance with variation of the second output voltage Vif. These divided voltages E21 and E22 cooperate with the judging circuit 28*a* and vary in accordance with the variation of the second output voltage Vif, whereby varying the logical level of the judgment signal ER2. The divided voltages E21 and E22 are compared with the comparison reference voltage, that is, the divided voltage E1*s* in the comparison second circuit CP2 and the comparison first circuit CP1. The lower-side divided voltage E21 is compared with the divided voltage E1*s* in the comparison second circuit CP2, and the output of the comparison second circuit CP2 is set to the logical level "H" when the second output voltage Vif is larger than the upper limit value of the permissible variation band width thereof. The output of the comparison second circuit CP2 is set to the logical level "L" in the range that the second output voltage Vif is smaller than the permitted upper limit voltage. However, when the second output voltage Vif is larger than the upper limit value of the permissible variation band width thereof, the lower-side divided voltage E21 is larger than the divided voltage E1*s*, and thus it is set to the logical level "H". The upper-side divided voltage E22 is compared with the comparison reference voltage, that is, the divided voltage E1*s* in the comparison first circuit CP1, and when the second output voltage Vif is smaller than the lower limit value of the permissible variation band width thereof, the output of the comparison first circuit CP1 is set to the logical level "H". The output of the comparison first circuit CP1 is set to the logical level "L" in the range that the second output voltage Vif is larger than the permitted lower limit voltage. However, when the second output voltage Vif is smaller than the lower limit value of the permissible variation band width thereof, the upper-side divided voltage E22 is smaller than the divided voltage E1*s*, and it is set to the logical level "H". As a result, the judging signal ER2 of the logical coupling section ORL holds the logical level "L" when the second output voltage Vif is within the permissible variation band width thereof, and it is set to the logical level "H" when the second output voltage Vif is deviated from the permissible variation band width. In the voltage dividing circuit 27*a*, the voltage dividing ratio for determining the divided voltages E21 and E22 is set so that the judging signal ER2 of the logical coupling section ORL is set to the logical level "H".

The third, fourth and fifth voltage dividing circuits 37*a*, 47*a*, 57*a* also cooperate with the judging circuits 38*a*, 48*a*, 58*a* to operate in the same manner as described above. Assuming that the comparison reference voltage, that is, the divided voltage E1*s* is equal to a value within a normal variation width, the second, third, fourth and fifth judgment signals ER2, ER3, ER4, ER5 are set to the logical level "L" if the third, fourth and fifth output voltages Vcp, Vup, Vsb are within the respective permissible variation band widths. However, if each output voltage is deviated from the permissible variation band width thereof, the judgment signal thereof is set to the logical level "H". However, when the positive and negative inputs of each comparison circuit are inverted, the logical coupling section does not correspond to the logical addition element, and thus an element suitable for input logic is required. Accordingly, it is possible to set the output to the logical level "L" when the output voltage is deviated from the permissible variation width. In a case where there is connected a saving diode 113*c* which can supply power from the second output voltage Vif to the first output voltage Vad, power supply to the analog system can be performed by the second output voltage Vif even when the first output voltage Vad is equal to zero.

In the foregoing description, the fourth constant-voltage power supply circuit 40 has been described as the constant-voltage power supply circuit which is directly supplied with power from the in-vehicle mount battery 101. However, in an application where the backup memory 123*b* is not required, the fourth constant-voltage power supply circuit 40 is unnecessary.

Furthermore, in the foregoing description, the third and fifth constant-voltage power supply circuits 30, 50 are supplied with power from the main power supply voltage Vb. However, the third and fifth constant-voltage power supply circuits 30, 50 may be cascade-connected to each other so as to be supplied with power from the second constant-voltage power supply circuit 20. In this case, a switching regulator based on ON/OFF duty control of a power transistor may be used as the second constant-voltage power supply circuit 20, however, continuous control type regulators which are popularly called as dropper type are used as the other constant-voltage power supply circuits 10, 30, 40, 50.

Still furthermore, in the foregoing description, the constant-voltage precision of the output voltage of the fourth and fifth constant-voltage power supply circuits 40, 50 is set to be low. However, at least one of the fourth and fifth constant-voltage power supply circuits 40, 50 is set to have the same level constant-voltage precision as the first constant-voltage power supply circuit 10, whereby the abnormality judgment of the first constant-voltage power supply circuit 10 can be more surely performed.

Still furthermore, in the foregoing description, the logical coupling element ORL is provided in each judging circuit. However, it is possible to individually input the output of each of the comparison first circuit CP1 and the comparison second circuit CP2 to the microprocessor to the microprocessor 121 and perform the logical coupling in the microprocessor 121. In this case, the microprocessor 121 identifies whether the voltage precision abnormality is upper-limit exceeding abnormality or lower-limit underrunning abnormality, and save it as abnormality history information.

In the foregoing description, the band judgment of the up-and-down variation width is executed by using the comparison first circuit CP1 and the comparison second circuit CP2 as a pair of comparison circuits. However, as described later with reference to a sixth embodiment, by using an instructing section of correcting a voltage dividing ratio, the band judgment of the up-and-down variation width can be performed with one comparison circuit. In the foregoing description, the judgment signals ER2, ER3, ER4, ER5 for the respective monitor target output voltages Vif, Vcp, Vup, Vsb are directly input to the microprocessor 121. However, when the combination control circuit unit 130D is used, the signals can be serially transmitted to the microprocessor 121 through the combination control circuit unit 130D. Furthermore, a comprehensive judgment of comprehensively judging many judgment signals ER2, ER3, ER4, ER5 and specifying an abnormality-occurring output voltage on the basis of majority decision processing may be executed in the combination control circuit unit 130D, and then the conclusion may be serially transmitted to the microprocessor 121.

(2) Detailed Description of Action and Operation

Figure 14:
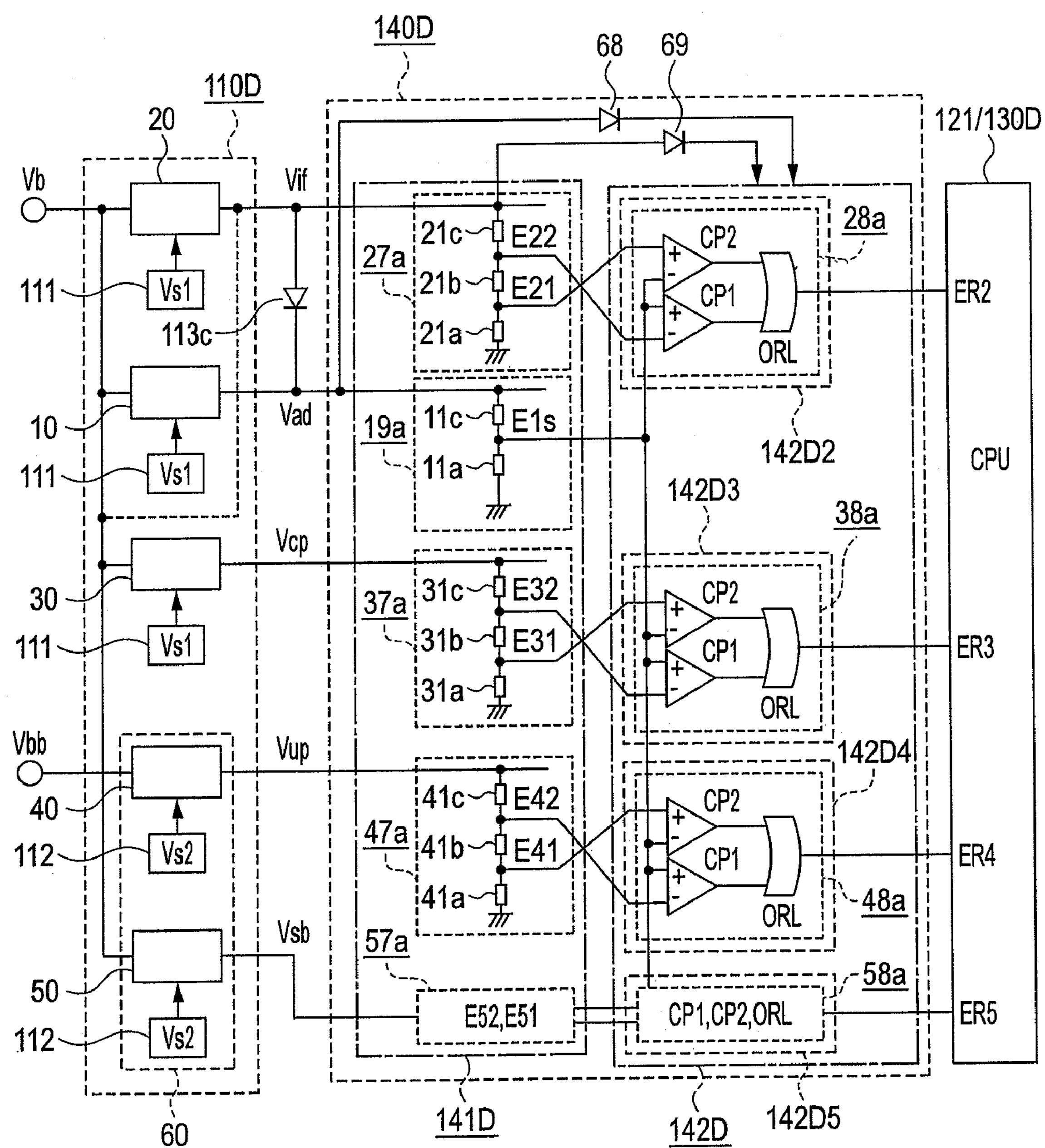
FIG. 14 is a detailed diagram showing a power supply abnormality detecting circuit according to the fourth embodiment.

Next, the action and operation of the in-vehicle mount electronic controller 100D constructed as shown in FIGS. 13 and 14 will be described in detail. First, in FIGS. 13 and 14, when the power supply switch 103 is closed, the exciting coil 102*b* of the power supply relay is energized, the output contact point 102*a* is closed, the main power supply voltage Vb is applied from the in-vehicle mount battery 101, the constant-voltage power supply 110D generates the first, second, third and fifth output voltages Vad, Vif, Vcp, Vsb in addition to the fourth output voltage Vup, and the microprocessor 121 and the combination control circuit unit 130D start to operate. The microprocessor 121 generates a control output signal in accordance with the operation states of the first and second analog sensors 104*a*, 104*b* and the first and second switch sensors 105*a*, 105*b* as the in-vehicle sensor group, and drive-controls the first and second in-vehicle mount electrical load groups 106*a*, 106*b*.

Various kinds of abnormality occurrence information and learning storage information occurring during the operation of the microprocessor 121 are stored in the backup memory 123*b*, and a part of the information concerned is stored and saved in the non-volatile data memory 128D. The backup memory 123*b* holds its storage content by the fourth output voltage Vup obtained by dropping the auxiliary power supply voltage Vbb even when the output contact 102*a* of the power supply relay is opened. However, when the voltage of the in-vehicle mount battery 101 decreases abnormally or the output terminal thereof is opened for exchange, the storage information of the backup memory 123*b* is vanished, and thus some important data are stored and saved in the non-volatile data memory 128D.

Figure 15:
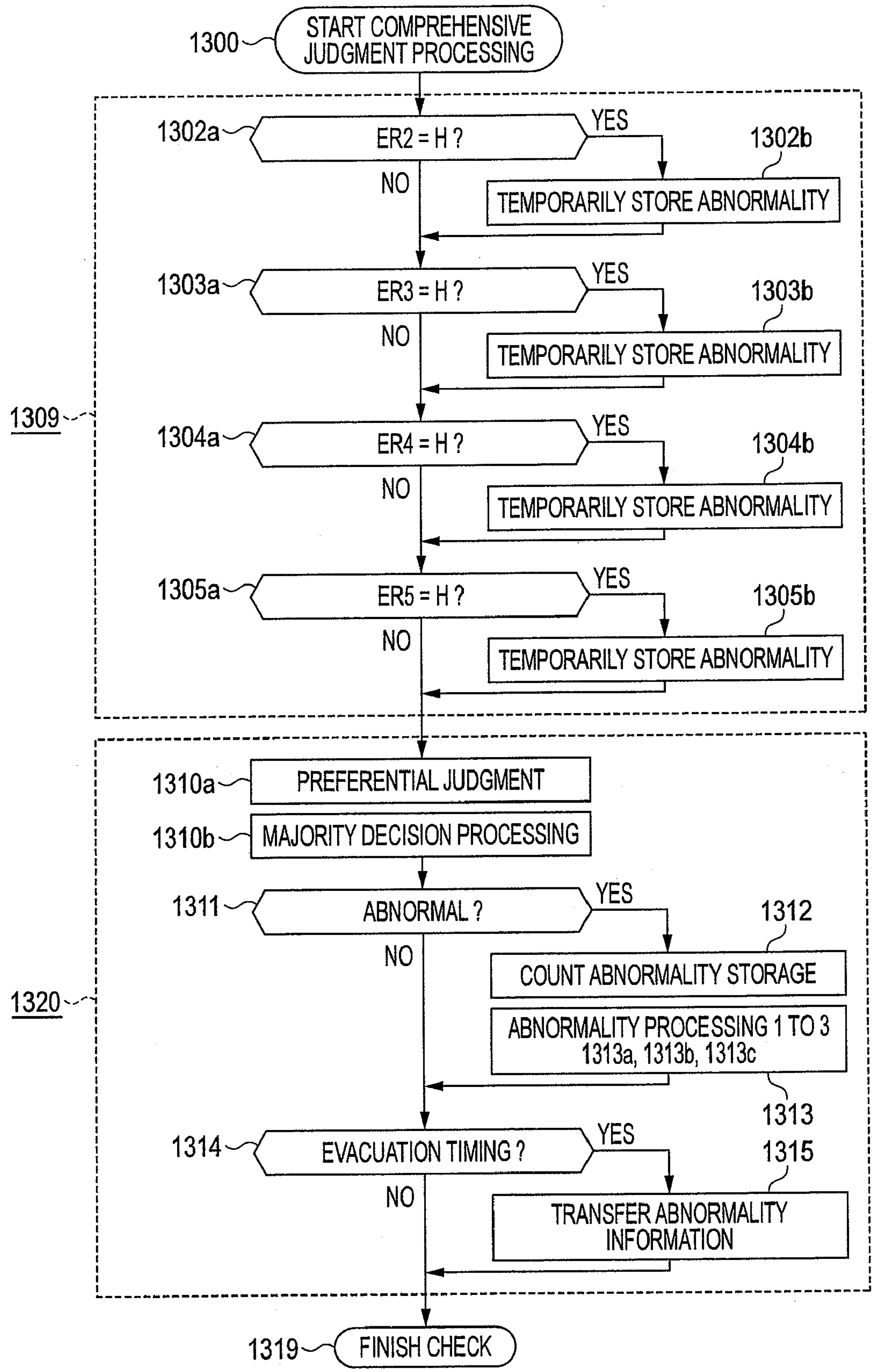
FIG. 15 is a flowchart showing the abnormality detecting operation according to the fourth embodiment.

Next, the comprehensive judgment processing in the in-vehicle mount electronic controller 100D constructed as shown in FIG. 13 will be described with reference to FIG. 15. FIG. 15 is a flowchart showing the comprehensive judgment processing of the in-vehicle mount electronic controller 100D. In FIG. 15, step 1300 is a step of starting an abnormality check operation of the constant-voltage power supply 110D by the microprocessor 121. In subsequent step 1302*a*, it is judged whether the second judgment signal ER2 is set to the logical level "H". If it is "H", the judgment of YES is made, and the processing goes to step 1302*b*. If it is "L", the judgment of NO is made, and the processing goes to step 1303*a*. Step 1302*b* is a step of judging whether the second output voltage Vif is abnormal or the first output voltage Vad as the comparison reference voltage is abnormal or whether both the voltages are abnormal, temporarily storing first and second abnormality states and then going to step 1303*a*. Likewise, the logical level of the third judgment signal ER3 is identified in step 1303*a*, and first and third abnormality states are temporarily stored in step 1303*b*. In subsequent step 1304*a*, the logical level of the fourth judgment signal ER4 is identified, and first and fourth abnormality states are temporarily stored in step 1304*b*. In subsequent 1305*a*, the logical level of the fifth judgment signal ER5 is judged, first and fifth abnormality states are temporarily stored in step 1305*b*, and then processing goes to step 1310*a*. The step block 1309 constructed by the steps from step 1302*a* to 1305*b* constitutes the individual abnormality detecting section.

Step 1310*a* as a preferential judgment section is applied when the fourth or fifth constant-voltage power supply circuit 40, 50 has the same level constant-voltage control precision as the first constant-voltage power supply circuit 10. When the first, fourth abnormality state is stored in step 1304*b* or when the first, fifth abnormality state is stored in step 1305*b*, the first constant-voltage power supply circuit 10 is judged as being abnormal in this step 1310*a* even if both the judgments of the steps 1302*a* and 1303*a* are normal. The subsequent step 1310*b* is a step constituting a majority decision judging section, and this step 1310*b* is a step of extracting abnormality of a specific constant-voltage power supply circuit estimated on the basis of the four judgment results of the steps 1302*a*, 1303*a*, 1304*a*, 1305*a*. For example, if only the step 1302*a* is abnormal, the second constant-voltage power supply circuit 20 is judged as being abnormal, and if only the step 1303*a* is abnormal, the third constant-voltage power supply circuit 30 is judged as being abnormal.

The subsequent step 1311 is an abnormality presence or absence judging step of making the judgment of NO if all the judgments of the steps 1302*a*, 1303*a*, 1304*a*, 1305*a* are "NO" and no abnormality can be confirmed, and then goes to step 1314. If any one of the steps 1302*a*, 1303*a*, 1304*a*, 1305*a* is abnormal, this step makes the judgment of YES, and goes to step 1312. The step 1312 serves as a part of the abnormality occurrence history saving section, and in this step 1312, the abnormality detecting frequency is accumulated every abnormality mode which is temporarily stored in the steps 1302*b*, 1303*b*, 1304*b*, 1305*b*, and an abnormality state is settled by the abnormality detection of a predetermined frequency to prevent misjudgment.

The subsequent step 1313 is a step serving an abnormality countermeasure section for executing abnormality report or fail safe processing in connection with occurrence of abnormality. The processing goes to step 1314 after the step 1313. The step 1314 is a step of judging whether a transfer evacuation timing of abnormality occurrence history information has come. The judgment of YES is made during the time period when the output contact point 102*a* of the power supply relay is tentatively closed from the time when the power supply switch 103 is opened, and then goes to step 1315. In addition, the judgment of NO is made when the power supply switch 103 is closed, and then goes to an operation finishing step 1319.

In step 1315, the presence or absence of settled abnormality which is stored every abnormality mode in the backup memory 123*b* in step 1312 is stored in a memory of an abnormality-mode based address of the non-volatile data memory 128D. When the power supply switch 103 is opened, the microprocessor 121 stops the operation after other various kinds initialization processing is executed, and in connection with this execution, the exciting coil 102*b* of the power supply relay is deenergized and the output contact point 102*a* is opened. Furthermore, when the power supply switch 103 is closed, another control program is executed in the operation finishing step 1319, and the operation start step 1300 is activated again within a predetermined time to repetitively execute the subsequent flow. The step block 1320 constructed by the steps 1310*a* to 1315 constitutes the comprehensive judgment processing section. In the step block 1320, at least one of abnormality countermeasure based on abnormality report or fail safe processing and saving of abnormality occurrence information is executed on the basis of the second, third, fourth, fifth judgment signals ER2, ER3, ER4, ER5.

With respect to a specific example of the abnormality countermeasure executed in step 1313, as a general processing, the opening degree of a throttle valve is reduced so as to suppress the rotational speed of the engine, and the operation of a convenience function concerning safety is stopped as in the case of the abnormality processing according to the first embodiment shown in FIG. 4. The step 1313 contains first, second and third abnormality processing sections 1313*a*, 1313*b*, 1313*c*, and the abnormality processing sections 1313*a*, 1313*b*, 1313*c* have the same constructions as the abnormality processing sections 413*a*, 413*b*, 413*c* shown in FIG. 4. In the foregoing description, any one of the fourth and fifth constant-voltage power supply circuits 40, 50 is provided. However, when both the circuits are used in combination, the majority decision judging section 1310*b* can derive a more accurate judgment result from more abnormal judgment information pieces. Furthermore, if both the fourth and fifth constant-voltage power supply circuits 40, 50 as small-capacity power supplies are designed to have the same level constant-voltage control precision as the first constant-voltage power supply circuit 10 although high-precision constant-voltage control precision is not required, the abnormality judgment of the second and third constant-voltage power supply circuits can be accurately performed after the abnormality judgment within the high-precision power supply group is preferentially made by the majority decision logic of the abnormality judgment results of the first, fourth and fifth constant-voltage power supply circuits. Furthermore, the fourth or fifth constant-voltage power supply circuit may be alternatively used as the comparison reference voltage in addition to the first constant-voltage power supply circuit, and the number of the judging circuits can be reduced. For example, if the comparison between the fourth and second output voltages, between the fourth and third output voltages, between the first and fifth output voltages is carried out, only three judging circuits may be used.

If the first, second and third constant-voltage power supply circuits 10, 20, 30 are set as a first group using the first reference voltage generating circuit 111, the fourth and fifth constant-voltage power supply circuits 40, 50 are set as a second group using the second reference voltage generating circuit 112 and the comparison of the output voltage is carried out between the different groups, abnormality can be detected by the power supply abnormality detecting circuit 140D even when abnormality occurs in the output voltages Vs1, Vs2 of the reference voltage generating circuits 111, 112. If the first, second and third constant-voltage power supply circuits 10, 20,30 are subjected to negative feedback control by the output voltage Vs1 of the same reference voltage generating circuit 111 and the output voltage Vs1 of the reference voltage generating circuit 111 varies abnormally, it is impossible to detect abnormality by the comparison between the first and second output voltages Vad and Vif and the comparison between the first and third output voltages Vad and Vcp. In this case, the reference voltage generating circuits 111 and 112 are set as a double system, and they are relatively compared with each other, whereby abnormality therebetween can be detected.

(3) Summary and Effect of Fourth Embodiment

The in-vehicle mount electronic controller 100D according to the fourth embodiment of the present invention which has the microprocessor 121 for drive-controlling the in-vehicle mount electric load groups 106*a*,106*b* in accordance with operation states of the in-vehicle mount sensor groups 104*a*, 104*b*, 105*a*, 105*b* and contents of the control programs stored in the non-volatile program memory 122D, the combination control circuit unit 130D that is serially connected to the microprocessor 121 to mediate and connect some input/output signals, the constant-voltage power supply source 110D for supplying power to the microprocessor 121, the combination control circuit unit 130D and the input/output interface circuits therefore, and the power supply abnormality detecting circuit 140D for detecting abnormality of the constant-voltage power supply source 110D.

The in-vehicle mount electronic controller 100D is characterized in that the constant-voltage power supply source 110D contains the plural constant-voltage power supply circuits 10, 20, 30, 60 supplied with power form the in-vehicle mount battery 101, the respective constant-voltage power supply circuits 10,20,30,60 being subjected to negative feedback control so as to be proportional to the reference voltages Vs1, Vs2 generated by the reference voltage generating circuits 111, 112 to thereby generate the output voltages Vad, Vif, Vcp, Vup, Vsb having the predetermined permissible variable band width, the power supply abnormality detecting circuit 140D contains the judgment signal input circuit 142D which cooperates with at least one of the microprocessor 121 and the combination control circuit unit 130D to detect individual abnormality for each of plural monitor target output voltages selected from plural output voltages generated by the constant-voltage power supply source 110D, at least one of the microprocessor 121 and the combination control circuit unit 130D further contains the individual abnormality detecting section 1309 and the comprehensive judging processing section 1320, the judgment signal input circuit 142D inputs the relative voltage information between each output voltage and the comparison reference voltage with respect to each of the plural monitor target output voltages to at least one of the microprocessor 121 and the combination control circuit unit 130D, the voltage proportional to the predetermined output voltage having high constant-voltage control precision (specifically, the first output voltage Vad) among the plural output voltages generated by the constant-voltage power supply source 110D is used as the comparison reference voltage, the individual abnormality detecting section 1309 individually detects, on the basis of the relative voltage information input from the judgment signal input circuit 142D, the presence or absence of band abnormality as to whether each of the plural monitor target output voltages is a voltage value within each permissible variation band, and the comprehensive judging processing section 1320 makes a comprehensive judgment containing the presence or absence of abnormality of the comparison reference voltage when it is detected by the individual abnormality detecting section 1309 that individual abnormality is detected in at least one of the plural target output voltages, and carries out at least one of reporting of abnormality and storing of abnormality occurrence information.

As described above, the in-vehicle mount electronic controller 100D according to the fourth embodiment detects the presence or absence of individual abnormality and comprehensively judges individual abnormality individually by making the band comparison as to whether each of the output voltages of the plural constant-voltage power supply circuits is within the permissible variation width, by using the output voltage of the constant-voltage power supply circuit having high output voltage precision in the plural constant-voltage power supply circuits or the output voltage of the reference voltage generating circuit as the comparison reference voltage, thereby executing abnormality processing.

Accordingly, the presence or absence of the band abnormality can be individually accurately detected for the plural constant-voltage power supply circuits by using the high-precision comparison reference voltage, and also precision abnormality of the output voltage is detected as risk prediction information and abnormality is reported or abnormality occurrence record is stored before the microprocessor or the combination control circuit unit falls into an operation stop state. Therefore, there is an effect that maintenance check can be performed before an abnormal-decrease or abnormal-increase accident occurs or risk prediction can be performed by periodic check.

Furthermore, there is also an effect that not only individual abnormality can be detected, but also identification information as to which constant-voltage power supply circuit falls into an individual abnormality state or whether the comparison reference voltage itself is abnormal or not is added to report abnormality or store abnormality record information, thereby facilitating maintenance check.

Still furthermore, in the in-vehicle mount electronic controller 100D according to the fourth embodiment, the constant-voltage power supply source 110D contains first, second and third constant-voltage power supply circuits 10, 20, 30 and the additional constant-voltage power supply circuit 60, the first constant-voltage power supply circuit 10 is a power supply circuit for generating the first output voltage Vad which is smaller in load current, but higher in precision as compared with the second and third constant-voltage power supply circuits 20, 30, the first constant-voltage power supply circuit 10 is used as a power supply for the first multi-channel AD converter 124 which directly inputs to microprocessor 121, the first analog interface circuit 114*a* and at least a part of the first analog sensor 104*a*, the first constant-voltage power supply circuit 10 is also used as a power supply for the second multi-channel AD converter 134, the second analog interface circuit 114*b* and at least a part of the second analog sensor 104*b* when the combination control circuit unit 130D is connected to the second analog sensor 104*b* through the second multi-channel AD converter 134 and the second analog interface circuit 114*b*, the second constant-voltage power supply circuit 20 is a power supply circuit which has larger load current than the first constant-voltage power supply circuit 10 and generates the second output voltage Vif which has the same level as the first output voltage Vad, but is lower in constant-voltage control precision, the second constant-voltage power supply circuit 20 is used as a power supply for input/output interface circuits 125, 126 in the microprocessor 121 and input/output interface circuits 135, 136 in the combination control circuit unit 130D, the third constant-voltage power supply circuit 30 is a power supply circuit for generating a third output voltage Vcp which is a voltage different from the first output voltage Vad, the third constant-voltage power supply circuit 30 is used as a power supply for a calculating section of the microprocessor 121, the non-volatile program memory 122D and RAM memory 123*a* for calculation processing, and the additional constant-voltage supply circuit 60 contains a power supply circuit for generating an additional output voltage having the same level constant-voltage control precision as the first output voltage Vad.

According to this construction, a load-based selective use style in which a low-precision large-capacity power supply having the same level voltage as a high-precision small-capacity power supply and a different-voltage large-capacity power supply are properly selectively used is adopted. Accordingly, by limiting the application of the high-precision power supply, a power supply which is inexpensive as a whole can be constructed.

Furthermore, when plural high-precision constant voltage outputs are required as the comparison reference voltage, the constant-voltage precision of the additional constant-voltage power supply circuit is the same level as the first output voltage. Accordingly, in order to judge whether the first output voltage is normal or not, another high-precision output voltage can be used as the comparison reference voltage.

Still furthermore, the in-vehicle mount electronic controller 100D according to the fourth embodiment is characterized in that the first, second and third constant-voltage power supply circuits 10, 20, 30 are supplied with power from the in-vehicle mount battery 101 to generate the first, second and third output voltages Vad, Vif, Vcp by closing the power supply switch 103, the additional constant-voltage power supply circuit 60 contains at least one of the fourth constant-voltage power supply circuit 40 and the fifth constant-voltage power supply circuit 50, the fourth constant-voltage power supply circuit 40 is a power supply circuit of low power consumption which is supplied with power from the in-vehicle mount battery 101 to generate a fourth output voltage Vup even under the state that the power supply switch 103 is opened, the fourth constant-voltage power supply circuit 40 is a power supply circuit used as a power supply for at least one of a backup memory 123*b* of the microprocessor 121 and an auxiliary RAM memory 133 of the combination control circuit unit 130D, the fifth constant-voltage power supply circuit 50 is a power supply which is supplied with power from the in-vehicle mount battery 101 to generate a fifth output voltage Vsb different from the first output voltage Vad under only the state that the power supply switch 103 is closed, and is lower in power consumption than the second and third constant-voltage power supply circuits 20, 30, the fifth constant-voltage power supply circuit 50 is used as a power supply for the monitor control circuit 131D in the combination control circuit unit 130D, the monitor control circuit 131D is a circuit for inputting a monitor input signal from the in-vehicle mount sensor groups 104*b*, 105*b* to the microprocessor 121, and drive-controlling the in-vehicle mount load group 106*b* on the basis of a control output signal from the microprocessor 121, and at least one of the fourth and fifth output voltages Vup and Vsb has the same level constant-voltage control precision as the first output voltage Vad and is output as the additional output voltage.

According to this construction, the additional constant-voltage power supply circuit contains at least one of the fourth constant-voltage power supply circuit and the fifth constant-voltage power supply circuit which have the same level output voltage as the first output voltage. The fourth constant-voltage power supply circuit is directly supplied with power from the in-vehicle mount battery, and thus it can hold the storage state of some RAM memory even under the state that the power supply switch is interrupted and thus the power supply to the first to third constant-voltage power supply circuits is interrupted.

Furthermore, the output voltages of the fourth and fifth constant-voltage power supply circuits do not originally require high constant-voltage precision. However, it has small load current, and also little variation of the load current because it does not supply power to elements other than a first integrated circuit element mainly comprising the microprocessor or a second integrated circuit element constituting the combination control circuit unit, so that the constant-voltage precision can be relatively easily enhanced.

Furthermore, in the in-vehicle mount electronic controller 100D according to the fourth embodiment, the second, third and additional output voltages among the first, second, third and additional output voltages Vad, Vif, Vcp, Vup, Vsb are set as the monitor target output voltage, the judgment signal input circuit 142D has the second judging signal input circuit 142D2 for receiving the second output voltage Vif, the third judgment signal input circuit 142D3 for receiving the third output voltage Vcp, and additional judging signal input circuits 142D4,142D5 for receiving the additional output voltages Vup, Vsb, and each of the second, third and additional judgment signal input circuits 142D2,142D3,142D4,142D5 uses the voltage E1*s* proportional to the first output voltage Vad as the comparison reference voltage, and outputs the relative voltage information ER2 to ER5.

According to this construction, the first output voltage is applied as the comparison reference voltage for detecting individual abnormality, and the first output voltage which is a high-precision output voltage is relatively compared with another high-precision output voltage. Accordingly, the presence or absence of individual abnormality of plural output voltages, containing the presence or absence of abnormality of the comparison reference voltage itself, can be accurately judged by using plural high-precision comparison reference voltages.

Furthermore, the presence or absence of abnormality of the reference voltage generating circuit itself can be detected by performing the relative comparison between high-precision power suppliers generated on the basis of the reference voltages generated by different kinds of reference power supply generating circuits.

Still furthermore, the first constant-voltage power supply circuit as the reference is a power supply circuit for light load, and thus it has little self-heating and suffers no over-current stress. Therefore, it has high reliability, and if the output voltage thereof is checked at the shipping stage of products, the risk that a problem occurs afterwards would be little.

Still furthermore, in the in-vehicle mount electronic controller 100D according to the fourth embodiment, each of the second, third and additional judgment signal input circuits 142D2,142D3,142D4,142D5 contains a voltage dividing circuit 27*a*,37*a*,47*a*,57*a* and a judging circuit 28*a*,38*a*,48*a*,58*a*, the voltage dividing circuit 27*a*,37*a*,47*a*,57*a* is constructed by mutually connecting three voltage dividing resistors in series, and supplied with the monitor target output voltage to generate the upper-side divided voltage and the lower-side divided voltage of the monitor target output voltage, and the judging circuit 28*a*,38*a*,48*a*,58*a* compares the upper-side divided voltage and the lower-side divided voltage with the comparison reference voltage, and outputs to the relative voltage information ER2 to ER5 a signal representing whether the monitor target output voltage is a voltage value within the permissible variation band width.

According to this construction, the output voltage of the voltage dividing circuit for generating two kinds of large and small divided voltages is monitored to judge the presence or absence of abnormality. Accordingly, the permissible upper and lower limit values can be set by the voltage dividing circuit using the high-precision resistors whose precision meets required detection precision.

Still furthermore, the in-vehicle mount electronic controller 100D according to the fourth embodiment is characterized in that the comprehensive judging processing section 1320 contains a comprehensive abnormality judging section 1310*b*, and also contains at least one of first, second and third abnormality processing sections 1313*a*, 1313*b*, 1313*c*, the comprehensive abnormality judging section 1310*b* monitors the relative voltage information to analyze and estimate as a whole which output voltage of the plural monitor target output voltages is abnormal, and makes a majority decision judgment that the comparison reference voltage is judged to be abnormal when plural monitor target output voltages compared with the comparison reference voltage are abnormal, when the abnormality of the second, third and fifth output voltages Vif, Vcp, Vsb is detected on the basis of the judgment result of the comprehensive abnormality judging section 1310*b* under the state that the additional constant-voltage power supply circuit 60 contains the fifth constant-voltage power supply circuit 50, the first abnormality processing section 1313*a* carries out at least reporting of the abnormality concerned and storing of abnormality occurrence information of the abnormality concerned, when abnormality of the first output voltage Vad is detected on the basis of the judgment result of the comprehensive abnormality judging section 1310*b*, the second abnormality processing section 1313*b* carries out at least one of reporting of abnormality and storing of abnormality occurrence information of the abnormality concerned, and it substitutes correction replacement data at the safety side for the input signal obtained from the first analog sensor 104*a* and the input signal obtained form the second analog sensor 104*b* if the combination control circuit unit 130D is connected to the second analog sensor 104*b* through the second multi-channel AD converter 134 and the second analog interface circuit 114*b*, and when the fourth output voltage Vup is detected to be abnormal on the basis of the judgment result of the comprehensive abnormal judgment section 1310*b* in the case where the additional constant-voltage power supply circuit 60 contains the fourth constant-voltage power supply circuit 40, the third abnormality processing section 1313*c* carries out at least one of reporting of the abnormality and storing of abnormality occurrence information of the abnormality concerned, and replaces a variable control constant varying in the backup memory 123*b* because of learning and storage during driving by at least one of a control constant transferred to and stored in the non-volatile data memory 128D and a predetermined reference control constant pre-stored in the non-volatile program memory 122D.

According to this construction, the abnormality reporting or the storing of the abnormality record information is carried out in accordance with the occurrence of abnormality of each output voltage estimated on the basis of the comprehensive abnormality judging section, and also the correction processing of the analog signal is executed if the first output voltage is abnormal while the learning control constant is returned to the transfer saving information or the reference control constant if the fourth output voltage is abnormal. Accordingly, the precision abnormality of the output voltage which does not yet stop the operation of a watchdog timer circuit or the microprocessor is detected, and the abnormality is reported or the abnormality occurrence history is stored, whereby the abnormal decrease or abnormality increase trouble of the output voltage is expected, so that check maintenance is carried out before a critical trouble occurs or a risk can be predicted by periodic check.

Furthermore, the correction replacement data applied when the first output voltage is abnormal is based on the multiplication of a correction coefficient at the safety side and the present analog signal of each analog sensor or algebra addition of correction bias. Accordingly, the safety of control can be maintained by setting the proper correction coefficient and the correction bias every analog sensor.

Still furthermore, the in-vehicle mount electronic controller 100D according to the fourth embodiment is characterized in that the monitor control circuit unit 131D of the combination control circuit unit 130D is constructed by a hard logic circuit, and the monitor control circuit unit 131D executes a part of the processing of the comprehensive judging processing section 1320.

According to this construction, the combination control circuit unit for serially communicating input/output signals with the microprocessor is provided, and the monitor control circuit unit provided to the combination control circuit unit takes partial charge of the processing of the comprehensive judging processing section, so that it is unnecessary to directly input each judgment signal and the comparison signal to the microprocessor, the number of input/output points of the expensive microprocessor executing at high speed can be saved and the control load imposed on the microprocessor can be reduced.

Fifth Embodiment

(1) Detailed Description of Construction

Figure 16:
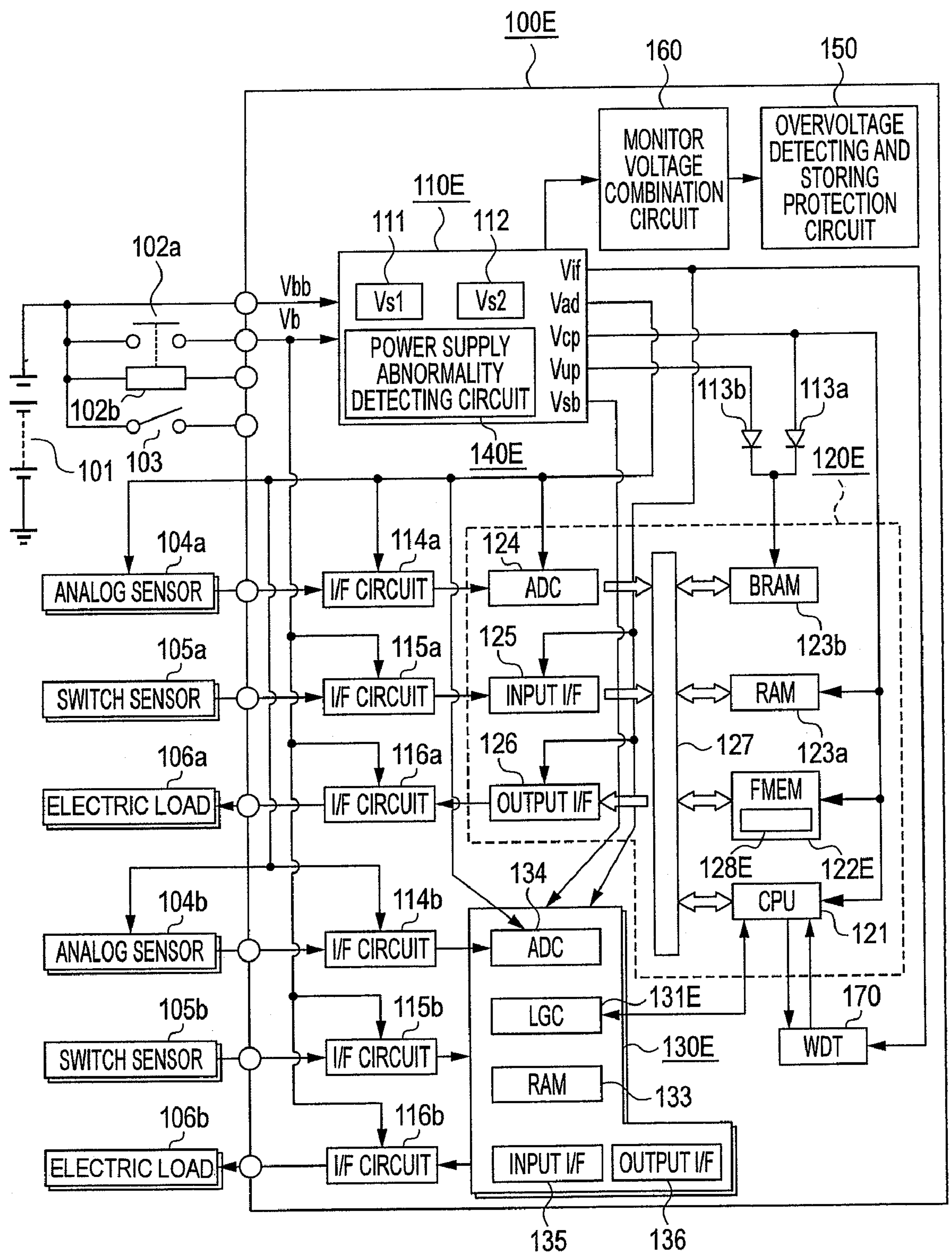
FIG. 16 is an overall circuit diagram showing a fifth embodiment of the in-vehicle mount electronic controller according to the present invention.
Figure 17:
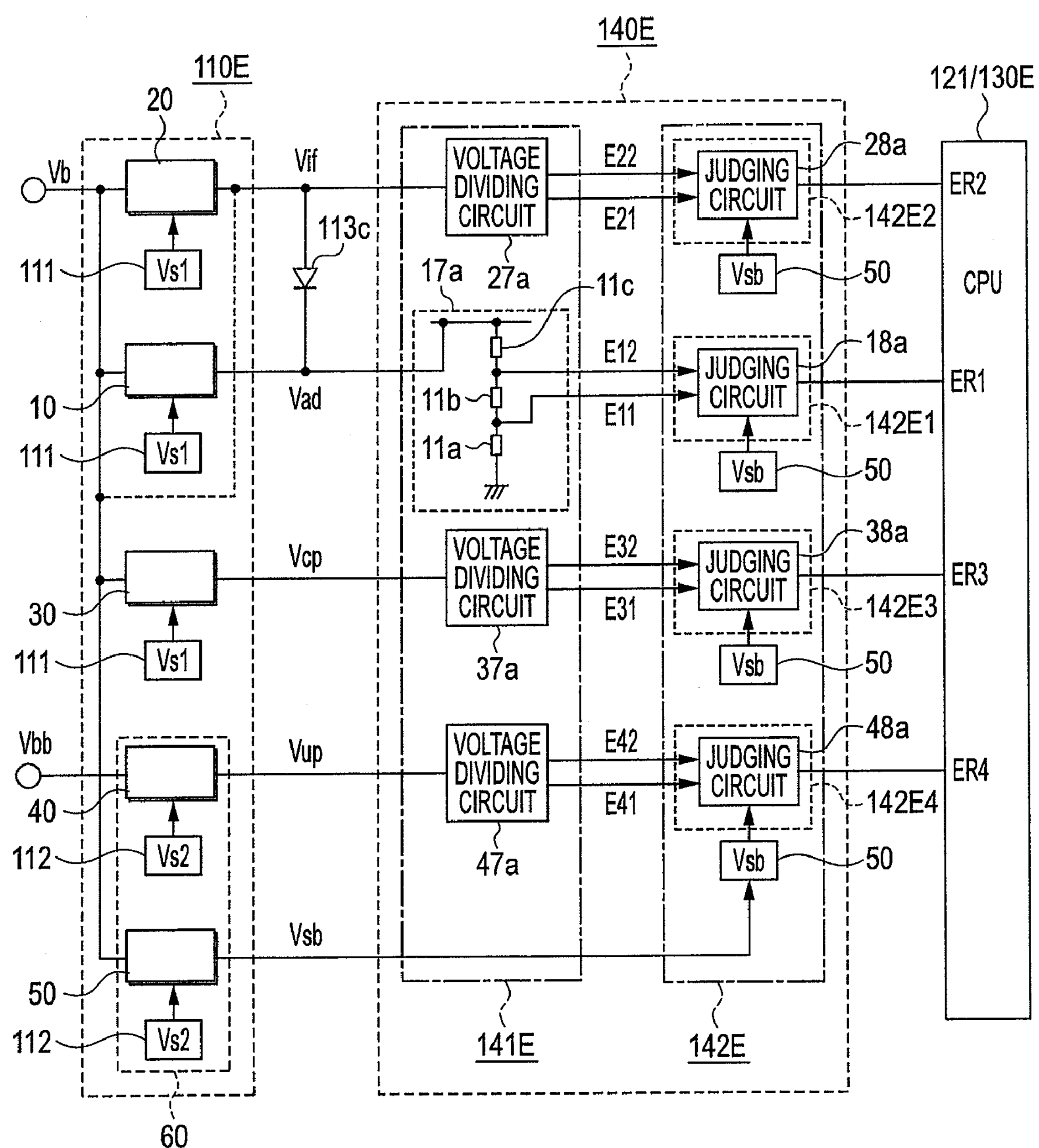
FIG. 17 is a detailed diagram showing the power supply abnormality detecting circuit according to the fifth embodiment.

Next, the construction of an in-vehicle mount electronic controller 100E according to a fifth embodiment will be described by concentrating on the different point from the in-vehicle mount electronic controller 100D according to the fourth embodiment with reference to FIGS. 16 and 17. FIG. 16 is an overall circuit diagram showing the in-vehicle mount electronic controller 100E according to the fifth embodiment, and FIG. 17 is an electrical circuit diagram showing a power supply abnormality detecting circuit 140E. In FIGS. 16 and 17, the same reference numerals as shown in FIGS. 13 and 14 represent the same or corresponding parts.

The main feature of the in-vehicle mount electronic controller 100E resides in that the output voltages Vad, Vif, Vcp, Vup in the first, second, third, fourth and fifth output voltages Vad, Vif, Vcp, Vup, Vsb are set as monitor target output voltages, a relative comparison system using the fifth output voltage Vsb as a comparison reference voltage to judge abnormality of each of the output voltages, and the judgment of abnormality is made on the basis of the logical judgment by an individual abnormality detecting section 1609. In FIG. 16, the in-vehicle mount electronic controller 100E is constructed by a constant-voltage power supply source 110E having a power supply abnormality detecting circuit 140E described later with reference to FIG. 17, a first integrated circuit element 120E cooperating with a combination control circuit unit 130E, the over voltage detecting storing protection circuit 150 and the monitor voltage combining circuit 160 described with reference to FIG. 3, the watchdog timer 170, and various kinds of input/output interface circuits which are similar to those shown in FIG. 13. A flash memory is used as a non-volatile program memory 122E contained in the first integrated circuit element 120E, and a partial area thereof is used as the non-volatile data memory 128E. The combination control circuit unit 130E operates while the monitor control circuit unit 131E is set as a main body, and serially communicates input/output signals with the microprocessor 121. The monitor control circuit unit 131E of the combination control circuit unit 130E is constructed by a hard logic circuit, for example, however, it may be constructed by a microprocessor serving as sub CPU as in the case of the monitor control circuit units 131B, 131C shown in FIGS. 5 and 9.

Next, a constant-voltage power supply source 110E in the in-vehicle amount electronic controller 100E according to the fifth embodiment will be described with reference to FIG. 17. In FIG. 17, the first constant-voltage power supply circuit 10 drops the main power supply voltage Vb to generate the first output voltage Vad. The second constant-voltage power supply circuit 20 drops the main power supply voltage Vb to generate the second output voltage Vif. The third constant-voltage power supply circuit 30 drops the main power supply source to generate the third output voltage Vcp. The fourth constant-voltage power supply circuit 40 drops the auxiliary power supply voltage Vbb to generate the fourth output voltage Vup. The fifth constant-voltage power supply circuit 50 drops the main power supply voltage Vb to generate the fifth output voltage Vsb. The third and fifth constant-voltage power supply circuits may drop the second output voltage Vif to generate the third and fifth output voltages Vcp and Vsb. The fourth and fifth constant-voltage power supply circuits 40 and 50 constitute the additional constant-voltage power supply circuit 60.

Each of the constant-voltage power supply circuits 10, 20, 30, 40, 50 constituting the constant-voltage power supply source 110E is constructed by a power transistor which is subjected to negative continuous feedback control so that a voltage proportional to each output voltage is equal to the reference voltage Vs1 or Vs2 generated by the first or second reference voltage generating circuit 111, 112. In the fifth embodiment, the first reference voltage Vs1 of the first reference voltage generating circuit 111 is used for the first, second and third constant-voltage power supply circuits 10, 20, 30, and the second reference voltage Vs2 of the second reference voltage generating circuit 112 is used for the fourth and fifth constant-voltage power supply circuits 40, 50.

The power supply abnormality detecting circuit 140E has a voltage dividing circuit 141E and a judgment signal input circuit 142E. The voltage dividing circuit 141E contains first, second, third and fourth voltage dividing circuits 17*a*, 27*a*, 37*a*, 47*a* corresponding to the monitor target output voltages Vad, Vif, Vcp, Vup. The first voltage dividing circuit 17*a* is constructed by a series circuit of three high-precision resistors 11*c*, 11*b*, 11*a*, and generates an upper-side divided voltage E12 and a lower-side divided voltage E11 from the first output voltage Vad. The second, third, fourth voltage dividing circuits 27*a*, 37*a*, 47*a* have the same construction as shown in FIG. 14.

The second voltage dividing circuit 27*a* generates the upper-side divided voltage E22 and the lower-side divided voltage E21, the third voltage dividing circuit 37*a* generates the upper-side divided voltage E32 and the lower-side divided voltage E31, and the fourth voltage dividing circuit 47*a* generates the upper-side divided voltage E42 and the lower-side divided voltage E41. The fifth output voltage Vsb serving as the comparison reference voltage is set to be lowest as compared with the other output voltages, and thus it is directly used as the comparison reference voltage in the judgment signal input circuit 142E without requiring any voltage dividing circuit.

The judgment signal input circuit 142E has first, second, third and fourth judgment signal input circuits 142E1, 142E2, 142E3, 142E4, and they are constructed by first, second, third and fourth judging circuits 18*a*, 28*a*, 38*a*, 48*a*, respectively. The first judgment circuit 18*a* is constructed by the comparison first circuit CP1, the comparison second circuit CP2 and the logical coupling section ORL shown in FIG. 14. The first judging circuit 18*a* operates with the fifth output voltage Vsb set as the comparison reference voltage to generate the first judgment signal ER1, and inputs the first judgment signal ER1 as relative voltage information to the microprocessor 121. Likewise, the second judging circuit 28*a* operates with the fifth output voltage Vsb set as the comparison reference voltage to generate the second judgment signal ER2, and inputs it to the microprocessor 121. The third judgment circuit 38*a* operates with the fifth output voltage Vsb set as the comparison reference voltage to generate the third judgment signal ER3, and inputs it to the microprocessor 121. Likewise, the fourth judgment circuit 48*a* operates with the fifth output voltage Vsb set as the comparison reference voltage to generate the fourth judgment signal ER4, and inputs it to the microprocessor 121. The second, third and fourth judgment signals ER2, ER3, ER4 are also input as relative voltage information to the microcomputer.

The respective voltage dividing circuits 17*a*, 27*a*, 37*a*, 47*a* constituting the voltage dividing circuits 141E cooperate with the corresponding judging circuits 18*a*, 28*a*, 38*a*, 48*a* to operate as in the case of the power supply abnormality detecting circuit 140D shown in FIG. 14. That is, when the value of the fifth output voltage Vsb is within a normal band and also the value of each of the monitor target voltages Vad, Vif, Vcp, Vup is a value between permissible upper and lower limit values, the logical level of each of the judgment signals ER1 to ER4 is set to "L", however, when the value concerned is out of the permissible variation band width, the logical level is set to "H". However, this judgment logic may be inverted, and the logical coupling may be executed in the microprocessor 121. A saving diode 113*c* which can supply current from the second output voltage Vif to the first output voltage Vad is connected. Accordingly, even if the first output voltage Vad is equal to zero, power supply to the analog system is made possible by the second output voltage Vif.

(2) Detailed Description of Action and Operation

Next, the action and operation of the in-vehicle mount electronic controller 100E constructed as shown in FIGS. 16 and 17 will be described in detail.

First, in FIGS. 16 and 17, when the power supply switch 103 closes the circuit, the exciting coil 102*b* of the power supply relay is energized, and the output contact point 102*a* closes the circuit. When the output contact point 102*a* closes the circuit, the main power supply voltage Vb is supplied from the in-vehicle mount battery 101, and in addition to the fourth output voltage Vup, the constant-voltage power supply source 110E generates the first, second, third and fifth output voltages Vad, Vif, Vcp, Vsb and the microprocessor 121 stars the operation. The microprocessor 121 generates a control output signal to control the driving of the first and second in-vehicle mount electrical loads 106*a*, 106*b* in accordance with the operation states of the first and second analog sensors 104*a* and 104*b* and the first and second switch sensors 105*a* and 105*b* as the in-vehicle sensor groups, and the control program stored in the non-volatile program memory 122E. Various kinds of abnormality occurrence information and learning storage information occurring during the operation of the microprocessor 121 are stored in the backup memory 123*b*, and a part thereof is stored and saved in a non-volatile data memory as a partial area of the non-volatile program memory 122E. Even when the output contact 102*a* of the power supply relay is opened, the backup memory 123*b* holds the storage content by the fourth output voltage Vup obtained by dropping the auxiliary power supply voltage Vbb. However, when the voltage of the in-vehicle mount battery 101 decreases abnormally or the output terminal is opened for exchange, the storage information of the backup memory 123*b* is vanished, and thus some important data are stored and saved in the non-volatile data memory 128E.

Figure 18:
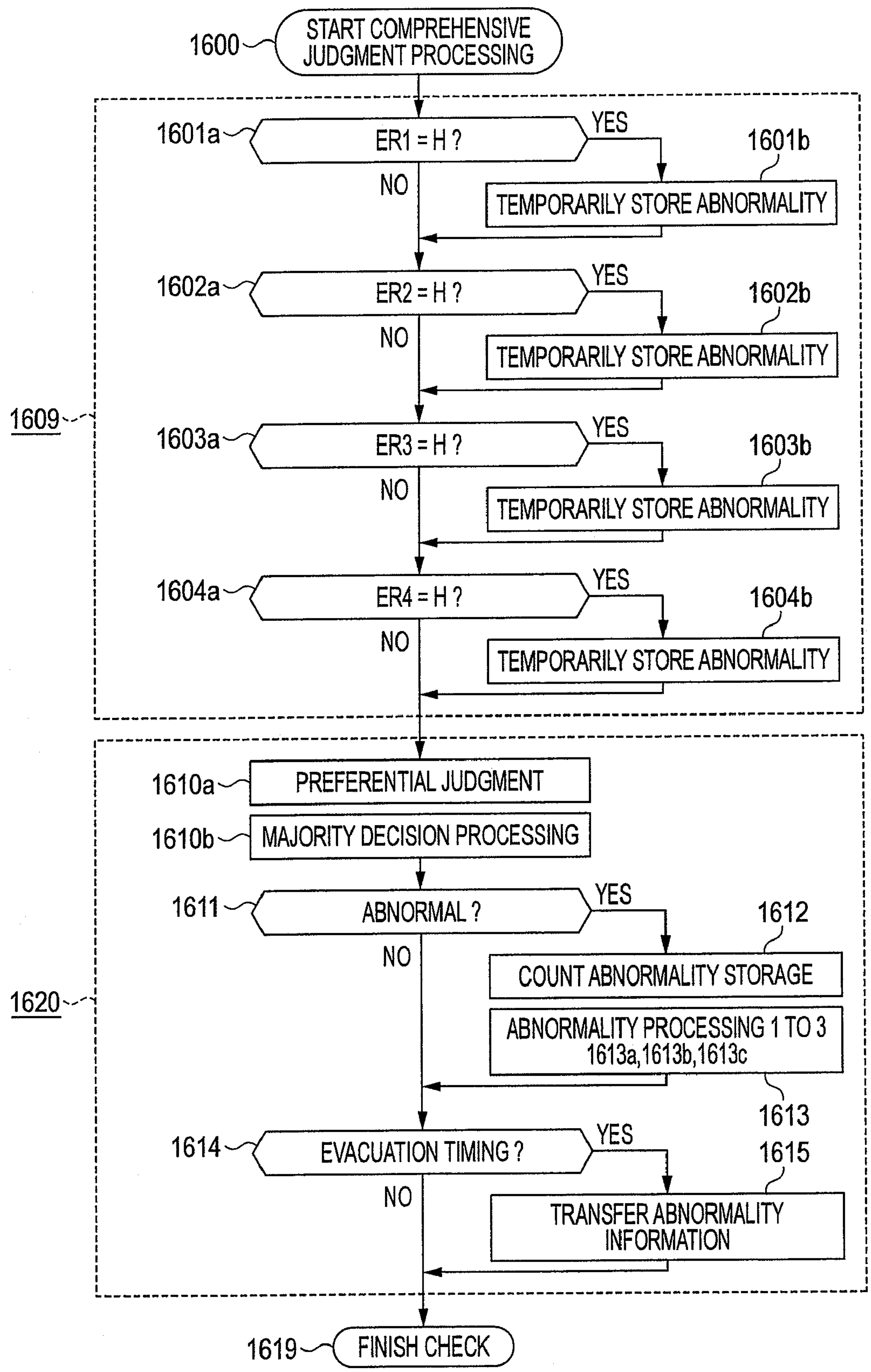
FIG. 18 is a flowchart showing the abnormality detecting operation of the fifth embodiment.

Next, the abnormality detecting operation of the in-vehicle mount electronic controller 100E constructed as shown in FIG. 16 will be described with reference to the flowchart of FIG. 18. The flowchart of FIG. 18 is the same as the flowchart of FIG. 15, and step numbers from 1300 till 1399 are replaced by step numbers from 1600 till 1699 in FIG. 18. The step block 1309 is constructed by the steps from 1302*a* to 1305*b* in FIG. 15, however, a step block 1609 is constructed by steps from 1601*a* to 1604*b* in FIG. 18. This is because the second, third, fourth and fifth judging circuits 28*a*, 38*a*, 48*a*, 58*a* using the divided voltage E1*s* of the first output voltage Vad as a comparison reference voltage are used in the power supply abnormality detecting circuit 140D of FIG. 14, however, the first, second, third and fourth judging circuits 18*a*, 28*a*, 38*a*, 48*a* using the fifth output voltage Vsb as a comparison reference voltage are used in the power supply abnormality detecting circuit 140E of FIG. 17.

The fifth output voltage Vsb for driving the monitor control circuit unit 131E in the combination control circuit unit 130E does not originally require a high-precision constant-voltage characteristic. However, it is suitable to obtain a high-precision output voltage having little load variation at a low cost, and thus a high-precision constant-voltage characteristic is intentionally brought to the fifth output voltage Vsb in the fifth embodiment, thereby enhancing the precision for abnormality judgment. In the fifth embodiment, an advantage when the fifth output voltage Vsb is used as the comparison reference voltage is as follows. The fifth output voltage Vsb is the lowest output voltage as compared with the other output voltages, and thus it is unnecessary to provide a voltage dividing circuit for obtain the comparison reference voltage, so that a high-precision voltage dividing resistor is not required. Furthermore, the fifth output voltage Vsb is supplied to only the monitor control circuit unit 131E, and output wires are not variously laid down. Therefore, it is not affected by noise, and it is a stable small load, so that variation of the output voltage due to load variation hardly occurs.

(3) Summary and Feature of Fifth Embodiment

The in-vehicle mount electronic controller 100E according to the fifth embodiment of the present invention which has the microprocessor 121 for drive-controlling the in-vehicle mount electric load groups 106*a*, 106*b* in accordance with operation states of the in-vehicle mount sensor groups 104*a*, 104*b*, 105*a*, 105*b* and contents of the control programs stored in the non-volatile program memory 122E, the combination control circuit unit 130E that is serially connected to the microprocessor 121 to mediate and connect some input/output signals, the constant-voltage power supply source 110E for supplying power to the microprocessor 121, the combination control circuit unit 130E and the input/output interface circuits therefore, and the power supply abnormality detecting circuit 140E for detecting abnormality of the constant-voltage power supply source 110E.

The in-vehicle mount electronic controller 100E is characterized in that the constant-voltage power supply source 110E contains the plural constant-voltage power supply circuits 10, 20, 30, 60 supplied with power form the in-vehicle mount battery 101, the respective constant-voltage power supply circuits being subjected to negative feedback control so as to be proportional to the reference voltages Vs1, Vs2 generated by the reference voltage generating circuits 111, 112 to thereby generate the output voltages Vad, Vif, Vcp, Vup, Vsb having the predetermined permissible variable band width, the power supply abnormality detecting circuit 140E contains the judgment signal input circuit 142E which cooperates with at least one of the microprocessor 121 and the combination control circuit unit 130E to detect individual abnormality for each of plural monitor target output voltages selected from plural output voltages generated by the constant-voltage power supply source 110E, at least one of the microprocessor 121 and the combination control circuit unit 130E further contains the individual abnormality detecting section 1609 and the comprehensive judging processing section 1620, the judgment signal input circuit 142E inputs the relative voltage information between each output voltage and the comparison reference voltage with respect to each of the plural monitor target output voltages to at least one of the microprocessor 121 and the combination control circuit unit 130E, the voltage proportional to the predetermined output voltage Vsb having high constant-voltage control precision among the plural output voltages Vad,Vif,Vcp,Vup,Vsb generated by the constant-voltage power supply source 110E is used as the comparison reference voltage, the individual abnormality detecting section 1609 individually detects, on the basis of the relative voltage information input from the judgment signal input circuit 142E, the presence or absence of band abnormality as to whether each of the plural monitor target output voltages is a voltage value within each permissible variation band, and the comprehensive judging processing section 1620 makes a comprehensive judgment containing the presence or absence of abnormality of the comparison reference voltage when it is detected by the individual abnormality detecting section 1609 that individual abnormality is detected in at least one of the plural target output voltages, and carries out at least one of reporting of abnormality and storing of abnormality occurrence information.

As described above, the in-vehicle mount electronic controller 100E according to the fifth embodiment detects the presence or absence of individual abnormality and comprehensively judges individual abnormality individually by making the band comparison as to whether each of the output voltages of the plural constant-voltage power supply circuits is within the permissible variation width, by using the output voltage of the constant-voltage power supply circuit having high output voltage precision in the plural constant-voltage power supply circuits or the output voltage of the reference voltage generating circuit as the comparison reference voltage, thereby executing abnormality processing.

Accordingly, the presence or absence of the band abnormality can be individually accurately detected for the plural constant-voltage power supply circuits by using the high-precision comparison reference voltage, and also precision abnormality of the output voltage is detected as risk prediction information and abnormality is reported or abnormality occurrence record is stored before the microprocessor or the combination control circuit unit falls into an operation stop state. Therefore, there is an effect that maintenance check can be performed before an abnormal-decrease or abnormal-increase accident occurs or risk prediction can be performed by periodic check.

Furthermore, there is also an effect that not only individual abnormality can be detected, but also identification information as to which constant-voltage power supply circuit falls into an individual abnormality state or whether the comparison reference voltage itself is abnormal or not is added to report abnormality or store abnormality record information, thereby facilitating maintenance check.

Still furthermore, in the in-vehicle mount electronic controller 100E according to the fifth embodiment, the constant-voltage power supply source 110E contains first, second and third constant-voltage power supply circuits 10, 20, 30 and the additional constant-voltage power supply circuit 60, the first constant-voltage power supply circuit 10 is a power supply circuit for generating the first output voltage Vad which is smaller in load current, but higher in precision as compared with the second and third constant-voltage power supply circuits 20, 30, the first constant-voltage power supply circuit 10 is used as a power supply for the first multi-channel AD converter 124 which directly inputs to the microprocessor 121, the first analog interface circuit 114*a* and at least a part of the first analog sensor 104*a*, the first constant-voltage power supply circuit 10 is also used as a power supply for the second multi-channel AD converter 134, the second analog interface circuit 114*b* and at least a part of the second analog sensor 104*b* when the combination control circuit unit 130E is connected to the second analog sensor 104*b* through the second multi-channel AD converter 134 and the second analog interface circuit 114*b,* the second constant-voltage power supply circuit 20 is a power supply circuit which has larger load current than the first constant-voltage power supply circuit 10 and generates the second output voltage Vif which has the same level as the first output voltage Vad, but is lower in constant-voltage control precision, the second constant-voltage power supply circuit 20 is used as a power supply for input/output interface circuits 125, 126 in the microprocessor 121 and input/output interface circuits 135, 136 in the combination control circuit unit 130E, the third constant-voltage power supply circuit 30 is a power supply circuit for generating a third output voltage Vcp which is a voltage different from the first output voltage Vad, the third constant-voltage power supply circuit 30 is used as a power supply for the calculating section of the microprocessor 121, the non-volatile program memory 122E and RAM memory 123*a* for calculation processing, and the additional constant-voltage supply circuit 60 contains a power supply circuit for generating the additional output voltage having the same level constant-voltage control precision as the first output voltage Vad.

According to this construction, a load-based selective use style in which a low-precision large-capacity power supply having the same level voltage as a high-precision small-capacity power supply and a different-voltage large-capacity power supply are properly selectively used is adopted.

Accordingly, by limiting the application of the high-precision power supply, a power supply which is inexpensive as a whole can be constructed.

Furthermore, when plural high-precision constant voltage outputs are required as the comparison reference voltage, the constant-voltage precision of the additional constant-voltage power supply circuit is the same level as the first output voltage. Accordingly, in order to judge whether the first output voltage is normal or not, another high-precision output voltage can be used as the comparison reference voltage.

Still furthermore, the in-vehicle mount electronic controller 100E according to the fifth embodiment is characterized in that the first, second and third constant-voltage power supply circuits 10, 20, 30 are supplied with power from the in-vehicle mount battery 101 to generate the first, second and third output voltages Vad, Vif, Vcp by closing the power supply switch 103, the additional constant-voltage power supply circuit 60 contains at least one of the fourth constant-voltage power supply circuit 40 and the fifth constant-voltage power supply circuit 50, the fourth constant-voltage power supply circuit 40 is a power supply circuit of low power consumption which is supplied with power from the in-vehicle mount battery 101 to generate the fourth output voltage Vup even under the state that the power supply switch 103 is opened, the fourth constant-voltage power supply circuit 40 is a power supply circuit used as a power supply for at least one of the backup memory 123*b* of the microprocessor 121 and the auxiliary RAM memory 133 of the combination control circuit unit 130E, the fifth constant-voltage power supply circuit 50 is a power supply which is supplied with power from the in-vehicle mount battery 101 to generate the fifth output voltage Vsb different from the first output voltage Vad under only the state that the power supply switch 103 is closed, and is lower in power consumption than the second and third constant-voltage power supply circuits 20, 30, the fifth constant-voltage power supply circuit 50 is used as a power supply for the monitor control circuit 131E in the combination control circuit unit 130E, the monitor control circuit 131E is a circuit for inputting a monitor input signal from the in-vehicle mount sensor groups 104*b*, 105*b* to the microprocessor 121, and drive-controlling the in-vehicle mount load group 106*b* on the basis of a control output signal from the microprocessor 121, and at least one of the fourth and fifth output voltages Vup and Vsb (the fifth output voltage Vsb under the actual condition) has the same level constant-voltage control precision as the first output voltage Vad and is output as the additional output voltage.

According to this construction, the additional constant-voltage power supply circuit contains at least one of the fourth constant-voltage power supply circuit and the fifth constant-voltage power supply circuit which have the same level output voltage as the first output voltage. The fourth constant-voltage power supply circuit is directly supplied with power from the in-vehicle mount battery, and thus it can hold the storage state of some RAM memory even under the state that the power supply switch is interrupted and thus the power supply to the first to third constant-voltage power supply circuits is interrupted.

Furthermore, the output voltages of the fourth and fifth constant-voltage power supply circuits do not originally require high constant-voltage precision. However, it has small load current, and also little variation of the load current because it does not supply power to elements other than a first integrated circuit element mainly comprising the microprocessor or a second integrated circuit element constituting the combination control circuit unit, so that the constant-voltage precision can be relatively easily enhanced.

Furthermore, in the in-vehicle mount electronic controller 100E according to the fifth embodiment, the first, second and third output voltages Vad, Vif, and Vcp among the first, second, third and additional output voltages Vad, Vif, Vcp, Vup, Vsb are set as the monitor target output voltage, the judgment signal input circuit 142E has the first judgment signal input circuit 142E1 for receiving the first output voltage Vad, the second judging signal input circuit 142E2 for receiving the second output voltage Vif, and the third judgment signal input circuit 142E3 for receiving the third output voltage Vcp, and each of the first, second and third judgment signal circuits 142E1,142E2,142E3 use the voltage proportional to the fifth output voltage Vsb, respectively as the comparison reference voltage, and outputs the relative voltage information ER1 to ER3.

According to this construction, the fifth output voltage is applied as the comparison reference voltage for detecting individual abnormality, and the first output voltage which is a high-precision output voltage is relatively compared with another high-precision output voltage. Accordingly, the presence or absence of individual abnormality of plural output voltages, including the presence or absence of abnormality of the comparison reference voltage itself, can be accurately judged by using plural high-precision comparison reference voltages.

Furthermore, the presence or absence of abnormality of the reference voltage generating circuit itself can be detected by performing the relative comparison between high-precision power suppliers generated on the basis of the reference voltages generated by different kinds of reference power supply generating circuits.

Still furthermore, the fifth constant-voltage power supply circuit as the reference is a power supply circuit for light load, and thus it has little self-heating and suffers no over-current stress. Therefore, it has high reliability, and if the output voltage thereof is checked at the shipping stage of products, the risk that a problem occurs afterwards would be little.

Still furthermore, in the in-vehicle mount electronic controller 100E according to the fifth embodiment, each of the first, second, third and additional judgment signal input circuits 142E1,142E2,142E3,142E4 contains a voltage dividing circuit 17*a*,27*a*,37*a*,47*a* and a judging circuit 18*a*,28*a*,38*a*, 48*a*, the voltage dividing circuit 17*a*,27*a*37*a*,47*a* is constructed by mutually connecting three voltage dividing resistors in series, and supplied with the monitor target output voltage to generate the upper-side divided voltage and the lower-side divided voltage of the monitor target output voltage, and the judging circuit 18*a*,28*a*,38*a*,48*a* compares the upper-side divided voltage and the lower-side divided voltage with the comparison reference voltage, and outputs as the relative voltage information ER1 to ER4 a signal representing whether or not the monitor target output voltage is a voltage value within the permissible variation band width.

According to this construction, the output voltage of the voltage dividing circuit for generating two kinds of large and small divided voltages is monitored to judge the presence or absence of abnormality. Accordingly, the permissible upper and lower limit values can be set by the voltage dividing circuit using the high-precision resistors whose precision meets required detection precision.

Still furthermore, the in-vehicle mount electronic controller 100E according to the fifth embodiment is characterized in that the comprehensive judging processing section 1620 contains a comprehensive abnormality judging section 1610*b*, and also contains at least one of first, second and third abnormality processing sections 1613*a*, 1613*b*, 1613*c*, the comprehensive abnormality judging section 1610*b* monitors the relative voltage information to analyze and estimate as a whole which output voltage of the plural monitor target output voltages is abnormal, and makes a majority decision judgment that the comparison reference voltage is judged to be abnormal when plural monitor target output voltages compared with the comparison reference voltage are abnormal, when the abnormality of the second, third and fifth output voltages Vif, Vcp, Vsb is detected on the basis of the judgment result of the comprehensive abnormality judging section 1610*b* under the state that the additional constant-voltage power supply circuit 60 contains the fifth constant-voltage power supply circuit 50, the first abnormality processing section 1613*a* carries out at least reporting of the abnormality concerned and storing of abnormality occurrence information of the abnormality concerned, when abnormality of the first output voltage Vad is detected on the basis of the judgment result of the comprehensive abnormality judging section 1610*b*, the second abnormality processing section 1613*b* carries out at least one of reporting of abnormality and storing of abnormality occurrence information of the abnormality concerned, and it substitutes correction replacement data at the safety side for the input signal obtained from the first analog sensor 104*a* and the input signal obtained form the second analog sensor 104*b* if the combination control circuit unit 130E is connected to the second analog sensor 104*b* through the second multi-channel AD converter 134 and the second analog interface circuit 114*b*, and when the fourth output voltage Vup is detected to be abnormal on the basis of the judgment result of the comprehensive abnormal judgment section 1610*b* in the case where the additional constant-voltage power supply circuit 60 contains the fourth constant-voltage power supply circuit 40, the third abnormality processing section 1613*c* carries out at least one of reporting of the abnormality and storing of abnormality occurrence information of the abnormality concerned, and replaces a variable control constant varying in the backup memory 123*b* because of learning and storage during driving by at least one of a control constant transferred to and stored in the non-volatile data memory 128E and a predetermined reference control constant pre-stored in the non-volatile program memory 122E.

According to this construction, the abnormality reporting or the storing of the abnormality record information is carried out in accordance with the occurrence of abnormality of each output voltage estimated on the basis of the comprehensive abnormality judging section, and also the correction processing of the analog signal is executed if the first output voltage is abnormal while the learning control constant is returned to the transfer saving information or the reference control constant if the fourth output voltage is abnormal. Accordingly, the precision abnormality of the output voltage which does not yet stop the operation of a watchdog timer circuit or the microprocessor is detected, and the abnormality is reported or the abnormality occurrence history is stored, whereby the abnormal decrease or abnormality increase trouble of the output voltage is expected, so that check maintenance is carried out before a critical trouble occurs or a risk can be predicted by periodic check.

Furthermore, the correction replacement data applied when the first output voltage is abnormal is based on the multiplication of a correction coefficient at the safety side and the present analog signal of each analog sensor or algebra addition of correction bias. Accordingly, the safety of control can be maintained by setting the proper correction coefficient and the correction bias every analog sensor.

Still furthermore, the in-vehicle mount electronic controller 100E according to the fifth embodiment is characterized in that the monitor control circuit unit 131E of the combination control circuit unit 130E is constructed by a hard logic circuit, and the monitor control circuit unit 131E executes a part of the processing of the comprehensive judging processing section 1620.

According to this construction, the combination control circuit unit for serially communicating input/output signals with the microprocessor is provided, and the monitor control circuit unit provided to the combination control circuit unit takes partial charge of the processing of the comprehensive judging processing section, so that it is unnecessary to directly input each judgment signal and the comparison signal to the microprocessor, the number of input/output points of the expensive microprocessor executing at high speed can be saved and the control load imposed on the microprocessor can be reduced.

Sixth Embodiment

(1) Detailed Description of Construction

Figure 19:
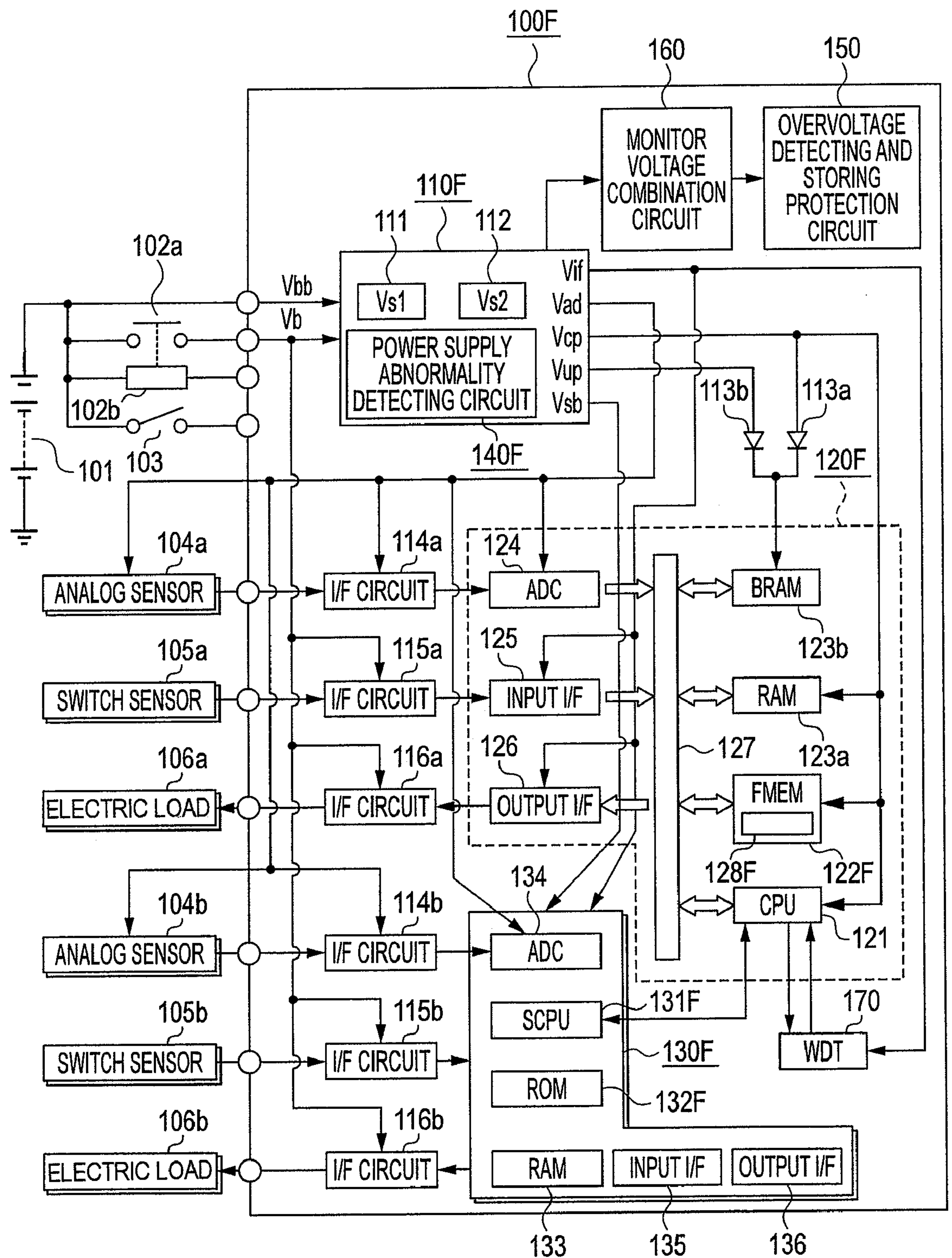
FIG. 19 is an overall circuit diagram showing a sixth embodiment of the in-vehicle mount electronic controller according to the present invention.
Figure 20:
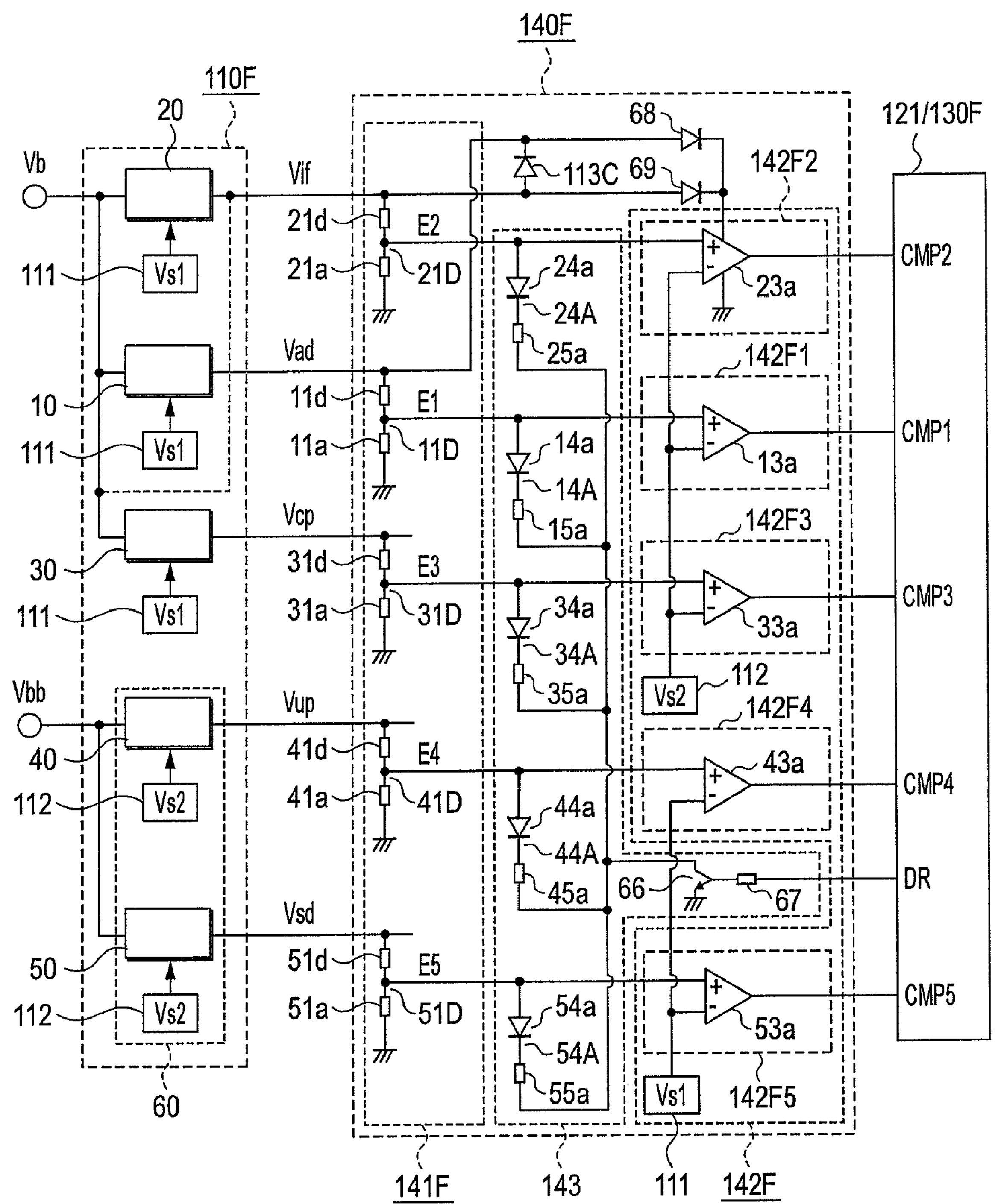
FIG. 20 is a detailed diagram showing a power supply abnormality detecting circuit according to the sixth embodiment.

Next, the construction of an in-vehicle mount electronic controller 100F according to a sixth embodiment will be described by concentrating on the different point from the in-vehicle mount electronic controller 100D according to the fourth embodiment with reference to FIGS. 19 and 20. FIG. 19 is an overall circuit diagram showing the in-vehicle mount electronic controller 100F according to the sixth embodiment, and FIG. 20 is an electrical circuit diagram showing a power supply abnormality detecting circuit 140F. In FIGS. 19 and 20, the same reference numerals as shown in FIGS. 13 and 14 represent the same or corresponding parts.

The main feature of the in-vehicle mount electronic controller 100F according to the sixth embodiment resides in that all the output voltages Vad, Vif, Vcp, Vup, Vsb among the first, second, third, fourth and fifth output voltages Vad, Vif, Vcp, Vup, Vsb are set as monitor target output voltages, an individual comparison system using the reference voltages Vs1, Vs2 generated by the reference voltage generating circuits 111, 112 as comparison reference voltages to judge abnormality of each monitor target output voltage is adopted, and a judgment signal input circuit 142F having a voltage dividing ratio correcting circuit 143 is used for abnormality judgment. Furthermore, sub CPU 131F having a soak timer function is used as a combination control circuit unit 130F, and the fifth constant-voltage power supply circuit 50 is directly supplied with power from the in-vehicle mount battery 101. In FIG. 19, the in-vehicle mount electronic controller 100F is constructed by a constant-voltage power supply 110F having a power supply abnormality detecting circuit 140F described later with reference to FIG. 20, a first integrated circuit element 120F cooperating with a combination control circuit unit 130F, the over voltage detecting and storing protection circuit 150 and the monitor voltage combining circuit 160 described with reference to FIG. 3, the watchdog timer 170 and various kinds of input/output interface circuits 125, 126, 135, 136 similar to those of FIG. 13. A flash memory is used as a non-volatile program memory 122F contained in the first integrated circuit element 120F, and a partial area thereof is used as a non-volatile data memory 128F.

The combination control circuit unit 130F has sub CPU serving as a soak timer circuit which corresponds to the monitor control circuit unit 131F, and the sub CPU 131F cooperates with an auxiliary program memory 132F such as a mask ROM memory or the like and the auxiliary RAM memory 133. The soak timer circuit which is supplied with power from the fifth output voltage Vsb at all times is constructed by a small-capacity sub CPU 131F which is low in power consumption. It is used to temporarily energize the exciting coil 102*b* of the power supply relay to re-start the microprocessor 121, monitor the operation state of some sensors of the in-vehicle mount sensor groups 104*a*, 104*b*, 105*a*, 105*b* and detect and store the presence or absence of abnormality during the period when the power supply switch 103 is opened and the engine is stopped. The power supply abnormality detecting circuit 140F is constructed as described in detail with reference to FIG. 20, and a voltage dividing ratio correcting instruction signal DR to obtain two kinds of upper-side and lower-side divided voltages is used.

Next, the constant-voltage power supply source 110F in the in-vehicle mount electronic controller 100F according to the sixth embodiment will be described with reference to FIG. 20. In FIG. 20, the first constant-voltage power supply circuit 10 drops the main power supply voltage Vb to generate the first output voltage Vad. The second constant-voltage power supply circuit 20 drops the main power supply voltage Vb to generate the second output voltage Vif. The third constant-voltage power supply circuit 30 drops the main power supply voltage Vb to generate the third output voltage Vcp. The fourth constant-voltage power supply circuit 40 drops the auxiliary power supply voltage Vbb to generate the fourth output voltage Vup. The fifth constant-voltage power supply circuit 50 drops the auxiliary power supply voltage Vbb to generate the fifth output voltage Vsb. The third constant voltage power supply circuit 30 may drop the second output voltage Vif to generate the third output voltage Vcp. The fourth and fifth constant-voltage power supply circuits 40, 50 constitute the additional constant-voltage power supply circuit 60.

Each of the constant-voltage power supply circuits 10, 20, 30, 40, 50 is constructed by a power transistor which is subjected to negative feedback continuous control so that a voltage proportional to the output voltage thereof is equal to a reference voltage Vs1 or Vs2 generated by the first or second reference voltage generating circuit 111, 112. In the sixth embodiment, the first reference voltage Vs1 of the first reference voltage generating circuit 111 is used for the first, second and third constant-voltage power supply circuits 10, 20, 30, and the second reference voltage Vs2 of the second reference voltage generating circuit 112 is used for the fourth and fifth constant-voltage power supply circuits 40, 50.

The power supply abnormality detecting circuit 140F is constructed by a voltage dividing circuit 141F, a judgment signal input circuit 142F and a voltage dividing ratio correcting circuit 143 serving as a part of the voltage dividing circuit 141F. As in the case of the voltage dividing circuit 141C shown in FIG. 10, the voltage dividing circuit 141F contains first, second, third, fourth and fifth voltage dividing circuits 11D, 21D, 31D, 41D, 51D corresponding to the first, second, third, fourth and fifth output voltages Vad, Vif, Vcp, Vup, Vsb. The first voltage dividing circuit 11D is constructed by a series circuit of two high-precision resistors 11*d*, 11*a*, and generates a first divided voltage E1 from the first output voltage Vad. The second voltage dividing circuit 21D is constructed by a series circuit of two high-precision resistors 21*d*, 21*a*, and generates a second divided voltage E2 from the second output voltage Vif. The third voltage dividing circuit 31D is constructed by a series circuit of two high-precision resistors 31*d*, 31*a*, and generates a third divided voltage E3 from the third output voltage Vcp. The fourth voltage dividing circuit 41D is constructed by a series circuit of two high-precision resistors 41*d*, 41*a* and generates a fourth divided voltage E4 from the fourth output voltage Vup. The fifth voltage dividing circuit 51D is constructed by a series circuit of two high-precision resistors 51*d*, 51*a* and generates a fifth divided voltage E5 from the fifth output voltage Vsb.

The judgment signal input circuit 142F has first, second, third, fourth and fifth judgment signal input circuits 142F1, 142F2, 142F3, 142F4, 142F5, and these judgment signal input circuits are constructed by first, second, third, fourth and fifth judging circuits 13*a*, 23*a*, 33*a*, 43*a*, 53*a*, respectively. With respect to the first judging circuit 13*a*, the second reference voltage Vs2 is input as a comparison reference voltage to the negative input terminal of the first judging circuit 13*a*, and the first divided voltage E1 is input as a comparison target voltage to the positive input terminal of the first judging circuit 13*a*. The first judging circuit 13*a* generates a first judgment signal CMP1 whose logical level is set to "H" when the value of the first divided voltage E1 exceeds the value of the second reference voltage Vs2, and inputs the first judgment signal CMP1 to the microprocessor 121. With respect to the second judging circuit 23*a*, the second reference voltage Vs2 is input as a comparison reference voltage to the negative input terminal of the second judging circuit 23*a* and the second divided voltage E2 is input as a comparison reference voltage to the positive input terminal of the second judging circuit 23*a*. The second judging circuit 23*a* generates a second judgment signal CMP2 whose logical level is set to "H" when the value of the second divided voltage E2 exceeds the value of the second reference voltage Vs2.

With respect to the third judging circuit 33*a*, the second reference voltage Vs2 is input as a comparison reference voltage to the negative input terminal of the third judging circuit 33*a*, and the third divided voltage E3 is input as a comparison target voltage to the positive input terminal of the second judging circuit 13*a*. The second judging circuit 33*a* generates a third judgment signal CMP3 whose logical level is set to "H" when the value of the third divided voltage E3 exceeds the value of the second reference voltage Vs2, and inputs the first judgment signal CMP1 to the microprocessor 121. With respect to the fourth judging circuit 43*a*, the first reference voltage Vs1 is input as a comparison reference voltage to the negative input terminal of the fourth judging circuit 43*a*, and the fourth divided voltage E4 is input as a comparison target voltage to the positive input terminal of the fourth judging circuit 43*a*. The fourth judging circuit 43*a* generates a fourth judgment signal CMP4 whose logical level is set to "H" when the value of the fourth divided voltage E4 exceeds the value of the first reference voltage Vs1, and inputs the fourth judgment signal CMP4 to the microprocessor 121. With respect to the fifth judging circuit 53*a*, the first reference voltage Vs1 is input as a comparison target voltage to the negative input terminal of the fifth judging circuit 53*a*, and the fifth divided voltage E5 is input to the positive input terminal of the fifth judging circuit 53*a*. The fifth judging circuit 53*a* generates a fifth judgment signal CMP5 whose logical level is set to "H" when the value of the fifth divided voltage E5 exceeds the value of the first reference voltage Vs1, and inputs the fifth judgment signal CMP5 to the microprocessor 121. The first, second, third, fourth and fifth judgment signals CMP1 to CMP5 are input to the microprocessor 121 as the relative voltage information.

The first, second, third, fourth and fifth judging circuits 13*a*, 23*a*, 33*a*, 43*a*, 53*a* are supplied with power from the first and second output voltages Vad and Vif through diodes 68 and 69.

The voltage dividing ratio correcting circuit 143 has first, second, third, fourth and fifth correcting circuits 14A, 24A, 34A, 44A and 54A and an opening/closing element 66 which is common to the respective correcting circuits.

The first correcting circuit 14A contains a diode 14*a* and a voltage dividing resistor 15*a*, and the diode 14*a* and the voltage dividing resistor 15*a* are connected to the opening/closing element 66 in series. The series circuit of these elements is connected to the voltage dividing resistor 11*a* in parallel when the opening/closing element 66 is closed, and reduces the voltage dividing ratio of the first divided voltage E1.

The second correcting circuit 24A contains a diode 24*a* and a voltage dividing resistor 25*a*, and the diode 24*a* and the voltage dividing resistor 25*a* are connected to the opening/closing element 66 in series. The series circuit of these elements is connected to the voltage dividing resistor 21*a* in parallel when the opening/closing element 66 is closed, and reduces the voltage dividing ratio of the second divided voltage E2.

The third correcting circuit 34A contains a diode 34*a* and a voltage dividing resistor 35*a*, and the diode 34*a* and the voltage dividing resistor 35*a* are connected to the opening/closing element 66 in series. The series circuit is connected to the voltage dividing resistor 31*a* in parallel when the opening/closing element 66 is closed, and reduces the voltage dividing ratio of the third divided voltage E3.

The fourth correcting circuit 44A contains a diode 44*a* and a voltage dividing resistor 45*a*, and the diode 44*a* and the voltage dividing resistor 45*a* are connected to the opening/closing element 66. The series circuit is connected to the voltage dividing resistor 41*a* in parallel when the opening/closing element 66 is closed, and reduces the voltage dividing ratio of the fourth divided voltage E4.

The fifth correcting circuit 54A contains a diode 54*a* and a voltage dividing resistor 55*a*, and the diode 54*a* and the voltage dividing resistor 55*a* are connected to the opening/closing element 66 in series. The series circuit is connected to the voltage dividing resistor 51*a* in parallel when the opening/closing element 66 is closed, and reduces the voltage dividing ratio of the fifth divided voltage E5.

The opening/closing element 66 is opened or closed through a driving resistor 67 by the correcting instruction signal DR of the microprocessor 121, and the opening/closing element 66 is conducted every time the correcting instruction signal DR is set to the logical level "H", thereby reducing each voltage dividing ratio of the first, second, third, fourth and fifth voltage dividing circuits 11D, 21D, 31D, 41D, 51D.

The voltage dividing ratio and the relationship between the permissible variation range of the output voltage and the voltage dividing ratio are set as follows. The voltage dividing resistors 15*a*, 25*a*, 35*a*, 45*a*, 55*a* re connected to the voltage dividing resistors 11*a*, 21*a*, 31*a*, 41*a*, 51*a* respectively in parallel. In a case where each of the voltage dividing circuits 11*d*, 21D, 31D, 41D, 51D has a small voltage dividing ratio, each of the voltage dividing voltages E1 to E5 is smaller than the first and second reference voltages Vs1 and Vs2 even when the output voltage Vad, Vif, Vcp, Vup, Vsb of each constant-voltage power supply circuit 10, 20,30, 40, 50 is equal to a permitted upper limit voltage, so that the logical level of each of the judgment signal CMP1 to CMP5 is set to "L". Furthermore, in a case where the opening/closing element 66 is interrupted and thus each of the voltage dividing circuits 11D, 21D, 31D, 41D, 51D has a large voltage dividing ratio, each of the divided voltages E1 to E5 is larger than the first and second reference voltages Vs1 and Vs2 even when the output voltage Vad, Vif, Vcp, Vup, Vsb of each constant-voltage power supply circuit 10, 20, 30, 40, 50 is equal to a permitted lower limit voltage, so that the logical level of each of the judgment signals CMP1 to CMP5 is set to "H". Accordingly, when the logical level of the correcting instruction signal DR is set to "H", abnormality is judged if the logical level of each comparison output CMP1 to CMP5 is set to "H". When the logical level of the correcting instruction signal DR is set to "L", abnormality is judged if the logical level of each comparison output CMP1 to CMP5 is set to "L".

In the foregoing description, the voltage dividing resistors 15*a*, 25*a*, 35*a*, 45*a*, 55*a* are connected to resistors 11*a*, 21*a*, 31*a*, 41*a*, 51*a* at the downstream side of each voltage dividing signal in parallel by the correcting instruction signal DR. However, they may be connected to the resistors 11*d*, 21*d*, 31*d*, 41*d*, 51*d* at the upstream side in parallel so that the voltage dividing ratio is increased when the logical level of the correcting instruction signal DR is set to "H". Furthermore, if the opening/closing element is individually connected to each of the voltage dividing resistors 15*a*, 25*a*, 35*a*, 45*a*, 55*a*, the diodes 14*a*, 24*a*, 34*a*, 44*a*, 54*a* may be omitted.

(2) Detailed Description of Action and Operation

Next, the action and operation of the in-vehicle mount electronic controller 100F constructed as shown in FIGS. 19 and 20 will be described. In FIGS. 19 and 20, when the power supply switch 103 is closed, the exciting coil 102*b* of the power supply relay is energized, so that the output contact point 102*a* is closed and a main power supply voltage Vb is applied from the in-vehicle mount battery 101. Accordingly, the constant-voltage power supply source 110F generates the first to third output voltages Vad, Vif, Vcp in addition to the fourth and fifth output voltages Vup and Vsb, and thus the microprocessor 121 starts to operate. The microprocessor 121 generates a control output signal in accordance with the operation states of the first and second analog sensors 104*a*, 104*b* and the first and second switch sensors 105*a*, 105*b* as the in-vehicle sensor group, and the control program stored in the non-volatile program memory 122F, and controls the driving of the first and second in-vehicle mount electrical load groups 106*a* and 106*b*. Various kinds of abnormality occurrence information and leaning storage information occurring during the operation of the microprocessor 121 are stored in the backup memory 123*b*, and a part thereof is stored and saved in the non-volatile data memory 128F as a partial area of the non-volatile program memory 122F. The backup memory 123*b* holds its storage content by the fourth output voltage Vup obtained by dropping the auxiliary power supply voltage Vbb even when the output contact point 102*a* of the power supply relay is opened. However, when the voltage of the in-vehicle mount battery 101 abnormally decreases and when the output terminal of the in-vehicle mount battery 101 is opened for exchange, the storage information of the backup memory 123*b* is vanished, so that partial important data are stored and saved in the non-volatile data memory 128F.

Figure 21:
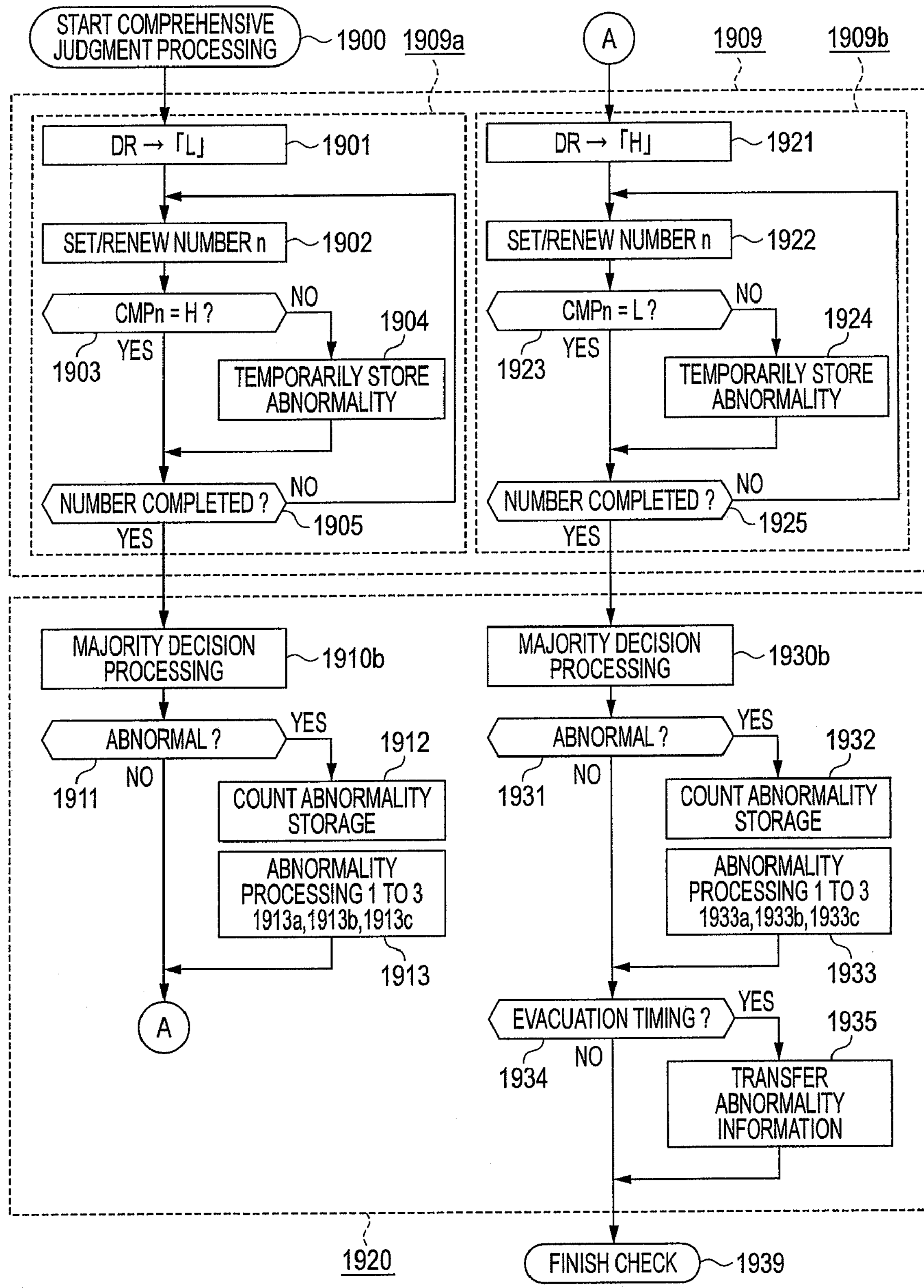
FIG. 21 is a flowchart showing the abnormality detecting operation according to the sixth embodiment.

Next, the abnormality detecting operation of the in-vehicle mount electronic controller 100F constructed as shown in FIGS. 19 and 20 will be described with reference to the flowchart of FIG. 21. A first half flowchart is shown at the left side of FIG. 21, and the last half flowchart is shown at the right side of FIG. 21. In FIG. 21, step 1900 is a step of starting an abnormality check operation of the power supply circuit by the microprocessor 121. The subsequent step 1901 is a step serving as a correcting instruction section for outputting a signal having the logical level "L" as a correcting instruction signal DR. The subsequent step 1902 is a step for successively setting and changing the judgment number n from 1 to 5. At the operation start time point, n=1, and the judgment number n is incremented every time the processing passes through the step 1905 described later and then returns to the step 1902 again. The subsequent step 1903 judges whether the logical level of an n-th comparison output CMPn is "H". If the logical level concerned is "H", the judgment of YES is made and then the processing goes to step 1905. If the logical level concerned is "L", the judgment of NO is made and then the processing goes to step 1904. The step 1904 is a step of temporarily storing an n-th abnormal state that the n-th output voltage is reduced to be equal to or less than a permitted lower limit value because the n-th divided voltage En is small although the voltage dividing ratio of the voltage dividing circuits 11D, 21D, 31D, 41D, 51D is large, or because the first and second reference voltages Vs1 and Vs2 as comparison reference are excessively large.

The step 1905 is executed when the judgment of step 1903 is YES or subsequently to the step 1904, and it is judged whether the present judgment number n is equal to 5. If n=5, the judgment of yes is made and the processing goes to step 1910*b*. If n≦4, the judgment of NO is made and the processing returns to step 1902. A step block 1909*a* constructed by the steps 1901 to 1905 constitutes an abnormality judging section when the voltage dividing ratio of each voltage dividing circuit 11D, 21D, 31D, 41D, 51D is increased by the step 1901 serving as the correcting instruction section. The step 1910*b* constitutes the majority decision judging section, and it is a section for extracting amorality of a specific constant-voltage power circuit estimated by judgment results obtained at five times in step 1903. If any one of the comparison outputs CMP1 to CMP3 of the comparison circuits 13*a*, 23*a*, 33*a* is abnormal, the output voltage connected to the positive input terminal of the comparison circuit which outputs the abnormal comparison output concerned is judged to be abnormal. However, if plural comparison outputs of the comparison outputs CMP1 to CMP3 are abnormal, the second reference voltage Vs2 is judged to be abnormal.

The subsequent step 1911 is an abnormality presence or absence judging step of making the judgment of NO and going to step 1921 at the right side of FIG. 21 through a relay terminal A if all the judgments of step 1903 are YES and no abnormality is found, and also making the judgment of YES and going to step 1912 if the judgment of the step 1903 indicates abnormality. Step 1912 is a step serving as a part of an abnormality occurrence history saving section. In this step, the abnormality detection frequency is accumulatively added every abnormality mode temporarily stored in step 1904, and the abnormality state is settled by abnormality detection of a predetermined frequency in order to prevent misjudgment. The subsequent step 1913 is a step of executing abnormality report or fail safe processing in connection with occurrence of abnormality, and the processing goes from the step 1913 to step 1921.

In the last flowchart shown at the right side of FIG. 21, the step 1921 subsequent to the steps 1911, 1913 is a step serving as a correction instructing section for outputting a signal having the logical level of "H" as a correcting instruction signal DR. The subsequent step 1922 is a step of successively setting and changing the judgment number n form 1 to 5. At the operation start time point, n=1, and the judgment number n is incremented every time the processing returns to the step 1922 through step 1925 described later again. The subsequent 1923 is a judgment step for judging whether an n-th comparison output CMPn has the logical level "L". If the logical level is "L", this step makes the judgment of YES and goes to step 1925. If the logical level is "H", this step makes the judgment of NO and goes to step to 1924. The step 1924 is a step of temporarily storing an n-th abnormality state in which the n-th output voltage increases beyond the permissible upper limit value because the n-th divided voltage En is large or the first and second reference voltages Vs1, Vs2 as comparison reference is excessively small.

The step 1925 is executed if the judgment of the step 1923 is YES or subsequently to the step 1924, and judges whether the present judgment number n is equal to 5 or not. If n=5, this step makes the judgment of YES, and goes to step 1930*b*. If n≦4, this step makes the judgment of NO and returns to step 1922. A step block 1909*b* constructed by the steps from step 1921 to step 1925 constitutes an abnormality judging section when the voltage dividing ratio of each of the voltage dividing circuits 11D, 21D, 31D, 41D, 51D is reduced by the step 1921 constituting the correcting instruction section. The step 1930*b* is a step constituting a majority decision judging section. This means extracts abnormality of a specific constant-voltage power supply circuit which is estimated on the basis of judgment results obtained at five times in step 1923. For example, if any one of the comparison outputs CMP1 to CMP3 of the comparison circuits 13*a*, 23*a*, 33*a* is abnormal, the output voltage connected to the positive input terminal of a comparison circuit which outputs the abnormality-judged comparison output concerned is judged to be abnormal. However, if plural comparison outputs of the comparison outputs CMP1 to CMP3 are abnormal, the second reference voltage Vs2 is judged to be abnormal.

The subsequent step 1931 is a abnormality presence-or-absence judging step which makes the judgment of NO and goes to step 1934 when all the judgments of the step 1923 are YES and no abnormality is found, or makes the judgment of YES and goes to step 1932 if the judgment of the step 1923 indicates abnormality. The step 1932 is a step serving as a part of the abnormality occurrence history saving section. In this step, the abnormality detecting frequency is accumulatively added every abnormality mode temporarily stored in step 1924, and the abnormal state is settled by abnormality detection of a predetermined frequency to prevent misjudgment.

The subsequent step 1933 is step of executing abnormality report or fail safe processing in connection with occurrence of abnormality. The processing goes to step 1934 subsequently to the step 1933. A specific example of the abnormality processing executed in steps 1913 and 1933 is to reduce the opening degree of the throttle valve so as to suppress the engine rotational speed and stop the operation of the convenient function concerning safety as general processing as described with respect to the step 413 of FIG. 4.

The step 1913 contains the first, second and third abnormality processing sections 1913*a*, 1913*b*, 1913*c*, and the step 1933 contains the first, second and third abnormality processing sections 1933*a*, 11933*b*, 1933*c*. The abnormality processing sections 1913*a*, 1933*a* have the same construction as the abnormality processing section 413*a* shown in FIG. 4, the abnormality processing sections 1913*b*, 1933*b* have the same construction as the abnormality processing section 413*b* shown in FIG. 4, and the abnormality processing sections 1913*c*, 1933*c* have the same construction as the abnormality processing section 413*c* shown in FIG. 4. The step 1934 is a step of judging whether a transfer evacuation timing of abnormality occurrence history information has come. It makes the judgment of YES and goes to step 1935 during the period when the output contact point 102*a* of the power supply relay is tentatively closed from the time when the power supply switch 103 is opened. In addition, when the power supply switch 103 is closed, this step makes the judgment of NO and goes to an operation finishing step 1939. In step 1935, the presence or absence of abnormality settled every abnormality mode which is stored in the backup memory 123*b* in step 1912, 1932 is stored in a memory of an abnormality-mode based address which is provided to the non-volatile data memory 128F in the non-volatile program memory 122F.

When the power supply switch 103 is opened, the microprocessor 121 stops its operation after other various kinds of initialization processing is executed, and in connection with the stop operation of the microprocessor 121, the exciting coil 102*b* of the power supply relay is energized to open the output contact point 102*a*. When the power supply switch 103 is closed, another control program is executed in the operation finishing step 1939, the operation start step 1900 is activated again within a predetermined time, and the subsequent flow is repetitively executed. The step block 1920 constructed by the steps from 1910*b* to 1935 constitutes the comprehensive judging processing section. In this step block 1920, at least one of the abnormality countermeasure based on the abnormality report or the fail safe processing and the saving of the abnormality occurrence information is executed on the basis of the first, second, third, fourth and fifth judgment signals CMP1 to CMP5. The step block 1909 obtained by combining the step blocks 1909*a* and 1909*b* constitutes the individual abnormality detecting section.

(3) Summary and Feature of Sixth Embodiment

The in-vehicle mount electronic controller 100F according to the sixth embodiment of the present invention which has the microprocessor 121 for drive-controlling the in-vehicle mount electronic load groups 106*a*,106*b* in accordance with operation states of the in-vehicle mount sensor groups 104*a*, 104*b*, 105*a*, 105*b* and contents of the control programs stored in the non-volatile program memory 122F, the combination control circuit unit 130F that is serially connected to the microprocessor 121 to mediate and connect some input/output signals, the constant-voltage power supply source 110F for supplying power to the microprocessor 121, the combination control circuit unit 130F and the input/output interface circuits therefore, and the power supply abnormality detecting circuit 140F for detecting abnormality of the constant-voltage power supply source 110F.

The in-vehicle mount electronic controller 100F is characterized in that the constant-voltage power supply 110F contains the plural constant-voltage power supply circuits 10, 20, 30, 60 supplied with power form the in-vehicle mount battery 101, the respective constant-voltage power supply circuits 10,20,30,60 being subjected to negative feedback control so as to be proportional to the reference voltages Vs1, Vs2 generated by the reference voltage generating circuits 111, 112 to thereby generate the output voltages Vad, Vif, Vcp, Vup, Vsb having the predetermined permissible variable band width, the power supply abnormality detecting circuit 140F contains the judgment signal input circuit 142F which cooperates with at least one of the microprocessor 121 and the combination control circuit unit 130F to detect individual abnormality for each of plural monitor target output voltages selected from plural output voltages generated by the constant-voltage power supply source, at least one of the microprocessor 121 and the combination control circuit unit 130F further contains the individual abnormality detecting section 1909 and the comprehensive judging processing section 1920, the judgment signal input circuit 142F inputs the relative voltage information between each output voltage and the comparison reference voltage with respect to each of the plural monitor target output voltages to at least one of the microprocessor 121 and the combination control circuit unit 130F, reference voltages Vs1, Vs2 generated by the reference voltage generating circuits 111, 112 are used as the comparison reference voltage, the individual abnormality detecting section 1909 individually detects, on the basis of the relative voltage information input from the judgment signal input circuit 142F, the presence or absence of band abnormality as to whether each of the plural monitor target output voltages is a voltage value within each permissible variation band, and the comprehensive judging processing section 1920 makes a comprehensive judgment containing the presence or absence of abnormality of the comparison reference voltage when it is detected by the individual abnormality detecting section 1909 that individual abnormality is detected in at least one of the plural target output voltages, and carries out at least one of reporting of abnormality and storing of abnormality occurrence information.

As described above, the in-vehicle mount electronic controller 100F according to the sixth embodiment detects the presence or absence of individual abnormality and comprehensively judges individual abnormality individually by making the band comparison as to whether each of the output voltages of the plural constant-voltage power supply circuits is within the permissible variation width, by using the output voltage of the constant-voltage power supply circuit having high output voltage precision in the plural constant-voltage power supply circuits or the output voltage of the reference voltage generating circuit as the comparison reference voltage, thereby executing abnormality processing.

Accordingly, the presence or absence of the band abnormality can be individually accurately detected for the plural constant-voltage power supply circuits by using the high-precision comparison reference voltage, and also precision abnormality of the output voltage is detected as risk prediction information and abnormality is reported or abnormality occurrence record is stored before the microprocessor or the combination control circuit unit falls into an operation stop state. Therefore, there is an effect that maintenance check can be performed before an abnormal-decrease or abnormal-increase accident occurs or risk prediction can be performed by periodic check.

Furthermore, there is also an effect that not only individual abnormality can be detected, but also identification information as to which constant-voltage power supply circuit falls into an individual abnormality state or whether the comparison reference voltage itself is abnormal or not is added to report abnormality or store abnormality record information, thereby facilitating maintenance check.

Still furthermore, in the in-vehicle mount electronic controller 100F according to the sixth embodiment, the constant-voltage power supply source 110F contains first, second and third constant-voltage power supply circuits 10, 20, 30 and the additional constant-voltage power supply circuit 60, the first constant-voltage power supply circuit 10 is a power supply circuit for generating the first output voltage Vad which is smaller in load current, but higher in precision as compared with the second and third constant-voltage power supply circuits 20, 30, the first constant-voltage power supply circuit 10 is used as a power supply for the first multi-channel AD converter 124 which directly inputs to microprocessor 121, the first analog interface circuit 114*a* and at least a part of the first analog sensor 104_a_, the first constant-voltage power supply circuit 10 is also used as a power supply for the second multi-channel AD converter 134, the second analog interface circuit 114_b_ and at least a part of the second analog sensor 104_b_ when the combination control circuit unit 130F is connected to the second analog sensor 104_b_ through the second multi-channel AD converter 134 and the second analog interface circuit 114_b_, the second constant-voltage power supply circuit 20 is a power supply circuit which has larger load current than the first constant-voltage power supply circuit 10 and generates the second output voltage Vif which has the same level as the first output voltage Vad, but is lower in constant-voltage control precision, the second constant-voltage power supply circuit 20 is used as a power supply for input/output interface circuits 125, 126 in the microprocessor 121 and input/output interface circuits 135, 136 in the combination control circuit unit 130F, the third constant-voltage power supply circuit 30 is a power supply circuit for generating the third output voltage Vcp which is a voltage different from the first output voltage Vad, the third constant-voltage power supply circuit 30 is used as a power supply for the calculating section of the microprocessor 121, the non-volatile program memory 122F and RAM memory 123_a_ for calculation processing, and the additional constant-voltage supply circuit 60 contains the power supply circuit for generating the additional output voltage having the same level constant-voltage control precision as the first output voltage Vad.

According to this construction, a load-based selective use style in which a low-precision large-capacity power supply having the same level voltage as a high-precision small-capacity power supply and a different-voltage large-capacity power supply are properly selectively used is adopted. Accordingly, by limiting the application of the high-precision power supply, a power supply which is inexpensive as a whole can be constructed.

Still furthermore, the in-vehicle mount electronic controller 100F according to the sixth embodiment is characterized in that the first, second and third constant-voltage power supply circuits 10, 20, 30 are supplied with power from the in-vehicle mount battery 101 to generate the first, second and third output voltages Vad, Vif, Vcp by closing the power supply switch 103, the additional constant-voltage power supply circuit 60 contains at least one of the fourth constant-voltage power supply circuit 40 and the fifth constant-voltage power supply circuit 50, the fourth constant-voltage power supply circuit 40 is a power supply circuit of low power consumption which is supplied with power from the in-vehicle mount battery 101 to generate a fourth output voltage Vup even under the state that the power supply switch 103 is opened, the fourth constant-voltage power supply circuit 40 is a power supply circuit used as a power supply for at least one of the backup memory 123_b_ of the microprocessor 121 and the auxiliary RAM memory 133 of the combination control circuit unit 130F, the fifth constant-voltage power supply circuit 50 is a power supply which is supplied with power from the in-vehicle mount battery 101 to generate the fifth output voltage Vsb different from the first output voltage vad under any state that the power supply switch 103 is closed or opened, and is lower in power consumption than the second and third constant-voltage power supply circuits 20, 30, the fifth constant-voltage power supply circuit 50 is used as a power supply for the monitor control circuit 131F in the combination control circuit unit 130F, the monitor control circuit 131F is a circuit for inputting a monitor input signal from the in-vehicle mount sensor groups 104_b_, 105_b_ to the microprocessor 121, and drive-controlling the in-vehicle mount load group 106_b_ on the basis of a control output signal from the microprocessor 121, and at least one of the fourth and fifth output voltages Vup and Vsb has the same level constant-voltage control precision as the first output voltage Vad and is output as the additional output voltage.

According to this construction, the additional constant-voltage power supply circuit contains at least one of the fourth constant-voltage power supply circuit and the fifth constant-voltage power supply circuit which have the same level output voltage as the first output voltage. The fourth constant-voltage power supply circuit is directly supplied with power from the in-vehicle mount battery, and thus it can hold the storage state of some RAM memory even under the state that the power supply switch is interrupted and thus the power supply to the first to third constant-voltage power supply circuits is interrupted.

Furthermore, the fifth constant-voltage power supply circuit is directly supplied with power form the in-vehicle mount battery, and thus the combination control circuit unit can be operated under the state that the power supply switch is interrupted.

Still furthermore, the output voltages of the fourth and fifth constant-voltage power supply circuits do not originally require high constant-voltage precision. However, it has small load current, and also little variation of the load current because it does not supply power to elements other than a first integrated circuit element mainly comprising the microprocessor or a second integrated circuit element constituting the combination control circuit unit, so that the constant-voltage precision can be relatively easily enhanced.

In the in-vehicle mount electronic controller 100F according to the sixth embodiment, the reference voltage generating circuit contains at least the first and second reference voltage generating circuits 111, 112 for generating the first and second reference voltages Vs1, Vs2, the first, second and third output voltages Vad, Vif, Vcp and the additional output voltages Vup and Vsb are classified into first and second groups in accordance with whether any one of the first and second reference voltages Vs1 and Vs2 is used or which one of the first and second reference voltages Vs1 and Vs2 was used when both the reference voltages are used, and the voltage at the comparison reference side to be compared with the first to fifth output voltages compared in the judgment signal input circuit 142F is based on a group different from the reference voltage generating circuits 111, 112 used in the first to fifth constant-voltage power supply circuits 10,20,30,40,50 or based on a comparison reference voltage generating circuit different from the comparison reference voltage generating circuits 111, 112 used for comparison reference and the reference voltage generating circuit used in the first to fifth constant-voltage power supply circuits 10,20, 30,40,50.

According to this construction, the constant-voltage power supply circuits are grouped, and the reference voltage generating circuits are provided on a group basis, the reference voltage generating circuit being used is different between the divided voltage to be compared in each judgment circuit and the voltage at the comparison reference side. Accordingly, even when the output voltage of the reference voltage generating circuit is abnormal, the abnormality can be detected by the power supply abnormality detecting circuit.

If the first, second and third constant-voltage power supply circuits are subjected to negative feedback control by the first reference voltage obtained by the first reference voltage generating circuit and the output voltage of the first reference voltage generating circuit concerned varies abnormally, it is impossible to detect abnormality by the comparison between the first and second constant-voltage power supply circuits, the comparison between the first and third constant-voltage power supply circuit or the comparison with the first reference voltage. In this case, the reference voltage generating circuits are set up as a double system, and they are relatively compared with each other to detect the abnormality therebetween.

Furthermore, in the in-vehicle mount electronic controller 100F according to the sixth embodiment, each of the first, second, third and additional judgment signal input circuits 142F1,142F2,142F3,142F4,142F5 contains a voltage dividing circuit 11D,21D,31D,41D,51D and a judging circuit 13*a*, 23*a*,33*a*,43*a*,53*a*, the voltage dividing circuit 11D,21D,31D,41D,51D is constructed by inserting and connecting remaining residual voltage dividing resistors to respective two series-connected voltage dividing resistors in parallel, and supplied with the monitor target output voltage to generate an upper-side divided voltage and a lower-side divided voltage of the monitor target output voltage, and the judging circuit 13*a*,23*a*,33*a*,43*a*,53*a*, compares the upper-side divided voltage and the lower-side divided voltage with the comparison reference voltage, and outputs a signal representing whether the monitor target output voltage is a voltage value within the permissible variation band width, as the relative voltage information CMP1 to CMP5.

According to this construction, the output voltages of the voltage dividing circuits for generating two kinds of small and large divided voltage are monitored to judge the presence or absence of abnormality. Accordingly, the permissible upper and lower limit values can be accurately set by the voltage dividing circuit having the high-precision resistors whose precision meet the required detection precision.

Still furthermore, in the in-vehicle mount electronic controller 100F according to the sixth embodiment, the comprehensive judging processing section 1920 contains comprehensive abnormality judging sections 1910*b*,1930*b*, and also contains at least one of first, second and third abnormality processing sections 1913*a*, 1913*b*, 1913*c*,1933*a*, 1933*b*, 1933*c* the comprehensive abnormality judging section 1910*b*, 1930*b* monitors the relative voltage information to analyze and estimate as a whole which output voltage of the plural monitor target output voltages is abnormal, and makes a majority decision judgment that the comparison reference voltage is judged to be abnormal when plural monitor target output voltages compared with the comparison reference voltage are abnormal, when the abnormality of the second, third and fifth output voltages Vif, Vcp, Vsb is detected on the basis of the judgment results of the comprehensive abnormality judging sections 1910*b*, 1930*b* under the state that the additional constant-voltage power supply circuit 60 contains the fifth constant-voltage power supply circuit 50, the first abnormality processing section 1913*a*, 1933*a* carries out at least reporting of the abnormality concerned and storing of abnormality occurrence information of the abnormality concerned, when abnormality of the first output voltage Vad is detected on the basis of the judgment results of the comprehensive abnormality judging sections 1910*b*, 1930*b*, the second abnormality processing sections 1913*b*, 1933*b* carry out at least one of reporting of abnormality and storing of abnormality occurrence information of the abnormality concerned, and it substitutes correction replacement data at the safety side for the input signal obtained from the first analog sensor 104*a* and the input signal obtained form the second analog sensor 104*b* if the combination control circuit unit 130F is connected to the second analog sensor 104*b* through the second multi-channel AD converter 134 and the second analog interface circuit 114*b*, and when the fourth output voltage Vup is detected to be abnormal on the basis of the judgment results of the comprehensive abnormal judgment sections 1910*b*, 1930*b* in the case where the additional constant-voltage power supply circuit 60 contains the fourth constant-voltage power supply circuit 40, the third abnormality processing sections 1913*c*, 1933*c* carry out at least one of reporting of the abnormality and storing of abnormality occurrence information of the abnormality concerned, and replaces a variable control constant varying in the backup memory 123*b* because of learning and storage during driving by at least one of a control constant transferred to and stored in the non-volatile data memory 128F and a predetermined reference control constant pre-stored in the non-volatile program memory 122F.

According to this construction, the abnormality reporting or the storing of the abnormality record information is carried out in accordance with the occurrence of abnormality of each output voltage estimated on the basis of the comprehensive abnormality judging section, and also the correction processing of the analog signal is executed if the first output voltage is abnormal while the learning control constant is returned to the transfer saving information or the reference control constant if the fourth output voltage is abnormal. Accordingly, the precision abnormality of the output voltage which does not yet stop the operation of a watchdog timer circuit or the microprocessor is detected, and the abnormality is reported or the abnormality occurrence history is stored, whereby the abnormal decrease or abnormality increase trouble of the output voltage is expected, so that check maintenance is carried out before a critical trouble occurs or a risk can be predicted by periodic check.

Furthermore, the correction replacement data applied when the first output voltage is abnormal is based on the multiplication of a correction coefficient at the safety side and the present analog signal of each analog sensor or algebra addition of correction bias. Accordingly, the safety of control can be maintained by setting the proper correction coefficient and the correction bias every analog sensor.

Still furthermore, the in-vehicle mount electronic controller 100F according to the sixth embodiment is characterized in that the monitor control circuit unit 131F of the combination control circuit unit 130F is constructed by a microprocessor serving as sub CPU, and the monitor control circuit unit 131F executes a part of the processing of the comprehensive judging processing section 1920.

According to this construction, the combination control circuit unit 130F for serially communicating input/output signals with the microprocessor is provided, and the monitor control circuit unit provided to the combination control circuit unit takes partial charge of the processing of the comprehensive judging processing section, so that it is unnecessary to directly input each judgment signal and the comparison signal to the microprocessor, the number of input/output points of the expensive microprocessor executing at high speed can be saved and the control load imposed on the microprocessor can be reduced.

Other Features of the First to Sixth Embodiments

In the first to sixth embodiments, with respect to the comprehensive abnormality judging sections 410*b*, 710*b*, 1110*b*, 1310*b*, 1610*b*, 1910*b*, 1930*b*, attention is paid to whether each output voltage keeps a voltage value within a permissible variation band width. If it is out of the permissible variation band width, it is judged as predictive information on a risk condition and immediately report abnormality or at least abnormality occurrence information is saved so that a predictor can be found at a periodic check. That is, under the abnormal band state that the output voltage is out of the permissible variation band width, the microprocessor and the combination control unit are still allowed to continue the operation although deterioration of the control performance is assumed. On the other hand, the over-voltage detecting and storing protection circuit 150 detects the over-voltage state of each output voltage (for example, a voltage of 110% or more of the normal value) by hardware, and interrupts the power supply relay to prevent the constant-voltage power supply and the in-vehicle mount controller from being burned out. Conversely, when the output voltage of the constant-voltage power supply decreases abnormally, the microprocessor or the watchdog timer circuit stop the operation, and the output voltage is set to the output state at the safety side. That is, the fail safe design is worked out.

As a remaining problem, when the first constant-voltage power supply circuit 10 associated with an analog signal is abnormal because it exceeds a predetermined permissible variation width and thus the analog input signal is not reliable, constant replacement processing by the second abnormality processing section in the abnormality processing sections 413, 713, 1113, 1313, 1613, 1913, 1933 is executed. For example, in the case of an accelerator position sensor for detecting the step-on degree of an acceleration pedal, the first output voltage Vad applied to a potentiometer is also applied to the reference voltage terminal Vref of the multi-channel AD converter 124. Therefore, even when the first output voltage Vad varies, no error occurs in the detected rotational angle of the potentiometer, and thus it is unnecessary to give special consideration to safety. However, when an analog sensor is operated by an external power supply other than the first output voltage Vad, or in the case of a sensor in which voltage variation correction is carried out even when power is supplied from the first output voltage Vad, the detected digital value varies if the reference voltage Vref of the multi-channel AD converters 124, 134 varies, and thus it is desired that the rate reduction or multiplication or predetermined bias addition/subtraction processing is executed.

For example, when the value of the first output voltage Vad is equal to 95% of a normal value, the digital conversion value increases to 105% even when the input signal from the analog sensor has the same value. Accordingly, in the case of a sensor in which it is the safety side that the value of the sensor signal is set to be slightly smaller than the normal value, it is safe to multiply 90% as a relatively large reduction rate, for example. Conversely, in the case of a sensor in which it is the safety side that the value of the sensor signal is set to be slightly larger than the normal value, it is safe to multiply 110% as a relatively large increasing rate. One of the correction replacement data is a correcting magnification or correcting bias data to obtain a correction signal from an analog signal containing an error, and the correction processing at the safety side is executed when the precision of the first output voltage Vad is suspected. Another one of the correction replacement data is replaced by a predetermined control constant at the safety side while neglecting the analog signal containing the error. Which one of them is applied is predetermined every analog sensor. IN the case of an air flow sensor for measuring the air-intake amount of an engine, when the precision of the first output voltage Vad is suspected, the operation based on alternative detection information calculated from the opening degree of the throttle valve and the engine rotational speed can be performed. Furthermore, the fail safe operation is carried out by generally shifting to such a control mode as to suppress the engine rotational speed on the basis of the correction replacement data as described above.

When the fifth output voltage Vsb decreases abnormally, the soak timer circuit is set to an inoperative state to avoid the power supply relay from being carelessly energized. When the fourth output voltage Vup abnormally decreases, the learning storage data obtained during the operation are vanished, however, these data may be transferred and evacuated to the non-volatile data memories 128A to 128F before the operation is stopped. Furthermore, with respect to the variable control constant in the backup memory 123*b* when the operation is started, it can be replaced by the control constant transferred to and saved in the non-volatile data memory 128A to 128F or the reference control constant stored in the non-volatile program memory 122A to 122F by the third abnormality processing section in the abnormality processing section 413, 713, 1113, 1313, 1613, 1913, 1933, and then the operation is carried out. In the foregoing description, various abnormal states are individually identified and the countermeasure adapted to each abnormal state is individually taken. However, it is possible that each abnormal state is not individually identified, but the operation mode is shifted to the fail safe operation all together when there is some abnormality. One of the fail safe operations is the second abnormality processing section, and this abnormality processing section is a section for correcting the input signal obtained from the analog sensor 104 by correction replacement data corresponding to the control constant at the safety side and then carrying out the operation.

Another one of the fail safe operations is the third abnormality processing section, and this abnormality processing section is a section for replacing the variable control constant varying through learning and storage during operation by the control constant transferred and saved in the non-volatile data memory 128A to 128F or the reference control constant stored in the non-volatile program memory 122A to 122F in advance. Another one of the fail safe operations is to suppress the opening degree of the throttle valve, to suppress the fuel supply amount to reduce the engine rotational speed or to stop a high-level convenient function concerning safety.

With respect to the partial charge of the control by the microprocessor 121 and the combination control circuit units 130A to 130F, the following distributing method is proper. That is, the individual abnormality detecting section and the comprehensive abnormality judging section are executed by the combination control circuit units 130A to 130F, the abnormality judgment result is transmitted to the microprocessor 121, and the transfer and saving of abnormality history information and the abnormality processing part excluding the comprehensive abnormality judging sections 410*b*, 710*b*, 1110*b*, 1310*b*, 1610*b*, 1910*b*, 1930*b* from the comprehensive judgment processing sections 420, 720, 1120, 1320, 1620, 1920 are executed in the microprocessor 121 are executed.

The first or fifth output voltage Vad, Vsb is used as the comparison reference voltage in the second, fourth and fifth embodiments. These high-precision output voltages are normally adjusted by using a high-precision voltmeter for correction which is set at the outside for checking products at the shipping time, and thus they have high-precision output voltages from which the effect of solid variation in applied parts is removed. The error width thereof is a smaller value as compared with the abnormality band width for executing the band abnormality. In the first embodiment, the first output voltage applied to the reference voltage terminal of the multi-channel AD converter is likewise adjusted so as to have a sufficiently high-precision value. On the other hand, the reference voltage generated by the reference voltage generating circuit 111, 112 is used as the comparison reference voltage in the six embodiment. Therefore, this reference voltage generating circuit is subjected to correction processing at the part level in advance, and the reference voltage generating circuit for generating the high-precision reference voltage from which the solid variation is removed is applied. However, the reference voltage generated by the reference voltage generating circuit 111, 112 is used as the comparison reference voltage in the third embodiment, however, the value of the duty when comparison and coincidence in the shipping adjustment operation are carried out is compared with that of the voltmeter for correction. Therefore, the effect of the solid variation of the reference voltage generated by the reference voltage generating circuit 111, 112 is removed.

Accordingly, for example, when the fifth output voltage Vsb is used in place of use of the first output voltage Vad as the comparison reference voltage in the second embodiment, the fifth output voltage Vsb is not required to have high precision, but it may be used insofar as it operates stably. Even when the fifth output voltage Vsb has a solid variation, the output voltage corresponding to the accurate duty concerned can be captured by the corrected operation.

Furthermore, the third reference voltage based on the third reference voltage generating circuit which is not used as the comparison reference voltage in the constant-voltage control circuits 10 to 50 may be used.

Various modifications and alterations of this invention will be apparent to those skilled in the art without departing from the scope and spirit of this invention, and it should be understood that this is not limited to the illustrative embodiments set forth herein.

What is claimed is:

1. An in-vehicle mount electronic controller having a microprocessor for drive-controlling an in-vehicle mount electric load group in accordance with operation states of the in-vehicle mount sensor group and contents of control programs stored in a non-volatile program memory, a combination control circuit unit that is serially connected to the microprocessor to mediate and connect some input/output signals, a constant-voltage power supply source for supplying power to the microprocessor, the combination control circuit unit and the input/output interface circuits therefore, and a power supply abnormality detecting circuit for detecting abnormality of the constant-voltage power supply source, wherein the constant-voltage power supply source contains plural constant-voltage power supply circuits supplied with power form an in-vehicle mount battery, the respective constant-voltage power supply circuits being subjected to negative feedback control so as to be proportional to a reference voltage generated by a reference voltage generating circuit to thereby generate output voltages having a predetermined permissible variable band width, the power supply abnormality detecting circuit contains a judgment signal input circuit which cooperates with at least one of the microprocessor and the combination control circuit unit to detect individual abnormality for each of plural monitor target output voltages selected from plural output voltages generated by the constant-voltage power supply source, at least one of the microprocessor and the combination control circuit unit further contains an individual abnormality detecting section and a comprehensive judging processing section, the judgment signal input circuit inputs relative voltage information between each output voltage and the comparison reference voltage with respect to each of the plural monitor target output voltages to at least one of the microprocessor and the combination control circuit unit, at least one of a voltage proportional to the predetermined output voltage having high constant-voltage control precision among the plural output voltages generated by the constant-voltage power supply source and the reference voltage generated by the reference voltage generating circuit is used as the comparison reference voltage, the individual abnormality detecting section individually detects, on the basis of the relative voltage information input from the judgment signal input circuit, the presence or absence of band abnormality as to whether each of the plural monitor target output voltages is a voltage value within each permissible variation band, and the comprehensive judging processing section makes a comprehensive judgment containing the presence or absence of abnormality of the comparison reference voltage when it is detected by the individual abnormality detecting section that individual abnormality is detected in at least one of the plural target output voltages, and carries out at least one of reporting of abnormality and storing of abnormality occurrence information.

2. The in-vehicle mount electronic controller according to claim 1, wherein the constant-voltage power supply source contains first, second and third constant-voltage power supply circuits and an additional constant-voltage power supply circuit, the first constant-voltage power supply circuit is a power supply circuit for generating a first output voltage Vad which is smaller in load current, but higher in precision as compared with the second and third constant-voltage power supply circuits, the first constant-voltage power supply circuit is used as a power supply for a first multi-channel AD converter which directly inputs to the microprocessor, a first analog interface circuit and at least a part of a first analog sensor, the first constant-voltage power supply circuit is also used as a power supply for a second multi-channel AD converter, a second analog interface circuit and at least a part of a second analog sensor when the combination control circuit unit is connected to the second analog sensor through the second multi-channel AD converter and the second analog interface circuit, the second constant-voltage power supply circuit is a power supply circuit which has larger load current than the first constant-voltage power supply circuit and generates a second output voltage which has the same level as the first output voltage, but is lower in constant-voltage control precision, the second constant-voltage power supply circuit is used as a power supply for input/output interface circuits in the microprocessor and input/output interface circuits in the combination control circuit unit, the third constant-voltage power supply circuit is a power supply circuit for generating a third output voltage which is a voltage different from the first output voltage, the third constant-voltage power supply circuit is used as a power supply for a calculating section of the microprocessor, a non-volatile program memory and RAM memory for calculation processing, and the additional constant-voltage power supply circuit contains a power supply circuit for generating an additional output voltage having the same level constant-voltage control precision as the first output voltage.

3. The in-vehicle mount electronic controller according to claim 2, wherein the first, second and third constant-voltage power supply circuits are supplied with power from the in-vehicle mount battery to generate the first, second and third output voltages by closing a power supply switch, the additional constant-voltage power supply circuit contains at least one of the fourth constant-voltage power supply circuit and the fifth constant-voltage power supply circuit, the fourth constant-voltage power supply circuit is a power supply circuit of low power consumption which is supplied with power from the in-vehicle mount battery to generate a fourth output voltage even under the state that the power supply switch is opened, the fourth constant-voltage power supply circuit is a power supply circuit used as a power supply for at least one of a backup memory of the microprocessor and an auxiliary RAM memory of the combination control circuit unit, the fifth constant-voltage power supply circuit is a power supply which is supplied with power from the in-vehicle mount battery to generate a fifth output voltage different from the first output voltage under only the state that the power supply switch is closed, or either state that the power supply switch is closed or opened, and is lower in power consumption than the second and third constant-voltage power supply circuits, the fifth constant-voltage power supply circuit is used as a power supply for a monitor control circuit in the combination control circuit unit, the monitor control circuit is a circuit for inputting a monitor input signal from the in-vehicle mount sensor group to the microprocessor, and drive-controlling the in-vehicle mount load group on the basis of a control output signal from the microprocessor, and at least one of the fourth and fifth output voltages has the same level constant-voltage control precision as the first output voltage and is output as the additional output voltage.

4. The in-vehicle mount electronic controller according to claim 2, wherein at least one of the first and second multi-channel AD converters constitutes a part of the judgment signal input circuit, directly receives the monitor target output voltages or voltages proportional to the monitor target output voltages, converts the plural monitor target output voltages to digital values with the first output voltage set as a reference voltage for AD conversion, and sets the digital values proportional to the rate of the monitor target output voltages and the reference voltage as the relative voltage information.

5. The in-vehicle mount electronic controller according to claim 2, wherein the power supply abnormality detecting circuit has a voltage dividing ratio correcting circuit with the judgment signal input circuit, the judgment signal input circuit has plural voltage dividing circuits for dividing the plural monitor target output voltages respectively and plural comparison circuits for comparing the respective voltage-divided voltages from the respective voltage dividing circuits with the comparison reference voltage to generate the relative voltage information, the voltage dividing ratio correcting circuit contains opening/closing elements and the smoothing circuit for variably controlling the voltage dividing ratio of each voltage dividing circuit and corrects the voltage dividing ratio of each voltage dividing circuit on the basis of a correcting instruction signal generated by the correcting instruction section provided to at least one of the microprocessor and the combination control circuit unit, permissible band duties corresponding to the respective permissible variation band widths of the plural monitor target output voltages are stored in the non-volatile program memory, the opening/closing elements carry out the opening/closing operation with a variable duty which varies in accordance with the correcting instruction signal, the smoothing circuit is a low pass filter for smoothing the increase/decrease of each divided voltage based on the opening/closing operation of the opening/closing element and inputting the averaged divided voltage to the comparison circuits, the individual abnormality detecting section judges whether the duty corresponding to the variable duty at the time point when each divided voltage is coincident with the comparison reference voltage is within the permissible range corresponding to the permissible band duty, and the individual abnormality detecting section is executed in at least one of the microprocessor and the monitor control circuit unit of the combination control circuit unit, the permissible band duty is transferred to and stored in the auxiliary RAM memory of the combination control circuit unit from the non-volatile program memory when the individual abnormal detecting section is executed in the monitor control circuit unit of the combination control circuit unit.

6. The in-vehicle mount electronic controller according to claim 2, wherein the second, third and additional output voltages among the first, second, third and additional output voltages are set as the monitor target output voltage, the judgment signal input circuit has a second judging signal input circuit for receiving the second output voltage, a third judgment signal input circuit for receiving the third output voltage, and additional judging signal input circuit for receiving the additional output voltage, and each of the second, third and additional judgment signal input circuits uses a voltage proportional to the first output voltage as the comparison reference voltage, and outputs the relative voltage information.

7. The in-vehicle mount electronic controller according to claim 2, wherein the first, second and third output voltages among the first, second, third and additional output voltages are set as the monitor target output voltage, the judgment signal input circuit has a first judging signal input circuit for receiving the first output voltage, a second judging signal input circuit for receiving the second output voltage and a third judgment signal input circuit for receiving the third output voltage, and each of the first, second and third judgment signal input circuits uses a voltage proportional to the additional output voltage as the comparison reference voltage, and outputs the relative voltage information.

8. The in-vehicle mount electronic controller according to claim 3, wherein the reference voltage generating circuit contains at least the first and second reference voltage generating circuits for generating the first and second reference voltages, the first, second and third output voltages and the additional output voltages are classified into first and second groups in accordance with whether any one of the first and second reference voltages is used or which one of the first and second reference voltages was used when both the reference voltages are used, and the voltage at the comparison reference side to be compared with the first to fifth output voltages compared in the judgment signal input circuit is based on a group different from the reference voltage generating circuits used in the first to fifth constant-voltage power supply circuits or based on a comparison reference voltage generating circuit different from the comparison reference voltage generating circuits used for comparison reference and the reference voltage generating circuit used in the first to fifth constant-voltage power supply circuits.

9. The in-vehicle mount electronic controller according to claim 6, wherein each of the first, second, third and additional judgment signal input circuits contains a voltage dividing circuit and a judging circuit, the voltage dividing circuit is constructed by mutually connecting three voltage dividing resistors in series or inserting and connecting the remaining residual voltage dividing resistor to two series-connected voltage dividing resistors in parallel, and supplied with the monitor target output voltage to generate an upper-side divided voltage and a lower-side divided voltage of the monitor target output voltage, and the judging circuit compares the upper-side divided voltage and the lower-side divided voltage with the comparison reference voltage, and outputs a signal representing whether the monitor target output voltage is a voltage value within the permissible variation band width, as the relative voltage information.

10. The in-vehicle mount electronic controller according to claim 3, wherein the comprehensive judging processing section contains a comprehensive abnormality judging section, and also contains at least one of first, second and third abnormality processing sections, the comprehensive abnormality judging section monitors the relative voltage information to analyze and estimate as a whole which output voltage of the plural monitor target output voltages is abnormal, and makes a majority decision judgment that the comparison reference voltage is judged to be abnormal when plural monitor target output voltages compared with the comparison reference voltage are abnormal, when the abnormality of the second, third and fifth output voltages is detected on the basis of the judgment result of the comprehensive abnormality judging section under the state that the additional constant-voltage power supply circuit contains the fifth constant-voltage power supply circuit, the first abnormality processing section carries out at least reporting of the abnormality concerned and storing of abnormality occurrence information of the abnormality concerned, when abnormality of the first output voltage is detected on the basis of the judgment result of the comprehensive abnormality judging section, the second abnormality processing section carries out at least one of reporting of abnormality and storing of abnormality occurrence information of the abnormality concerned, and substitutes correction replacement data at the safety side for the input signal obtained from the first analog sensor and the input signal obtained form the second analog sensor if the combination control circuit unit is connected to the second analog sensor through the second multi-channel AD converter and the second analog interface circuit, and when the fourth output voltage is detected to be abnormal on the basis of the judgment result of the comprehensive abnormal judgment section in the case where the additional constant-voltage power supply circuit contains the fourth constant-voltage power supply circuit, the third abnormality processing section carries out at least one of reporting of the abnormality and storing of abnormality occurrence information of the abnormality concerned, and replaces a variable control constant varying in the backup memory because of learning and storage during driving by at least one of a control constant transferred to and stored in the non-volatile data memory and a predetermined reference control constant pre-stored in the non-volatile program memory.

11. The in-vehicle mount electronic controller according to claim 3, wherein the monitor control circuit unit of the combination control circuit unit is constructed by any one of a hard logic circuit and a microprocessor serving as sub CPU and the monitor control circuit unit executes a part of the processing of the comprehensive judging processing section.

12. The in-vehicle mount electronic controller according to claim 1, wherein initial value data and permissible variation data at the shipping time concerning the plural monitor target output voltages are stored in any one of a non-volatile data memory and a non-volatile program memory in the in-vehicle mount electronic controller, the individual abnormality detecting section contains a variation abnormality detecting section, and the variation abnormality detecting section judges whether a deviation voltage of each of the plural monitor target output voltages from the initial value data thereof is within the permissible variation data, thereby judging individual abnormality.

* * * * *